United States Patent
Miloushev et al.

(10) Patent No.: US 9,497,264 B2
(45) Date of Patent: Nov. 15, 2016

(54) APPARATUS, METHOD AND SYSTEM FOR AGGREGATING COMPUTING RESOURCES

(71) Applicants: Peter Nickolov, Laguna Niguel, CA (US); Becky L. Hester, Orange, CA (US); Borislav Marinov, Aliso Viejo, CA (US)

(72) Inventors: Vladimir Miloushev, Dana Point, CA (US); Peter Nickolov, Laguna Niguel, CA (US); Becky L. Hester, Orange, CA (US); Borislav Marinov, Aliso Viejo, CA (US)

(73) Assignee: CA, Inc., New York, NY (US)

( * ) Notice: Subject to any disclaimer, the term of this patent is extended or adjusted under 35 U.S.C. 154(b) by 164 days.

(21) Appl. No.: 14/175,597

(22) Filed: Feb. 7, 2014

(65) Prior Publication Data

US 2014/0207871 A1   Jul. 24, 2014

Related U.S. Application Data

(63) Continuation of application No. 13/093,645, filed on Apr. 25, 2011, now Pat. No. 8,656,077, which is a continuation of application No. 12/149,012, filed on Apr. 24, 2008, now Pat. No. 7,934,035, which is a continuation of application No. 11/024,641, filed on Dec. 29, 2004, now Pat. No. 7,380,038.

(60) Provisional application No. 60/533,732, filed on Dec. 30, 2003.

(51) Int. Cl.
| | |
|---|---|
| G06F 13/00 | (2006.01) |
| G06F 15/173 | (2006.01) |
| H04L 29/08 | (2006.01) |
| G06F 9/50 | (2006.01) |

(52) U.S. Cl.
CPC ......... *H04L 67/1008* (2013.01); *G06F 9/5016* (2013.01); *G06F 9/5027* (2013.01); *G06F 9/5072* (2013.01); *G06F 9/5088* (2013.01); *G06F 13/00* (2013.01); *G06F 15/173* (2013.01); *H04L 67/1097* (2013.01); *G06F 2209/504* (2013.01); *G06F 2209/542* (2013.01); *Y02B 60/142* (2013.01)

(58) Field of Classification Search
USPC .............. 710/36–38, 316, 317, 220, 244; 718/100, 104, 107, 108; 712/28; 711/118, 125, 130, 135
See application file for complete search history.

(56) References Cited

U.S. PATENT DOCUMENTS

| | | | |
|---|---|---|---|
| 5,197,130 A | 3/1993 | Chen et al. | |
| 5,361,347 A * | 11/1994 | Glider et al. | 714/44 |

(Continued)

OTHER PUBLICATIONS

Bruce Walker, "Open Single System Image (OPEN SSI) Linux Cluster Project", http://OPENSSI.ORG/SSI-INTRO.pdf, dated Mar. 4, 2010.

(Continued)

*Primary Examiner* — Khanh Dang
(74) *Attorney, Agent, or Firm* — Baker Botts L.L.P.

(57) ABSTRACT

A system for executing applications designed to run on a single SMP computer on an easily scalable network of computers, while providing each application with computing resources, including processing power, memory and others that exceed the resources available on any single computer. A server agent program, a grid switch apparatus and a grid controller apparatus are included. Methods for creating processes and resources, and for accessing resources transparently across multiple servers are also provided.

14 Claims, 21 Drawing Sheets

(56) References Cited

U.S. PATENT DOCUMENTS

| | | | |
|---|---|---|---|
| 5,511,192 | A | 4/1996 | Shirakihara |
| 5,682,530 | A | 10/1997 | Shimamura |
| 5,692,192 | A | 11/1997 | Sudo |
| 6,003,066 | A | 12/1999 | Ryan et al. |
| 6,016,503 | A | 1/2000 | Overby et al. |
| 6,021,492 | A | 2/2000 | May |
| 6,038,651 | A | 3/2000 | VanHuben et al. |
| 6,049,789 | A | 4/2000 | Frison et al. |
| 6,105,053 | A | 8/2000 | Kimmel et al. |
| 6,138,238 | A | 10/2000 | Scheifer et al. |
| 6,275,900 | B1 | 8/2001 | Liberty |
| 6,353,898 | B1 | 3/2002 | Wipfel et al. |
| 6,516,304 | B1 | 2/2003 | Yoshimura et al. |
| 6,549,930 | B1 | 4/2003 | Chrysos et al. |
| 6,675,261 | B2 | 1/2004 | Shandony |
| 6,717,595 | B1 | 4/2004 | Yennaco |
| 6,771,595 | B1 | 8/2004 | Gilbert et al. |
| 6,862,623 | B1 | 3/2005 | Odhner et al. |
| 6,915,516 | B1 | 7/2005 | Glidewell |
| 6,985,956 | B2 | 1/2006 | Luke et al. |
| 6,990,667 | B2 | 1/2006 | Ulrich et al. |
| 7,032,022 | B1 | 4/2006 | Shanumgam et al. |
| 7,054,873 | B2 | 5/2006 | Nordstrom et al. |
| 7,076,804 | B2 | 7/2006 | Kershenbaum et al. |
| 7,085,897 | B2 | 8/2006 | Blake et al. |
| 7,222,343 | B2 | 5/2007 | Heyrman et al. |
| 7,266,540 | B2 | 9/2007 | Chung et al. |
| 7,299,218 | B2 * | 11/2007 | Piper et al. |
| 7,401,152 | B2 * | 7/2008 | Traversat et al. ............ 709/230 |
| 7,577,736 | B1 | 8/2009 | Ovenden |
| 7,644,153 | B2 * | 1/2010 | Talwar et al. ................ 709/224 |
| 7,747,713 | B1 | 6/2010 | Spalink et al. |
| 7,924,874 | B2 | 4/2011 | Powers et al. |
| 8,407,718 | B2 * | 3/2013 | Van Der Sanden et al. . 719/313 |
| 2001/0027462 | A1 * | 10/2001 | Muramatsu .................... 709/102 |
| 2002/0049749 | A1 | 4/2002 | Helgeson et al. |
| 2002/0166117 | A1 | 11/2002 | Abrams et al. |
| 2003/0074286 | A1 | 4/2003 | Rodrigo |
| 2003/0083995 | A1 | 5/2003 | Ramachandran et al. |
| 2003/0084018 | A1 | 5/2003 | Chintalapati et al. |
| 2003/0084343 | A1 | 5/2003 | Ramachandran et al. |
| 2003/0088608 | A1 * | 5/2003 | McDonald .................... 709/106 |
| 2003/0135380 | A1 | 7/2003 | Lehr et al. |
| 2003/0135474 | A1 | 7/2003 | Circenis et al. |
| 2004/0044731 | A1 | 3/2004 | Chen et al. |
| 2004/0064580 | A1 * | 4/2004 | Lim et al. ...................... 709/238 |
| 2004/0098383 | A1 | 5/2004 | Tabellion et al. |
| 2004/0194098 | A1 * | 9/2004 | Chung et al. ................. 718/100 |
| 2005/0027616 | A1 | 2/2005 | Jones et al. |
| 2005/0091352 | A1 | 4/2005 | Alex et al. |
| 2005/0097552 | A1 * | 5/2005 | O'Connor et al. ........... 718/100 |
| 2005/0138422 | A1 | 6/2005 | Hancock et al. |
| 2005/0228856 | A1 | 10/2005 | Seildens et al. |
| 2006/0020701 | A1 | 1/2006 | Parekh et al. |
| 2006/0080663 | A1 | 4/2006 | Pospiech |
| 2006/0184741 | A1 | 8/2006 | Hrusecky et al. |
| 2006/0248010 | A1 | 11/2006 | Krishnamoorthy et al. |
| 2007/0043672 | A1 | 2/2007 | Martin et al. |
| 2007/0226064 | A1 | 9/2007 | Yu et al. |
| 2007/0226155 | A1 | 9/2007 | Yu et al. |
| 2013/0283292 | A1 * | 10/2013 | Van Der Sanden et al. . 719/313 |

OTHER PUBLICATIONS

Ian Foster et al., "The Physiology of the Grid: An Open Services Architecture for Distributed Systems Integration", (http://www.globus.org/research/papers/pgsa.pdf), dated Jun. 22, 2002.

A Portable Platform to Support Parallel Programming Languages in Proceedings of the Unenix Symposium on Experiences with Distributed and Multiprocessor Systems (SEDMS IV), dated Sep. 1993.

Matthew Haines at al., "Chant: Lightweight Threads in a Distributed Memory Environment Institute for Computer Applications in Science and Engineering", NASA Langley Research Center, dated Jun. 8, 1995.

Ayal Itzkovitz et al., "Thread Migration and its Application in Distributed Shared Memory Systems", Technicon CS/LPCR Technical Report #9603, dated Jul. 1996.

Scott Milton, Thread Migration in Distributed Memory Multicomputers, Technical Report TR-CS-98-01, The Australian National University, dated Feb. 1998.

Ammon Barak et al., "The Mosix Multicomputer Operating System for High Performance Cluster Computing", Journal of Future Generation Computer Systems, dated Apr. 1998.

Sudo, et al., "Distributed-Thread Scheduling Methods for Reducing Page-Thrashing in Proceeds of the Sixth IEEE International Symposium on High Performance Distributed Computing", dated 1997.

Kritchalach Thitikamol and Pete Kelcher, "Thread Migration and Communication Minimization in DSM Systems", Proceedings of the IEEE Special Issue on Distributed Shared Memory Systems, vol. 87, No. 3, pp. 487-497, dated Mar. 1999.

Wenzhang Zhu et al., "A Distributed Java Virtual Machine with Transparent Thread Migration Support", Proceedings of the IEEE 4th International Conference on Cluster Computing, dated Sep. 2002.

"Microsoft Test 'Pay-As-You-Go' Software", Neowin.net (http://www.neowin.net/index.php?act=view&id-38317), dated 2007.

"Five Benefits of Software as a Service", Trumba Corporation (http://www.trumba.com/connect/knowledgecenter/software_as_a_service.aspx), dated 2007.

Pay As You Go (PAYG) MaxWebAuthor™, MaxView Corporation (http://www.maxview.com/index/php?payasyougo). dated 2005, downloaded on Apr. 28, 2009.

S. Shankland, "Sun Starts Pay-As-You-Go Supercomputing", CNET Networks, Inc. (http://news.zdnet.co.uk/harware/0.1000000091.39187297.00.htm), dated 2006.

Office Action for U.S. Appl. No. 11/024,641, mailed Nov. 13, 2006.

U.S. Final Office Action for U.S. Appl. No. 11/024,641, mailed Jul. 17, 2007.

Notice of Allowance for U.S. Appl. No. 11/024,641, mailed Jan. 25, 2008.

International Search Report for PCT/US2006/03613, dated Apr. 16, 2009.

Andrew Grimshaw et al, "The Legion Vision of a Worldwide Virtual Computer", in Communicaton of the ACM Archive, vol. 40, Issue 1 (Jan. 1997), pp. 39-45, dated 1997 [retrieved Apr. 30, 2009]. Retrieved from the Internet:<URL:http://www.cs.umd.edu/class/spring2004/cmsc818s/Readings/legion-cacm.pdf.

* cited by examiner

APPARATUS, METHOD AND SYSTEM FOR AGGREGATING COMPUTING RESOURCES

CROSS-REFERENCE TO RELATED APPLICATIONS

This application is a Continuation of U.S. application Ser. No. 13/093,645, filed Apr. 25, 2011, which is a Continuation of U.S. application Ser. No. 12/149,012, filed Apr. 24, 2008, now U.S. Pat. No. 7,934,035 B2, which issued Apr. 26, 2011, which is a Continuation of U.S. application Ser. No. 11/024,641, filed Dec. 29, 2004, now U.S. Pat. No. 7,380,039 B2, which issued on May 27, 2008, and claims priority under 35 U.S.C. §119 of Provisional Application No. 60/533,732, filed Dec. 30, 2003. The entire disclosures of each of the prior applications are considered a part of the disclosure of the accompanying Continuation application and are hereby incorporated by reference.

FIELD OF THE INVENTION

The present invention generally relates to computer systems, and more particularly to an apparatus, a system and a method for aggregating resources of multiple computers to provide increased computing power for processing computer programs in general and multithreaded computer applications in particular.

BACKGROUND OF THE INVENTION

Background Art

Computer Systems

The basic components of a conventional computer typically include one or more processors for processing program instructions; a temporary memory device (such as random access memory, or RAM) for storing program data and instructions that are being processed by the processors; a permanent memory device (such as a magnetic disk) for storing the computer's operating system, programs and data; and various input/output devices (such as a monitor, a keyboard, network adapters and others) for facilitating the necessary interactions between the computer, human users and other technical systems.

Some computer systems may not have all of the above components. For example, network PC may function without a permanent memory device, while a portable computer may not have a network adapter. Computers may also have a variety of additional components.

The components in the computer are interconnected by various means, including a direct channel, a system bus, and/or one or more peripheral busses. Typically, the processor interacts with the temporary memory device and the input/output devices. The input/output devices may also interact directly with the temporary memory (a process known as "direct memory access", or DMA) and provide various signals to the processor.

FIG. 1A illustrates a conventional computer system. The computer system 100 comprises a first processor 101 and a second processor 102 connected to a system bus 103. Alternatively, a single processor may be employed. Also connected to the system bus 103 is a memory controller/cache 104 which provides an interface to the temporary memory 105. An I/O bus bridge 110 is also connected to the system bus 103 and provides an interface to the I/O bus 111. The memory controller/cache 104 and the I/O bus bridge 110 may be integrated as depicted.

A Peripheral Component Interconnect (PCI) bus bridge 112 connected to the I/O bus 111 provides a first PCI bus 113. Communication links to the computer 100 may be provided through the local area network adapter 120 connected to the first PCI bus 113. Additional PCI bus bridges, such as the PCI-X bus bridge 114, may be connected to the I/O bus 111 or to the I/O bridge 110 via other I/O buses, in order to provide additional peripheral devices, such as other network adapters, frame grabbers and host adapters, such as the Infiniband host adapter 121 on the PCI-X bus 115. In this manner, the computer 100 may be connected to multiple other computers. Additionally, a hard disk 130 and a graphics card 131 may be connected to the I/O bus 111, either directly or indirectly. One skilled in the art will appreciate that the hardware depicted in FIG. 1A may vary and that the depicted example is not meant to imply architectural limitations with respect to the present invention.

Processes

Computer programs are generally written in some high-level programming language such as C, C++ or Java, and compiled to machine code that can be executed by a processor (e.g., AMD Opteron). When a user starts a program on the computer, the computer's operating system loads the program's instructions and data, known together as "executable image", into the temporary memory device (hereinafter, memory) and directs the processor to start executing it.

Modern operating systems (OS), such as Windows NT, Unix or Linux, typically distinguish user programs, known as "applications", from the core components of the operating system, known as "the kernel". Most OS are capable of running more than one user program concurrently, facilitating the sharing of computer's processor, memory and other resources among independent programs.

In modern operating systems, the term "process" is used to denote a running instance of a program. Processes are given resources and scheduled for execution by the operating system. Two different programs running simultaneously on a single computer are managed by the operating system as two separate and independent processes. Similarly, two instances of one and the same program can be executed in the same manner, sharing the computer resources and typically unaware of each other.

To facilitate safe sharing of the computer system among multiple processes, operating systems typically provide a protected environment for each process. The protected environment ensures that each process owns its resources, such as memory, files or synchronization objects, and that these resources cannot be accessed or damaged by other processes running on the same computer system.

In effect, modern operating systems provide each process with an execution environment that appears as a virtual computer for executing a single instance of a user program. This protected environment, also known as "user mode" is in contrast to the environment afforded to the OS kernel, also known as "kernel mode", in which a program has access to all computing resources, memory, and operating system data related to all currently running processes.

Key Process Resources (Process Context)

From the point of view of a program executing as a process, the process environment provided by the operating system constitutes the whole computer. This environment typically consists of the following key resources: a dedicated memory address space, managed using a memory map and a page table; handles to open files or devices; various synchronization objects; and may include one or more objects used to communicate between processes (IPC objects).

OS have a typical logical memory layout for processes, assigning portions of the logical memory for different purposes. The instance of the layout maintained for a specific process is known as a "memory map". The memory map includes segments of address space for the program instructions (known as text or code), for data (heap), and for stack. Most programs can also have additional memory segments, typically used by various tools and libraries to facilitate software development and/or reuse.

Most computers provide hardware-implemented features that assist the operating system in providing and enforcing separation among different process environments. One important such feature is the memory management unit (MMU) which is typically a separate component in the computer, or may be implemented as part of the CPU.

The MMU provides virtual memory addressing, making it possible to assign separate address spaces to every process. This is done by implementing a mapping between the logical addresses used within a program and the actual physical memory addresses to be accessed by the processor and I/O devices. The mapping is defined by the operating system which programs the MMU using data structures such as the process memory maps and memory page tables. The granularity of this mapping is typically defined by the MMU and is done in memory pages of 4 to 8 kilobytes.

Using the MMU and a permanent memory device (hereinafter, persistent storage), OS may additionally provide ability to present to the processes running on the computer with the illusion of having access to more memory than is physically available in the computer. OS uses MMU features such as the 'page accessed flag' and 'page dirty flag' to identify memory pages whose data can be written to persistent storage, or "paged out", freeing up physical memory for use by other processes, or even by the same process. This mechanism of presenting more memory than is physically available in the primary memory device is known as memory virtualization, and the memory provided to processes is known as virtual memory.

User programs running as processes access permanently stored data and devices using a file abstraction supported by the OS. In this abstraction, data files and peripheral devices are represented by their persistent identifiers, typically, human-readable strings of characters forming meaningful names. Application processes access a device or the contents of a file, as the case may be, by opening the file by its persistent identifier and then performing various operations such as reading or writing data, getting or setting attributes, etcetera, and closing the file when their work is done.

Whenever a process opens a file or a device, the operating system provides a numeric identifier known as file handle that the process uses to request further operations on that file from the OS. With few exceptions, file handles are private to the process and other processes cannot use them to access files. The OS maintains a file handle table for each process. The file handle table typically provides correspondence between the file handles known to a specific process and the internal identification maintained by the OS for each open file (usually a pointer to a file descriptor or an inode structure).

User programs implemented using multiple threads of execution, as described below, frequently need mechanisms to synchronize the execution of their different threads. To facilitate this, OS typically provide a set of synchronization objects, such as critical sections, semaphores, mutual exclusion objects (mutex), events, etcetera. Processes refer to each of these objects either by a numeric identifier, known as a "handle" and assigned to the object by the OS, or through a pointer to a memory block allocated by the process and in which the synchronization object is stored. Most OS track the synchronization objects allocated by each process by keeping a linked list of such objects in the process context.

The MMU and the process environment serve to isolate unrelated processes from interfering with each other. However, in some cases interactions between processes are required and processes are specifically designed to interact. In order to facilitate such interactions between interrelated processes, OS typically provide various inter-process communication mechanisms (IPC), such as named semaphores, mailslots, pipes and shared memory. The OS usually keeps track of the IPC resources used and knows which objects are available to each process; it achieves this by maintaining a table of IPC resources that it has made available to the process.

Since files, synchronization objects, IPC objects and other OS-provided resources are abstractions that exist only to the degree to which they are implemented and made available to applications by an operating system, they are frequently referred to as OS objects or kernel objects.

Using the described virtualized process environments, OS allows multiple programs to use the same numerical memory addresses, file handles and other kernel object identifiers to identify distinctly different resources. For example, the physical memory referred to by memory address 2000 in process A may be different from physical memory referred to by the same address in process B. As another example, file handle 1 in process A may refer to a different file than the one referred to by file handle 1 in process B. To achieve this capability, the OS uses various aspects of the process environment, including data structures such as the memory page map, file tables, resource lists, etcetera. These data structures, together with the physical memory allocated to the process, form the process context.

Virtual Machines

Some computer systems provide specialized execution environments known as virtual machines. The concept of a virtual machine is a further extension of the concept of a process. Virtual machines typically provide ability to execute user programs that cannot be executed directly by the computer's processor (non-native programs). Examples of such virtual machines include the Java Virtual Machine, as well as the x86 emulation environment in Windows NT for MIPS.

Virtual machines are typically implemented in software, and may be user programs running in as separate processes, or made part of the core components of the operating system. They interpret program instructions that are not supported by the processor, and take the actions required by these instructions. In addition, virtual machines often emulate other resources that may not be present in the computer system, such as sophisticated image rendering hardware.

Multithreaded Programs and Thread Switching

Multithreaded operating systems further extend the notion of a process by providing application programs with the ability to define multiple threads of execution which can operate concurrently in the context of a single process, therefore creating an illusion of a virtual computer with multiple processors. Many applications, such as database engines, web servers and parallel calculation technical programs make extensive use of this ability.

In single processor computers, the processor can only execute a single thread at any given moment. However, whenever a thread needs to wait for file or device access, a kernel object or an external event, the operating system can switch to another thread by directing the processor to execute instructions from another thread while the first thread is waiting. In addition, the OS can switch threads on a round-robin basis, so that each thread gets a chance to execute for a fixed amount of time, typically several times in a second. This process is transparent to applications: the threads appear to execute concurrently.

Threads in a process share all the process's resources, including memory, file handles and other OS objects. Each thread has its own stack memory dedicated to it, but accessible to all other threads, and its own copy of most of the processor registers, including the general purpose registers, flags, the stack pointer and the instruction pointer. Threads may also have a small amount of private data space known as thread local storage (TLS). The thread's stack, copy of processor registers and TLS comprise the thread context.

In order to switch to another thread, the OS typically saves the current thread context, including the values of the processor registers as of the time the thread was suspended, in a data structure known as a thread control block, or TCB, which is associated with the thread. The OS then loads the thread context for the new thread by loading the processor registers with the respective values found in the TCB of the new thread, including the value of the instruction pointer, and directs the processor to resume execution with the new thread's registers and instruction sequence.

In computers with multiple processors, the OS has the ability to schedule threads for execution on each of the processors. This makes it possible to execute more than one thread truly concurrently. On such systems, OS typically use a similar thread-switching mechanism to direct each of the processors to execute one or another thread.

Although they are somewhat more complex to develop, multithreaded applications have a number of advantages, including better responsiveness and the ability to react to multiple input events at the same time. Most importantly, a program designed to operate as a collection of large number of relatively independent threads can easily be scaled to run on multiple processors and thus achieve higher performance without further modifications in the program.

Multiprocessor Computer Systems

Despite the continuing rapid advancement in processor performance, the need for computing power tends to outpace the available processor performance. Increased performance is generally needed for one or more of the following three reasons: (a) to facilitate faster completion of programs; (b) to make it possible to process ever growing amounts of data within the same time window, and, (c) to make it possible to respond to external events, such as network communication, in real time. To provide such increased level of performance, many modern computers include more than one processor.

The preferred architecture of multiprocessor computers is the Symmetric Multi-Processor computer (SMP). SMP provides all processors access to the same memory, known as common shared memory, with uniform access time. This architecture is also known as Uniform Memory Access (UMA). The typical interconnect between the processors and the memory is either a system bus or a crossbar switch.

The benefit of the UMA architecture is that parallel programming is greatly simplified, in that processes can be considerably less sensitive to data placement in memory, since data can be accessed in a particular amount of time, regardless of the memory location used to hold it. The UMA/SMP programming model is the preferred model for implementing most parallel applications. Hereinafter, parallel applications using the SMP programming model will be referred to as SMP applications.

As more processors are added in an SMP systems, both the shared memory and the interconnect through which processors access the memory quickly becomes a bottleneck. This bottleneck limits severely the scalability of the SMP architecture to a fairly low number of processors, typically between 2 and 8.

To alleviate the bottleneck typical of SMP architectures, some multiprocessor computers use a non-uniform memory architecture (NUMA). In NUMA computers, each processor is closely coupled with a dedicated memory device which forms its local memory. The combination of the processor and the memory device form a node, sometimes referred as processor/memory complex, or "node".

Additionally, an interconnect between the nodes ensures that each processor can also access not only its local memory, but the memory attached to any other node (remote memory) as well, in a manner transparent to the executing program. Access to such remote memory is typically 10-20 times slower than access to local memory (e.g. 1-2 microseconds vs. less than 60 nanoseconds for local memory).

Instead of having only one processor per node, some higher-end NUMA systems have 2 or 4 processors connected in an SMP configuration in each of the nodes. This allows such systems to have more processors with fewer interconnected nodes.

The benefit of the NUMA architecture is that it is easier to build a system which scales beyond the limitations of the SMP/UMA architecture without changing the application programming model. The drawback of a NUMA system is that performance sensitive programs perform very differently depending on where data is placed in memory (i.e., local or remote relative to the processor that executes the particular thread). This is particularly critical for parallel computation and server programs, which may need to share large amounts of data and state between many threads.

Both SMP and NUMA architectures use real (e.g., physical) memory addresses to request access through both the node interconnect and between the processors and their local memory. In both architectures, the granularity of the processor access to memory (local or remote) is an individual cache line, typically 8-64 bytes.

For certain applications, and with appropriate tuning of the application code, the NUMA architecture allows more processors to efficiently share the computer's memory than SMP does. While typical SMP computers have 2-8 processors, NUMA computers often have 16-64 processors. Both SMP and NUMA computers, however, are limited in the number of processors that can be included in a single computer and share its memory by the huge impact of the interconnect latency on the aggregate performance of the system.

While some 1,000 processor NUMA installations exist, such as the SGI Altix, they depend on an expensive, proprietary interconnect that typically costs more per processor than the actual processors they connect, and scale to a very limited (e.g., 256) number of nodes. Further growth of the systems is limited by a number of fundamental factors, the most significant of which is the need for a store-and-forward switching architecture of the interconnect, which immediately introduces latencies in the order of 10-20 microseconds or more.

There are several approaches to improving the performance of NUMA computers, including modifying the programming model to make programs aware of the non-uniform memory, designing faster-speed and lower-latency interconnects, as well as using large caches.

A software approach to further improving the performance of multiprocessing systems is described in U.S. Pat. No. 6,105,053, entitled "Operating system for a non-uniform memory access multiprocessor system", which is hereby incorporated in its entirety by reference. One aspect of that system is locality management mechanisms for increasing the system throughput.

A hardware approach to further improving the performance of multiprocessing systems is described in U.S. Pat. No. 6,275,900, entitled "Hybrid NUMA/S-COMA system and method", which is hereby incorporated in its entirety by reference. One aspect of that system is a hybrid NUMA/S-COMA system to provide larger caching capability.

These approaches provide only incremental improvements in performance, usually mitigated by the increased complexity of the system and quickly wiped out by advances in mass-produced hardware technologies. Under all three of the existing shared memory multiprocessor architectures (SMP, NUMA and COMA), the interconnect remains a bottleneck, and the extreme sensitivity of the system to the latency of the interconnect limits severely the scalability of multiprocessor computer systems. Further, significant enhancements to computer performance, particularly in the ability to radically increase the number of processors that work concurrently in the same system are needed in order to meet the needs for high-performance computing systems.

Commodity Cluster Systems

An alternative approach to adding more processors to the same computing system is to design the system as a cluster of interconnected computers, each having its own processor, memory, I/O devices, etcetera. One such clustered system architecture is known as Beowulf clusters. In Beowulf, each of the computers runs its own OS and has a separate memory space. The computers are connected using a fast local area network, such as Gigabit Ethernet, Myrinet, or InfiniBand. The computers collaborate by exchanging messages using interfaces such as MPI and/or through distributed shared memory (DSM).

FIG. 1B illustrates a commodity cluster system. The cluster system 150 comprises a master node 151 which is used to control the cluster and provide system services, such as a file system. The master node 151 is connected via an Ethernet network 152 to each of the servers 161-168. The master node 151 may also be connected to other computers outside of the cluster 150. The servers 161-168 perform data processing in the cluster; they may be conventional computers, such as the computer 100 illustrated in FIG. 1A. The servers 161-168 are further connected to an Infiniband interconnect 170 using an Infiniband switch 171. The interconnect 170 is preferably used for MPI exchanges between the servers. One skilled in the art will appreciate that the components and interconnects of the depicted cluster 150 may vary and that this example is not meant to imply architectural limitations with respect to the present invention.

The major benefit of cluster systems is that it is generally easy to build clusters with many processors that can work in parallel. Since large number of nodes can easily be put together into a single system, low-cost, commodity nodes are preferred, reducing radically the total cost of the system. Clusters, therefore, provide large numbers of processors at a very aggressive price point.

Since programs are not counting on being able to access all the memory in the system transparently, the requirements toward the cluster interconnect are lower than in the shared-memory architectures, allowing the number of processors participating in the system to be increased beyond what is available with SMP and NUMA.

Clustered systems are easy to apply to a set of problems known as "parameter sweep" or "data partitioning". In these applications, a large, often multi-dimensional space or data set is divided semi-manually among the computers in a cluster; once the data are partitioned, each computer proceeds independently to work on its designated part of the data set. Examples of such applications include 3D rendering of complex scenes in animation movies and the SETI@home project which utilizes the unused processing time on thousands of desktop PC to search for extra-terrestrial intelligence.

The major drawback of cluster systems is the inability to take advantage of this parallel operation for achieving a common goal, e.g., computation, in the most frequently encountered case, when simple partitioning of the data set is not feasible. This includes most computation and data-intensive problems such as ASIC simulations, weather research, drug discovery, oil and gas exploration, virtual reality, natural language translation, military and security applications, and many others, as well as the vast majority of business applications of computing in the enterprise.

In most applications, harnessing the computing power of a cluster system depends critically on the design and implementation of the software applications, and it is very hard to create parallel programs for clusters. In a typical example, a 512 processor cluster can be assembled and made to work within 1 to 2 months; however, writing and tuning the software to take advantage of this cluster takes between 2 and 5 years.

Typical programming interfaces for interacting between nodes in a cluster include the message passing interface (MPI), the parallel virtual machine (PVM), shared memory regions (SHMEM) and global arrays (GA). All these interfaces require the programmer to break down manually the target application into a number of cooperating applications that can execute in parallel and that need to call interfaces explicitly for each access to remote data or synchronization with another node.

The primary approach to making it easier to write parallel programs for cluster has been to provide cluster management and load-balancing solutions.

One such approach is Single System Image (SSI), for example, as described in [OpenSSI], which is hereby included in its entirety by reference. SSI encompasses a number of management programs and technologies whose goal is to provide the same environment for any application, no matter on which node it is running, including inter-processes communication between processes running on different nodes.

Another approach is Grid Computing, as described in [Grid], which is hereby included in its entirety by reference. Grids are geographically distributed systems that can share resources, using uniform resource directories and security models. However, they do not provide improved computing power to a single process.

Some clusters additionally provide Distribute Shared Memory mechanisms (DSM), allowing processes that run on different nodes to interact using regions of shared memory, similar to the way processes on the same computer interact using IPC shared memory. In practice, however, performance of DSM is often severely limited by the interconnect, and by excessive page thrashing. In addition, DSM introduces subtle and hard-to-diagnose side effects. Because of this, despite being a hot research topic between 1996 and 1999, DSM systems are rarely used today, with users reporting generally negative experiences.

While these systems make it possible to write clustered applications and to virtualize computing resources to certain degree, they fail to make it any easier to write parallel applications that can take advantage of the combined computing power of the nodes in a cluster. As a result, cluster systems still require special, distributed implementations in order to execute parallel programs. Such implementations are extremely hard to develop and costly, in many cases far exceeding the cost of the hardware on which they run.

Also, such implementations are commercially feasible for only a very limited set of computational applications, and specifically are not viable in the cases where the parallel program needs to share large amount of state and can have unpredictable loads—both of which most parallel applications need.

Additionally, even when such implementations are realized, their performance in Beowulf systems have shown sustained utilization of computing resources to be only 5 to 15% of the available computing power.

Distributed Threading Systems

Several approaches attempt to alleviate the difficulty of writing parallel applications for clusters by automating the distribution of programs on a cluster using specialized software.

One approach is described in [Mosix], which is hereby included in its entirety by reference. Mosix is an enhancement of the BSD/OS with algorithms for resource sharing, and specifically using pre-emptive process migration for load balancing and memory ushering.

This system creates a fairly awkward division of migrated processes between a home node that keeps the OS resources (such as files) allocated by the process, and the node that currently executes the process, causing a significant bottleneck for applications that need to access OS resources other than memory during their execution. Further, the system does not in any way make it possible for a single parallel program to use more resources than are available on any single node—it merely migrates whole processes from one node to another.

Another approach is described in [Panda], which is hereby included in its entirety by reference. This system provides a virtual machine that supports implementing runtime systems for parallel programming languages, such as Orca and Amoeba. It requires the hard-to-use message passing and complex explicit coordination of threads running on different nodes on the cluster and is not intended to run native applications.

One other approach is described in [Chant], which is hereby included in its entirety by reference. This system provides a run-time system supporting lightweight threads in a distributed, non-shared memory environment. In its thread groups, called ropes, member threads can reside in different processes on different nodes in the cluster. This system requires programs to be written specifically to use ropes and to communicate with messages between threads. In practice, it does not provide advantages over the standard cluster interfaces such as MPI and PVM.

Yet another approach is described in [Millipede], which is hereby included in its entirety by reference. This system provides thread migration in distributed shared memory (DSM) systems, implemented in user mode in Windows NT, using the Win32 interface. Threads are distributed and migrated between nodes in the cluster, based on the processor load on these nodes.

While this system allows threads to use an explicitly defined shared memory region for interacting between nodes, it does not provide common memory for the process, thus requiring that parallel programs are written specifically to take advantage of it. Further, threads that own system resources cannot be migrated, and threads cannot interact between each other using OS-provided synchronization objects. This combination of features makes the system completely not suitable for practical applications.

One other approach is described in U.S. Pat. No. 5,692,192 entitled "Load distribution method and system for distributed threaded task operation in network information processing apparatuses with virtual shared memory", which is herein incorporated in its entirety by reference.

The system provides execution of tasks (processes) by distributing user mode threads within a distributed task sharing virtual storage space. It also has a user-level thread control mechanism in a distributed task and uses context switching in a user distributed virtual shared memory space in order to distribute the load among the nodes without actually transferring threads within the distributed task. This system deals only with balancing the load among the nodes for memory access only, and it requires that the programs are specifically written to be able to take advantage of the load distribution.

A variation of the above approach is described in [Sudo], which is hereby included in its entirety by reference. This system distributes program-defined user mode threads to pools of kernel-mode threads running on different nodes in the cluster. The system uses methods such as correlation scheduling and suspension scheduling to reduce page-thrashing in a distributed virtual address space shared by all threads in the system.

This system uses a very coarse-grained load balancing, and performs thread migration primarily when a thread is not yet running (because it is not scheduled or it has been suspended from scheduling) to reduce page trashing in its future execution. The system deals only with the issue of load balancing between the nodes for memory access only, and requires parallel programs to be specifically written to take advantage of the load distribution.

Another approach is described in [Nomad], which is hereby included in its entirety by reference. This system provides a combination of transparency of data location, as various other distributed shared memory systems provide, and a transparency of processing location using a thread migration mechanism. The system uses the MMU to provide a page-granularity distributed shared memory space for a process. When an instruction within a thread attempts to access memory that is not present on the local node, the node sends portions of the thread's stack to the node where the memory page resides; the second node decides whether to accept the thread for execution on the second node or to send back to the first node the memory page requested by the thread.

The system does not provide solution to the issue of routing (i.e., how the first node knows which node has the page so it can send the request there), and does not deal at all with resources other than memory. As a result, its applicability is limited to parallel threads that don't use synchronization objects, files and other key OS resources, which makes the system not useable for most practical applications.

Yet another approach is described in [D-CVM], which is hereby included in its entirety by reference. This system uses active correlation tracking in order to better decide how to distribute the threads among the nodes. This system has limitations characteristic of the above described systems. In particular, it requires that threads execute system calls only during the initialization phase in which thread migration is disabled. This significant limitation prevents the use of the system for most practical applications.

One other approach is described in U.S. Pat. No. 6,003,066 entitled "System for distributing a plurality of threads associated with a process initiating by one data processing station among data processing stations". In this system, a global name server generates a unique identification number to each process and establishes a distributed process context which represents a shared address space for the process so that logical addresses of the distributed process are divided among physical addresses corresponding to memory locations in different nodes. Whenever a new thread is to start, the request is sent to the global name server, which chooses a node on which the thread is to run. Additionally, when a thread needs to access memory, it sends request to the global name server which forwards the request to the node where the physical memory resides.

This system provides only static distribution of threads at thread start time, which causes unbalanced load on the system as the execution proceeds. Further, the architecture of the system precludes threads from invoking any OS function that requires access to application-allocated memory buffers, if the memory is on a node different than the one on which the thread runs, thus eliminating the benefit of transparent access to memory for any application that uses storage and/or network communications. In addition, the system's reliance on a global name server for frequent operations, such as memory access, is likely to become a significant bottleneck in the system as the number of nodes and threads increases. As a result, the system is not usable for practical applications.

Yet another approach is described in [Jessica2], which is hereby incorporated in its entirety by reference. This system is a distributed Java virtual machine targeted to execute multithreaded Java applications transparently on clusters. It provides a single system image illusion to Java applications using a global object space layer.

The system further includes a thread migration mechanism to enable dynamic load balancing through migrating Java threads between cluster nodes; such migration is transparent to the application, i.e., it is triggered automatically by the system without explicit instruction from the source program. The mechanisms used in this system are specific to the Java language and virtual machine, and cannot be applied to native programs. This prevents the use of existing native applications on the system and requires that all distributed applications are written in Java and not use native libraries. As a result, the applicability of this system is severely limited, and this limitation is further exacerbated by some of Java's inherent limitations, such as reduced performance due to virtualization and non-deterministic response due to garbage collection.

The problem of scaling performance in multiprocessor computer systems is one of the top issues in computer system design. Solving this problem is key to most further advances in computing technology, business, science, and practically all areas of human existence.

The existing systems, as illustrated above, do not provide a satisfactory solution to this important problem. While a variety of approaches have been tried, none of them has provided a commercially feasible solution that is applicable for a significant majority of applications, or scales sufficiently to even approach the estimated needs for the next five to seven years.

The performance in single processor computers is limited by the advances of technology in electronic chips. While the SMP and NUMA systems provide the correct programming model for parallel applications, implementations of these systems do not scale well due to their extreme sensitivity to interconnect latencies. Moreover, even modest (e.g., 16 processors) NUMA systems have very high acquisition and maintenance costs, require large initial investment and provide very limited incremental scalability. Many applications that need high performance simply cannot afford the economics of such systems. Those that can, such as enterprise data center systems, continue to suffer from the limited scalability of these systems.

Clusters of computers provide the promise of unlimited hardware scalability at commodity prices. In most applications, however, this comes at the expense of very costly and complex software development, which takes years and is feasible only for very limited set of applications. Even after such efforts are undertaken, cluster applications often exhibit poor speed-up of applications, with saturation points well below 128 processors. As a result, sustained software performance on clusters rarely exceeds 10-12% of the peak performance that the hardware can deliver.

Due to the any-to-any connection between nodes, larger clusters suffer from exponential complexity as new nodes are added in the cluster. Clusters do not provide the ability to run SMP applications in a distributed fashion.

Process migration and SSI systems deal only with whole process migration, essentially leaving all the software development complexities extant in cluster systems. These systems do not provide the ability to run SMP applications in a distributed fashion.

Existing thread migration systems provide partial solutions to the problem of load balancing for processing and memory access. This comes, however, at the price of severe limitations on what the distributed applications can and cannot do during their execution; in fact, the very transparency of migration makes it impossible for applications to even attempt to take care explicitly of OS resources that are not supported by the existing systems. None of those systems provides a practical solution to the problem of executing a typical SMP applications, technical or commercial, using the aggregated computing resources of multiple computers in a network.

Virtual machines provide more complete illusion of a common computer. However, each works only for a specific programming language (e.g., Java) and cannot run existing native applications which are written in a variety of languages such as C, Fortran, etcetera.

Virtual machines, in general, tend to impose many limitations on the parallel programs, such as much lower performance and non-deterministic response times. This makes them a poor match for many practical programs, including technical computations, database engines, high-performance servers, etcetera. Further, applications running on distributed virtual machines are severely limited in the native OS resources that they can access, making such virtual machines an impractical solution.

All described approaches are significantly limited in their scalability. Fundamental attendant mechanisms on which those systems are based, such as cache snooping in SMP and NUMA systems, and explicit, any-to-any software connections in cluster systems, result in quadratic increase of complexity when the number of nodes increases. This leads to rapid saturation of the performance capacity, where the addition of more processors or nodes does not result in a notable increase of performance.

There is a clear need for significant improvements in several key areas. These areas include: ability to run native SMP programs transparently on a network of computers and allowing them to use native OS objects and interfaces; ability to run native programs written for SMP computers on a distributed network of computers with little or no modification to the programs; and, most importantly, ability to provide incremental and practically unlimited scalability in the number of nodes in such systems so that sufficient computing power can be made readily and cost-effectively available to a wide range of practical parallel applications.

REFERENCES CITED

U.S. patent Documents TABLE-US-00001 U.S. Pat. No. 5,692,192 November, 1997 Sudo 709/105 U.S. Pat. No. 6,003,066 December, 1999 Ryan, et al. 709/201 U.S. Pat. No. 6,105,053 August, 2000 Kimmel, et al. 709/105 U.S. Pat. No. 6,275,900 August, 2001 Liberty 711/120

OTHER REFERENCES

[OpenSSI] Walker, Bruce. Open Single System Image (openSSI) Linux Cluster Project. http://openssi.org/ssi-intro.pdf.
[Grid] Foster, Ian, et al. The Physiology of the Grid: An Open Grid Services Architecture for Distributed Systems Integration (draft). http://www.globus.org/research/papers/ogsa.pdf.
[Panda] Bhoedjang, Raoul, et al. Panda: A Portable Platform to Support Parallel Programming Languages. In Proceedings of the UNENIX Symposium on Experiences with Distributed and Multiprocessor Systems (SEDMS IV), September 1993.
[Chant] Haines, Matthew, et al. Chant: Lightweight Threads in a Distributed Memory Environment. Institute for Computer Applications in Science and Engineering, NASA Langley Research Center. Jun. 8, 1995.
[Millipede] Itzkovitz, Ayal, et al. Thread Migration and its Applications in Distributed Shared Memory Systems. Technion CS/LPCR Technical Report #9603, July 1996
[Sudo] Sudo, Y., et al. Distributed-Thread Scheduling Methods for Reducing Page-Thrashing. In Proceeds of the Sixth IEEE International Symposium on High Performance Distributed Computing, 1997.
[Nomad] Milton, Scott. Thread Migration in Distributed Memory Multicomputers. Technical report TR-CS-98-01, The Australian National University, February 1998.
[Mosix] Barak, Amnon, et al. The MOSIX Multicomputer Operating System for High Performance Cluster Computing. Journal of Future Generation Computer Systems, April 1998.
[D-CVM] Thitikamol, Kritchalach and Keleher Pete. Thread Migration and Communication Minimization in DSM Systems. In Proceedings of the IEEE, Special Issue on Distributed Shared Memory Systems, vol. 87, no. 3, pp. 487-497, March 1999.
[Jessica2] Thu, Wenzhang, et al. JESSICA2: A Distributed Java Virtual Machine with Transparent Thread Migration Support. In Proceedings of the IEEE Fourth International Conference on Cluster Computing, September 2002.

SUMMARY OF THE INVENTION

It is now, therefore, an object of the present invention to provide a system for executing applications designed to run on a single SMP computer on an easily scalable network of computers, while providing each application with computing resources, including processing power, memory and other resources that exceed the resources available on any single computer.

Aspects of the Invention

The present invention provides such system, called an aggregated grid, as well as a number of innovative components used to build it. These components include an inventive server agent, an inventive grid switch and an inventive grid controller. The invention further provides a scalable, open-systems architecture for high-performance computing systems built from commodity servers and cost-effective interconnects.

Another aspect of the present invention is a method for creating an aggregated process that is distributed transparently over multiple servers and uses up to the full combined amount of resources available on these servers.

Yet another aspect of the present invention is a method for distributing resources of the aggregated process among multiple servers. A variation of this method uses configurable distribution disciplines in order to efficiently distribute the resources.

Another aspect of the present invention includes four methods for transparently providing access to distributed resources for an application, the methods including an RPC method, a thread hop method, a resource caching method and a resource reassignment method.

One other aspect of the present invention is a set of methods and an apparatus for intercepting resource creation and resource access by an application in order to transparently provide said creation and access to the application while distributing the resources among multiple servers. Said methods and apparatus are applicable for a wide variety of OS resources.

Another aspect of the present invention is an aggregated process context that combines multiple process contexts from different servers to present the illusion of a combined, single process context for executing a single parallel application on multiple servers.

Yet another aspect of the present invention is a method for adding servers and grid switches to an existing aggregated grid in order to increase the performance and capacity of the aggregated grid, without interfering with processes already miming on the aggregated grid.

One other aspect of the present invention is a method for establishing a hierarchical structure of grid switches allowing the execution of aggregated processes over an arbitrarily large number of servers in order to achieve a desired level of performance and resources for those processes.

Another aspect of the present invention is a method for efficient assigning of unique process identifiers in the system, which is compatible with existing process identification schemas in a single server and provides unique identification across multiple servers.

Yet another aspect of the present invention is a uniform set of methods for saving and restoring the state of resources, so that any resource can be saved and restored in a generic way, without knowledge of the resource type specifics. The method is further expanded to allow moving of resources from one server to another while preserving the state of said resources.

Another aspect of the present invention is a method for load rebalancing between servers in order to achieve higher performance for an application and better utilization of the servers.

Yet another aspect of the present invention is a method for changing the number of servers used to run a single application so that the maximum performance can be reached with the minimum number of servers being used.

One other aspect of the present invention is a method for transferring the control of processes from one grid switch to another, so that the load between multiple grid switches can be balanced and grid switches can be shut down for maintenance without interfering with processes running in the system.

Another aspect of the present invention is a method for automatic, transparent checkpointing of applications, allowing applications to continue after a system failure.

Yet another aspect of the present invention is a method for including servers with different processor architectures, including legacy servers, as servers in the aggregated grid.

System Advantages

A first advantage of the present invention is the ability to build a scalable parallel computing infrastructure using mass-produced, commodity-priced network infrastructure and computing servers. Such systems have much lower price/performance ratio than comparable high-end RISC servers and mainframes.

Another advantage of the present invention is the ability to build parallel computing systems with very large amount of memory that can be available and appear as memory of a single SMP computer to even a single application.

Yet another advantage of the present invention is the ability to build parallel computing systems with a very large number of processors that can execute in parallel threads of even a single parallel application built using the preferred SMP/UMA programming model.

One other advantage of the present invention is the ability to build parallel computing systems with very large number of I/O devices that allow the system to have very high I/O throughput (e.g., network, video/audio streaming, sensor processing, etcetera), while being programmed simply, using the preferred SMP/UMA programming model.

Yet another advantage of the present invention is a scalable parallel computing system built as a network of mass-produced computers that can execute existing and future applications built for the more expensive and limited-scalability SMP/NUMA and high-end RISC server systems and provide similar or higher performance than those systems. Such applications can be built using the preferred SMP/UMA parallel programming model and require little or no modification to the application code in order to run an aggregated grids.

Another advantage of the present invention is the ability to manage the network of computers that make up the aggregated grid as a single server, using standard management tools and applications. This results in lower entry barrier, easier management, and lower total cost of ownership of the system.

Yet another advantage of the present invention is the provision of a scalable parallel computer system the performance and capacity of which can be easily changed in a dynamic range of values. This capability allows lower entry barrier for such systems, starting with as little as two computing servers and a single grid switch and growing the aggregated grid to thousands of servers and hundreds of switches, as additional computing power is desired.

One other advantage of the present invention is the provision of a scalable parallel computer system in which additional performance and capacity can be obtained by expanding the system with additional servers and switches rather than replacing the system. This removes the need for forklift upgrades and results in lower cost and uninterrupted business operation.

Another advantage of the present invention is the provision of a highly scalable parallel computer system in which resource overprovisioning is not necessary. This allows the owners of the system to add performance at a lower cost since additional servers can be purchased at a later time (at lower cost), resulting in a lower system price and better return of investment.

Yet another advantage of the present invention is providing architecture of a scalable parallel computer system that can be implemented and deployed by system integrators or other engineers who are familiar with networks and cluster systems using their existing skills and without requiring complex supercomputing and/or mainframe skills and knowledge.

One other advantage of the present invention is the provision of a parallel computer system which executes existing cluster applications with much higher performance, resulting in lower cost of cluster systems and faster completion of computing tasks.

Another advantage of the present invention is the provision of a scalable, high-performance parallel computer system at a significantly lower price, which allows such systems to be implemented and owned by departments and workgroups (as opposed to data centers). This allows departments and workgroups to have easier access to high-performance parallel computing and tailor the characteristics and power of the system to their specific projects.

Yet another advantage of the present invention is the provision of a scalable, high-performance parallel computer system with significantly lower price which allows existing business models to be executed with lower capital requirements. For example, biotechnology, simulation and design startups will require lesser capital investment in computer systems without reducing their computing capacity, and will have the ability to achieve their results faster. Further, such lower cost systems enable new business models, previously not feasible due to high entry barrier or capital requirements exceeding the business opportunity; for example, individuals or companies that develop applications can provide access to these applications using the application service provider model on a subscription or pay-per-use basis, and starting with very small systems and scale their infrastructure quickly to match sales demand.

One other advantage of the present invention is enabling the vendors of mass-produced computer systems to sell greatly increased amount of their products to a market currently unavailable to them, displacing the more expensive and limited high-end RISC servers and mainframes. This also enables the vendors who produce and sell components of such mass-produced systems to significantly increase their sales; such vendors include processor and other chip vendors, board vendors, interconnect switch and host adapter card vendors, etcetera.

Another advantage of the present invention is enabling the vendors of software for high-end RISC servers and mainframes to increase the sales of their products as the lower cost of aggregated grids increases the number of high-performance parallel computer systems that are deployed and needing such software.

Yet another advantage of the present invention is the ability to partition a scalable multiprocessor computing system built as network of separate computers, so that a given application will execute on no more than a specified number of computers with a specified maximum number of processors. Because some software applications are licensed per processor and require a license for each processor which may execute the application, the ability to limit the number of processors for a given application allows minimizing the software licensing costs for such applications to match the performance needed by the application rather than to the total number of processors present in the computing system.

Other Advantages

Another advantage of the present invention is a method for aggregating the computing resources of multiple computer systems and providing such aggregated resources to applications transparently, so that the applications can be built using the preferred SMP/UMA programming model and utilize the aggregate amount of resources.

One other advantage of the present invention is an apparatus for aggregating computing resources using the above mentioned method.

Yet another advantage of the present invention is a system of computers in a network that allows the execution of parallel computing programs utilizing the aggregate of the computing resources of the computers that make up the network.

Another advantage of the present invention is a method and apparatus for providing access to computing resources distributed among multiple computers to a single application process.

One other advantage of the present invention is a method and apparatus for scaling the performance and capacity of parallel computing systems using intelligent grid switches.

Yet another advantage of the present invention is a method for thread hopping using a single network frame and transferring a single page of the thread's stack.

One other advantage of the present invention is a method for accessing remote resources that is specifically designed for grid interconnects with higher latency, so that commodity and cost-efficient interconnects can be used, and that such interconnects can use multiple layer 2/3 switches to scale the system to arbitrarily large number of servers.

Another advantage of the present invention is a method and apparatus for presenting the aggregated grid, which is a network of separate computers, as a scalable parallel processing system that appears as a single computer for the purpose of management and can be managed using tools and applications built for single computers.

Yet another advantage of the present invention is a uniform method for accessing computing resources in a network of cooperating computing servers. The method allows dynamic reassignment and caching of resources, as well as thread hopping, and enables parallel applications to access all types of computer and OS resources which are distributed among multiple servers.

One other advantage of the present invention is a method for proving access to remote resources for the purpose of executing binary instructions in CISC computers, which instructions refer to two resources that reside on different computer servers.

Another advantage of the present invention is the ability to control the resource aggregation and resource switching in the aggregated grid using rules and policies defined specifically for certain applications.

Yet another advantage of the present invention is the ability to dynamically partition a scalable high-performance computing system using rules and policies, designating that certain applications run on certain subsets of the servers in the system, providing assured quality of service and protection among parallel programs.

One other advantage of the present invention is the ability to automatically and transparently checkpoint an application, without the application having program code specifically for checkpointing, so that the application can continue execution from a last recorded checkpoint after a system failure.

BRIEF DESCRIPTION OF THE DRAWINGS

The various embodiments, features and advances of the present invention will be understood more completely hereinafter as a result of a detailed description thereof in which reference will be made to the following drawings.

DESCRIPTION OF THE PREFERRED EMBODIMENT

1. System Overview

The preferred embodiment of the present invention will now be described in detail with reference to the drawings.

Purpose of the System

The main purpose of the inventive system is to execute applications designed to run on a single SMP computer on an easily scalable network of computers, while providing each application with computing resources, including processing power, memory and others that exceed the resources available on any single computer.

Symmetric multiprocessing (SMP) model is the only programming model known in the art in which complexity and costs of developing software that can scale linearly on a system with hundreds of processors is not much different from the complexity and costs of building software that scales to two processors. Since modern servers and high-end workstations routinely include at least two processors, the symmetric multiprocessing model is already widely adopted and well understood.

By executing SMP applications on a network of computers, the inventive system takes advantage of the inherent unlimited scalability of the networking interconnect, making it easy and inexpensive to scale applications to any desired performance.

Since the inventive system scales easily to large numbers of network nodes, it does not require particularly high performance from each individual node. Thus, the inventive system can be used to build the equivalent of today's expensive high-performance computing systems at a significant cost advantage, by combining commodity computers and commodity networks.

The inventive system can be initially built with few computers and a simple network. As performance needs increase over time, the system can be easily upgraded by adding more computers and more interconnect bandwidth. Thus, the inventive system eliminates the need to over-provision hardware in advance, and lowers significantly the entry barrier for acquisition of high-performance computing systems.

The inventive system also provides the ability to execute already existing software applications designed for today's expensive high-end computers with little or no modification. This makes it possible to replace the expensive equipment with a network of commodity computers while preserving the huge existing investment in software.

Physical System

Figure 1A:
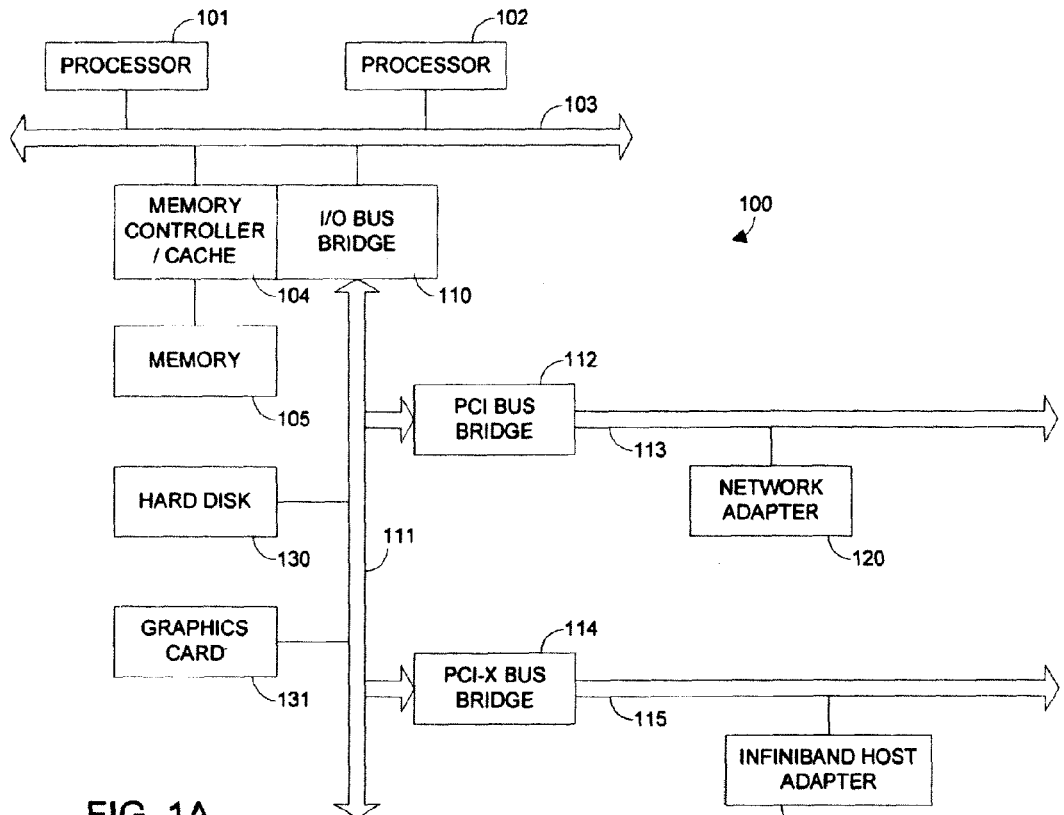
FIG. 1A illustrates a conventional computer system.
Figure 1B:
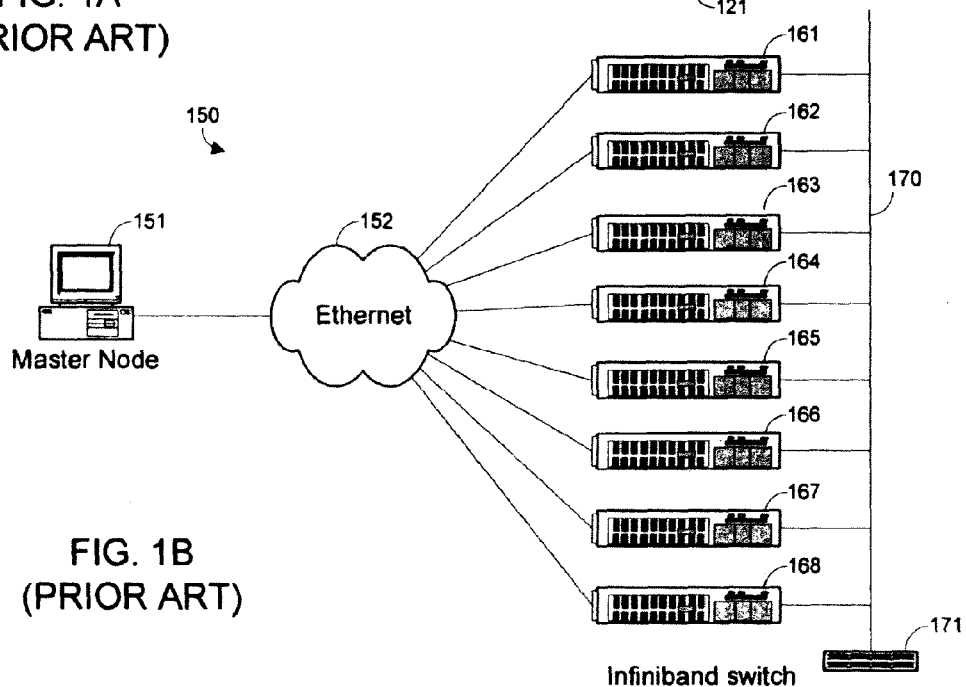
FIG. 1B illustrates a commodity cluster system.
Figure 2:
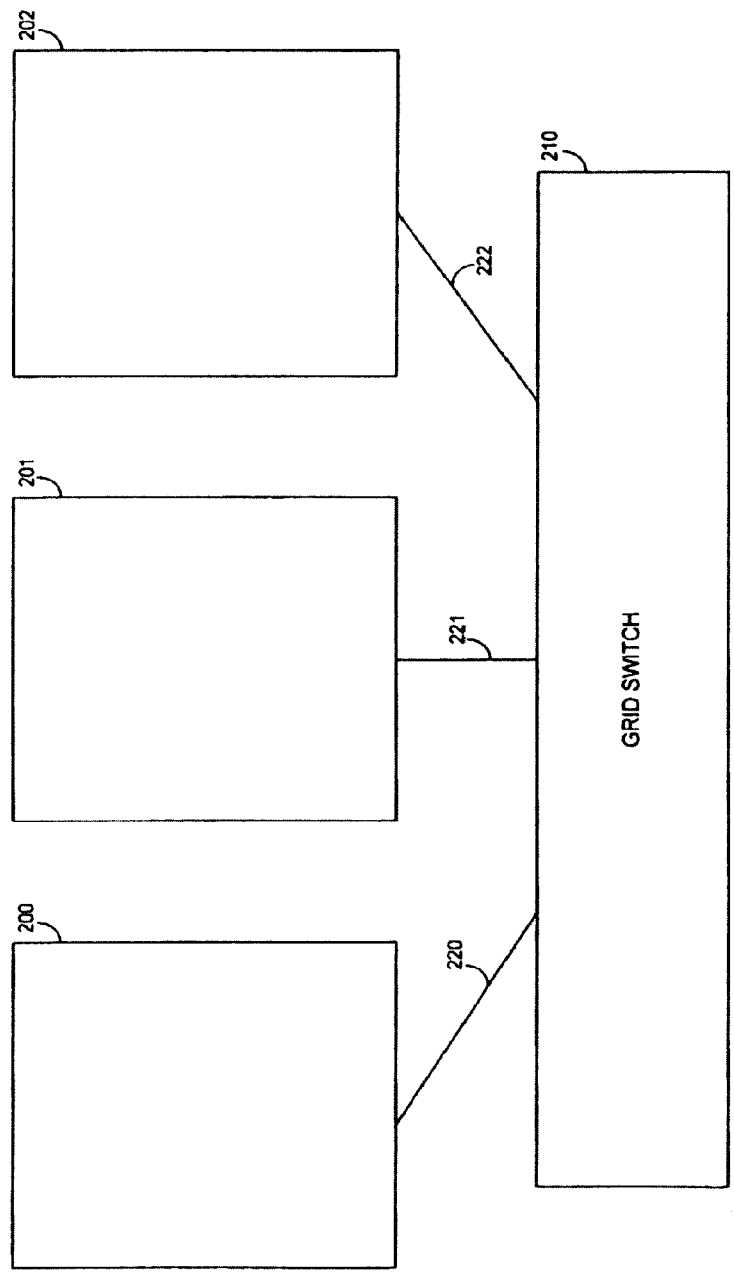
FIG. 2 illustrates the physical aspect of the inventive system.

FIG. 2 illustrates the physical composition of the preferred embodiment of the inventive system, also known as "aggregated grid". The system comprises servers 200, 201 and 202; a grid switch 210; and a grid interconnect, formed by the network connections 220, 221 and 222. The connections 220, 221 and 222 are preferably direct connections, such as using cable or fiber, between the servers 200, 201 and 202 and the grid switch 210.

Servers. The servers 200, 201 and 202 are general purpose computers, each consisting of one or more processors, memory and I/O devices. Examples of such computers include the 64-bit Intel Itanium 2-based Hewlett-Packard Integrity Server rx2600, and the AMD Opteron-based Newisys 2100 Server. Each of the servers 200, 201 and 202 is further equipped with a host adapter for the grid interconnect. Examples of such host adapters are the Intel™ PRO/10 GbE LR Server Adapter from Intel, and the InfiniHost-based MTPB23108 host channel adapter card from Mellanox Technologies.

Grid Switch. The grid switch 210 is preferably a computing appliance specially programmed according to the present invention. It is based on a multiprocessor computer, consisting of multiple 64-bit processors, memory and I/O devices. The grid switch is further equipped with high-performance peripheral interconnect and multiple host adapters for the grid interconnect. For example, the grid switch may be a 4-processor AMD Opteron-based computer with 32 GB RAM and 2-4 grid interconnect host adapters.

Interconnect. The grid interconnect is a network that provides communications and data transfer between the servers 200, 201 and 202, and the grid switch 210, collectively referred to as nodes. The grid interconnect is preferably a network capable of transferring data between the interconnected nodes at speeds comparable to the speed with which a processor can access its local memory within a single computer. Examples of such networks include 10 Gigabit networks (e.g., 10 Gigabit Ethernet and 4.times. Infiniband), as well as some slower but low-latency networks (e.g., Myrinet).

Interconnects with lower latency are preferred for the network connections 220, 221 and 222. However, unlike prior art systems, the design of the inventive system is specifically tailored to work efficiently even with higher latency networks, such as switched Ethernet.

While the illustrated embodiment of the inventive system comprises three servers and a single grid switch, one skilled in the art will appreciate that the system can be extended to contain many more servers and grid switches. In such larger systems, the interconnect is preferably based on one or more layer 2/3 switches, allowing servers and grid switches to be interconnected. Examples of such switches include the E1200 switch with LC-EE-10GEL-2Y line cards from the Force 10 Networks, and the Topspin 360 from Topspin Communications.

Logical System

Figure 3:
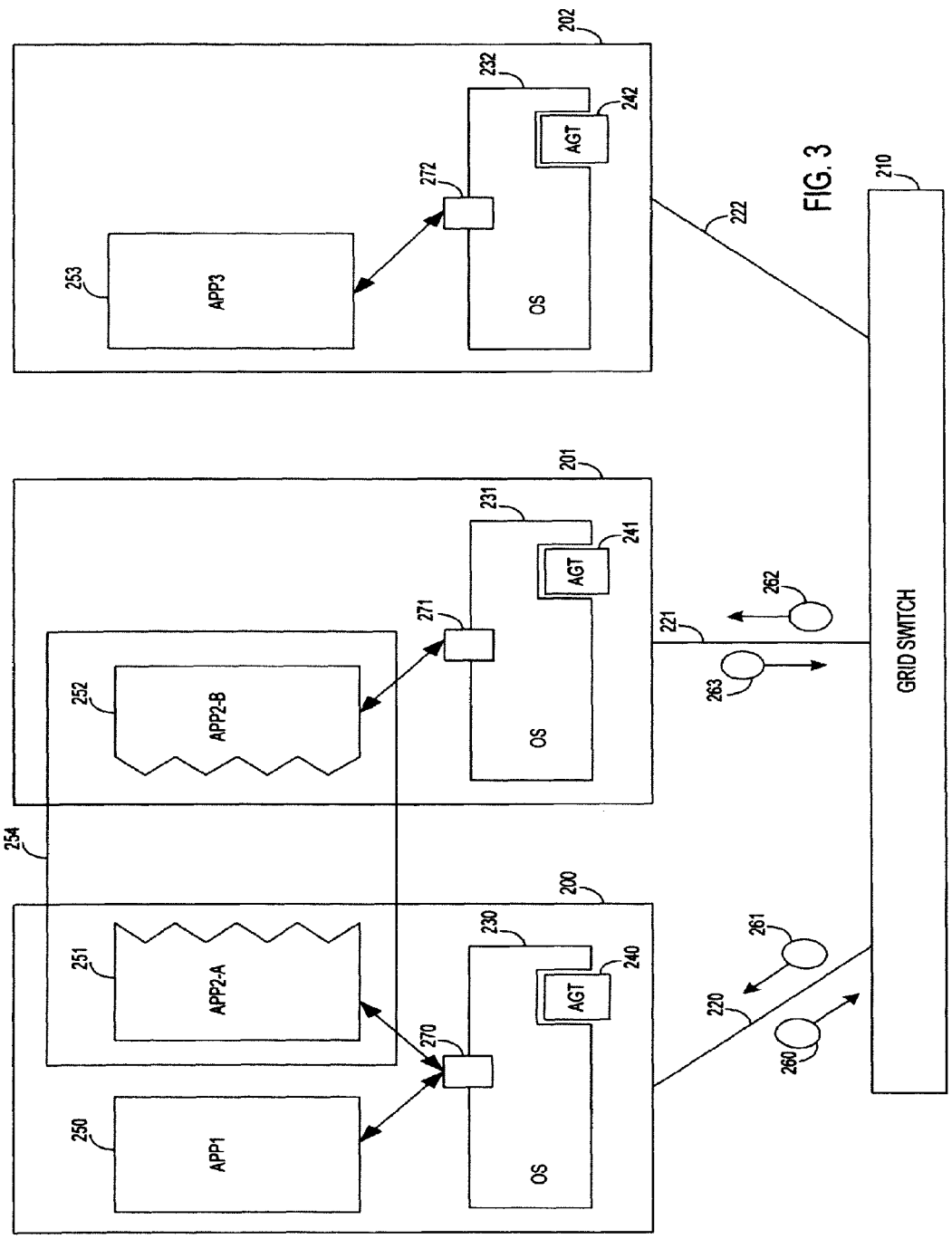
FIG. 3 illustrates the logical aspect of the inventive system.

FIG. 3 illustrates the logical aspects of the inventive system. Each of the servers 200, 201 and 202 is programmed with and executes an operating system 230, 231 and 232, respectively; an inventive agent 240, 241 and 242, respectively; one or more applications, and any other software that a server is typically programmed to execute. The operating systems 230, 231 and 232 are preferably instances of the Linux operating system, such as the SuSE Enterprise Server 8 for AMD64 with kernel 2.4.19-SMP.

Applications

Further, each of the servers 200, 201 and 202 executes one or more applications. The application 250 is a standard application and executes as a conventional process on server 200. The application 253 is a standard application and executes as a conventional process on server 202. The application 254 is an application that executes as the inventive aggregated process running contemporaneously on the servers 200 and 201.

The operating system 230 on server 200 sees the application 254 as a conventional process 251; the operating system 231 on server 201 sees the application 254 as a conventional process 252. In the inventive system, the processes 251 and 252 are called member processes of the aggregated process 254. The processes 250 and 251 interact with the operating system 230 through the API 270; the processes 252 and 253 interact with the operating systems 231 and 232, respectively, through the API 271 and 272, respectively.

From the standpoint of the application 254 and its program code, the application 254 executes as if it was running on a single server that has the combined computing resources of the servers 200 and 201. For example, if each of the servers 200 and 201 has 2 processors, the application 254 can have up to 4 threads running concurrently, as if they were executing on a single SMP server with 4 processors. Further in this example, if each of the servers 200 and 201 has 4 GB of available memory for executing applications, the application 254 will find that it can access up to 8 GB of memory (without causing the operating system to page memory to disk).

The execution of the application 254 in this advantageous fashion is provided by the inventive system and does not require that the application code explicitly divide its threads and memory usage so that they can be run on independent servers. This division is automatically provided by the inventive system transparently to the application 254, thus simplifying the programming of the application 254 and allowing dynamic determination of the number of servers on which the application will be executed.

Agents

The agents 240, 241 and 242 preferably intercept the operating system API 270, 271 and 272, respectively, in order to track resource requests made by processes that run on the servers 200, 201 and 202, respectively. The agents further communicate with the grid switch 210 using messages 260-263 through the connections 220, 221 and 222, and any suitable network interaction protocol, such as TCP/IP, to ensure proper addressing, reliable message delivery, and proper sequencing of messages.

When the process 251 makes a resource request to the operating system 230, the agent 240 running in the same server intercepts the request and may pass it either to the operating system 230 or to the grid switch 210. Agents pass requests to the grid switch by forming messages such as the message 260 and sending them to the grid switch 210.

The agent 240 may further receive requests from the grid switch 210 in the form of messages, such as the message 261. In response to such requests, the agent 240 interacts with the operating system 230 in its server regarding access to computing resources or affecting the context of the processes running in the server (e.g., sending signals to the processes, creating a new thread, completing an API call, etcetera).

The purpose of the agents 240, 241 and 242 is to provide transparency of resource access and distribution for the application code of applications running on the servers 200-202, and transparency of application distribution for the operating systems on these servers, so that (a) the applications' code doesn't need to be modified to execute on the inventive system, and (b) the operating system code doesn't need to be modified (other than by installing the agent) to execute on the inventive system.

Grid Switch

The grid switch 210 interacts with the agents 240, 241 and 242. It receives messages, such as 260 and 263, containing resource requests; and sends messages, such as 261 and 262, containing responses to resource requests, as well as requests to the agents. The grid switch 210 switches each request it receives from the agents, generally by forwarding the same request, or by generating a different request, to an agent on a different server.

In general, the grid switch handles requests from a server in one of the following ways: (a) satisfy the request itself; (b) forward the request to another server; (c) form a new request and send it to another server, or (d) generate multiple requests and send them to some or all of the servers. Further, the grid switch may wait for a response from all the servers to which it forwarded a request before responding to the original request, or wait for a response from at least one such server.

One of the key functions of a grid switch involves tracking and controlling the following activities performed by applications in the inventive system: (a) process creation; (b) resource allocation; and (c) resource access across servers.

Process Creation. Whenever a grid switch receives a process creation request, it preferably first determines whether the new process will execute on a single server (as a conventional process) or on multiple servers (as an aggregated process). When it chooses the conventional process option, the grid switch then selects the particular server on which the process will be created and forwards the process creation request to that server. When the grid switch chooses the aggregated process option, it then selects the subset of servers on which the aggregated process will execute, and submits a process creation request to each of the selected servers, thereby causing the member processes to be created.

Resource Allocation. When a grid switch receives a resource allocation request, it preferably selects a server on which the new resource is to be created and forwards the allocation request to that server. Additionally, it remembers on which server the resource was allocated, so it can direct future access requests for the resource to that server. By selecting the server for each resource allocation request in accordance with a specific policy or algorithm, the grid switch can balance the resource utilization across the servers of the inventive system.

Resource Access. When a grid switch receives a resource access request, it locates the server on which the resource was allocated and forwards the request to it. Additionally, the grid switch may modify the request in order to allow for caching and other access options described further in this disclosure.

Although the described system runs only three applications (250, 253 and 254), one skilled in the art will appreciate that each of the servers can run any reasonable number of applications, each application running either as a conventional process or as an aggregated process.

Process Identification

In modern operating systems, processes are identified by unique numeric identifier known as "process ID". This allows operating systems to distinguish processes running in a computer and uniquely identify such processes.

Process ID assignment in operating systems such as Linux is quite complex and involved. The operating system, as well as accepted programming practices, place requirements on how long a process ID of a terminated process must remain unused in order to minimize the potential for ID conflicts. To satisfy these requirements, the operating system often utilizes complicated algorithms for generating process ID, which make the generation of a new process ID a time-consuming operation. Even with recently improved process ID generation algorithms using hash tables, the algorithms still require a search through the table of all existing processes on the server in order to ensure uniqueness of each new ID.

Since the inventive system distributes and aggregates processes across multiple servers, it preferably requires the processes to be identified by a process ID that is unique within the whole system, not only within any of the servers. Due to the scalability requirements to the system, generating the process ID on a system-wide basis by using an algorithm similar to the one used by an operating system on a server would result in prohibitively long time for creating new processes.

For this reason, the inventive system provides means for generating process ID that (a) ensures that process identifiers are unique within the system, (b) does not require the search through all existing process identifiers in order to generate a new process ID, and (c) does not require a centralized service for generating process IDs in the system which can quickly become a bottleneck.

In the preferred embodiment, each server is assigned a numeric identifier, known as a "server ID", which identifies that server uniquely among all servers in the system. The servers use their server ID to generate a unique numeric identifier (ND) for each process.

The server, on which the process creation originates, assigns a process ID to the process that is about to be created. To ensure the uniqueness of the process ID across the system, the server creates the new process ID by combining its own server ID, which is guaranteed to be unique in the system scope, with a locally assigned process number that is guaranteed to be unique within this server. The locally assigned process number can be assigned in a variety of ways, and preferably using the existing process ID generation mechanism in the operating system which already guarantees uniqueness within the single server and compliance with the requirements for ID reuse.

A 64-bit process ID is preferably computed by putting the server ID in the high-order 32 bits of the process ID and putting the server's locally assigned process number in the low-order 32 bits of the process ID. This way, the resulting process ID is guaranteed to be unique within the system without having to verify its uniqueness by comparing to all other process identifiers of running processes. Since each server generates it own process identifiers for the processes it initiates, there is no central service that can become a bottleneck.

One skilled in the art will appreciate that other embodiments of the invention can use different ways for combining the system-wide server ID and the locally assigned process number in order to create a system-wide process ID, and that the invention applies equally regardless of the particular way of such combination. Equally, one skilled in the art will recognize that a different schema for generating process ID can be used, as long as the schema guarantees that the resulting process identifiers will be unique within the scope of the whole scalable system in a way that scales well with the system.

For applications that run as aggregated processes, the process ID of the aggregated process is assigned in the same way by the server that initiates the process creation. The assignment of process ID is independent of whether the process is going to be created as a conventional process running on a single server or as an aggregated process running on multiple servers.

Once the process ID is assigned to an aggregated process, all its member processes are preferably assigned the same process ID. For example, if the aggregated process 254 is assigned a process ID of 8 by the server that initiated its creation, then the operating system 230 will have the member process 251 identified by the process ID of 8, and the operating system 231 will have the member process 252 identified by the process ID of 8.

The identification of all member processes of an aggregated process by one and the same common process ID ensures proper operation of the applications which now don't need to be aware that the aggregated process executes on different servers as multiple member processes. It further facilitates the proper operation of the operating system in various functions that use process identifiers, such as security checks, signals, etcetera.

Further, the schema for generating process ID in the inventive system fits within the existing model for process identification and allows the use of existing management and monitoring tools to observe and manage the operation of the whole system without additional expense for creating and learning new tools.

Summary

This section identified and described the physical and logical entities that comprise the inventive system, as well as their relationships and typical interactions. We also described the inventive aggregated process and the inventive grid switch. The inventive system uses grid switches and servers to execute applications as aggregated processes running on multiple connected servers, generate proper process identification for those applications, and provide them with the sum of the resources available on all of the servers within the system. In the following sections we will describe the operation of the system as a whole as well as the operation of the grid switch in more detail.

2. Operation of the System

This section describes the operation of the inventive system, with emphasis on how the system transparently aggregates the computing resources of multiple servers to make them available to individual applications.

First, this section provides an overview of what computing resources are and how access to them is intercepted at the server transparently for the application.

Then, this section describes the inventive aggregated process context that keeps the resource state information about applications that run as aggregated processes.

Further, this section describes how the inventive system distributes application's resources across the servers in order to achieve aggregation of the computing resources of the servers.

Finally, this section describes how the inventive system provides access to the computing resources during the execution of the application, including the mechanisms of thread hopping, resource caching and reassignment, so that the application will access the distributed resources transparently, in the same way as it would access them if they were available on a single server on which the application executes.

Resources

Computing resources are preferably the key entities that are being managed in a computing system. They are objects which applications request from the operating system and release back to the operating system when no longer needed. It is important to note that the preferred way for an application to obtain resources is to obtain them from the operating system.

Resources, regardless of their type—memory, files, synchronization objects, etcetera,—can be divided in two key kinds: transparent and opaque.

Transparent resources are objects whose structure is open and visible to the application. Applications are responsible to allocate the memory required to hold such resources and identify each such resource by a pointer to the memory holding the resource. Applications access transparent resources by primarily by manipulating the memory directly and, sometimes, by calling API functions to manipulate the resources.

Opaque resources are objects whose structure is hidden from the application. Applications create such objects by calling API functions; the memory required to hold such objects is allocated by the operating system during that API call. Applications identify opaque resources by numeric identifiers, known as handles, which are returned by the creation API function and access them by calling other API functions that manipulate them.

With the exception of memory, which is always a transparent resource, all other resource types can be either transparent or opaque; the choice generally depends on the design of the operating system and runtime libraries in a particular system. For example, in Microsoft Windows, memory and critical sections are transparent resources; files and semaphores are opaque resources. In Linux, memory and semaphores are transparent resources; files are opaque resources. Some resource types may have both a transparent and opaque version in the same system; for example files in Linux can be identified either by a transparent FILE structure or by an opaque file handle.

For each type of resource, regardless of whether it is of the transparent or opaque kind, there is a particular way to create or allocate a unit of the resource, and to destroy or deallocate it. For example, memory is being allocated by calling the malloc( ) function and freed by calling the free( ) function. File objects are being created by calling the open( ) function and destroyed by calling the close( ) function.

The creation function is generally called a "constructor" for the resource, and the destruction function is generally called a "destructor" for the resource. The remaining functions for manipulating a certain type of resource are called "accessory" or "methods".

Variations

Since many different approaches to identifying and accessing resources have been developed through the years of practice, the following four paragraphs describe four key variations of resource transparency and creation/destruction methods. These and other variations are consistent with the descriptions herein and do not limit the applicability of present invention to such variants.

Some transparent resources, such as critical sections in Win32, have their internal structure partially or fully obscured from the application's code. Like regular transparent resources, they are stored in memory provided by the application and the application knows the amount of memory required to store the resource, but it doesn't see the internal structure of the resource; these resources are usually defined as structures with reserved fields. Applications access these resources by calling API functions, such as InitializeCriticalSection( ), EnterCriticalSection( ), rather than by directly manipulating the resources in memory.

Due to memory's central role as a resource and as a holder of other resources, memory is treated somewhat differently from all other resources. Most modern operating systems allocate physical memory resources to applications not on the malloc( ) call, but later, on application's first access—usually a write access detected by the MMU—to a memory location within a given memory page. For physical memory allocated in this fashion, the first accesses the operating system to invoke the constructor automatically.

Certain types of memory space are allocated to applications automatically by the operating system: code and static data are allocated upon start of the application and freed at termination; thread's stack is allocated upon start of the thread and freed at its termination. The constructor and destructor for these resources are implicitly invoked by the code that causes such allocation/deallocation: i.e., the process/thread start and termination.

Certain libraries in object-oriented languages provide automated creation and destruction of resources for resource objects placed statically or on the stack; an example is the CComAutoCriticalSection class in Microsoft Visual C 6.0 ATL library. This variation does not change the nature of the resource allocation/deallocation—these operations are performed by the library object the same way as they would be if the application is not using that library (i.e., the library can be considered part of the application's code); the constructor and destructor for the resource in this case just coincide with the constructor and destructor of such class.

Intercepting Resource Access

When operating as a conventional process in a single server, all resources used by an application are locally available on the server (Except remote files, network connections, etcetera, which are remote resources that are represented in the server by corresponding local resources and the correspondence is already provided in the operating system). Such applications, as represented by each of their threads, access such local resources by either manipulating memory directly or by calling API functions provided by the operating system.

In the inventive system, resources used by a single application that runs as an aggregated process are distributed across multiple servers. An application's thread running on one server can access the same way only the resources that are local to its server; the access to resources of the application that reside on different servers is provided by the inventive agent transparently to the thread.

In order to provide such transparent access, the agent intercepts the access to all resources used by an application. The agent does this by intercepting the various ways in which resources are accessed, including memory manipulation and API functions.

Intercepting Access to Memory Resources

The agent intercepts access to memory (as well as to transparent resources manipulated by directly accessing memory), by intercepting the page fault exception raised by the MMU when the application thread tries to access a memory page that is not mapped in the application's address space, i.e., is not locally allocated on the same server.

A page fault exception handling code in the agent is provided with sufficient data to determine which process is requesting the access (by process ID), which thread within that process, and which memory page is needed for access—which is all the access-specific information the agent needs in order to forward the access request to the grid switch.

Figure 4:
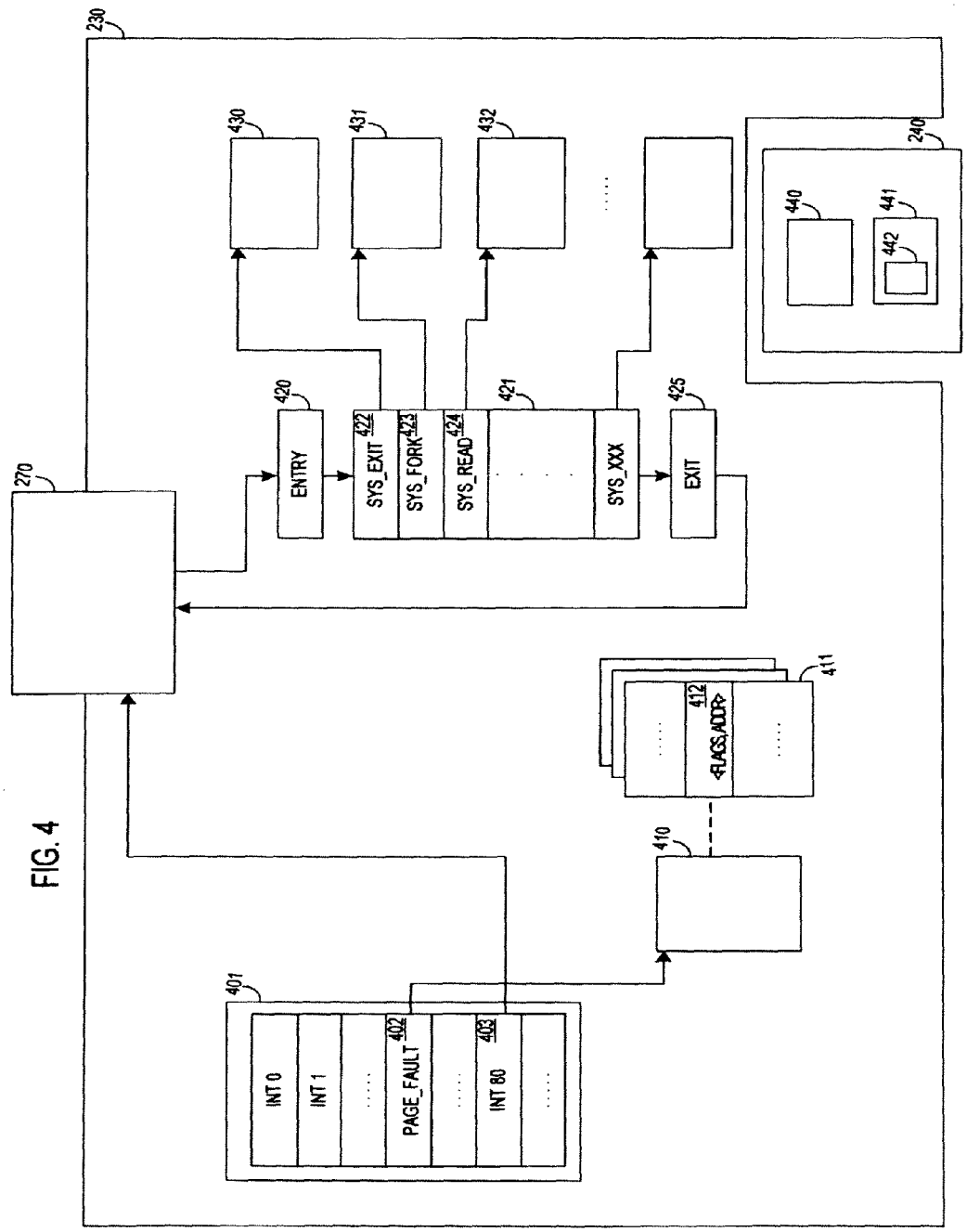
FIG. 4 illustrates resource access interception mechanisms used by the inventive agent.

FIG. 4 illustrates the memory interception mechanism, as provided by the agent 240 for threads executing in the server controlled by the operating system 230.

The operating system 230 preferably provides an interrupt dispatch table 401 used to define for the processor what handler functions need to be invoked whenever various interrupts or faults are detected by the processor. The table 401 preferably consists of handler pointers (vectors) indexed by the fault number, with each vector pointing to the specific code to be executed for that fault number.

For example, in Intel x86 processors, the fault number for page fault is 14. This means that the vector 402 for the page fault handler is at position 14 in the table 401. Before the agent is installed and loaded, the vector 402 contains a pointer to the standard OS handler 410 for page faults; that handler uses the memory page table 411 for the process, having entries 412 for each memory page used to keep the state for that page.

Once the inventive agent is loaded, it changes the vector 402 to point to the agent's handler 440 for page faults. The handler 440 has access to the page table 411 and its page entries to manipulate the state of memory pages and the memory mapping for the process. The handler 440 also has the original pointer from vector 402, so that the handler 440 can invoke the original page fault handler 410 when needed. This replacement of the vector 402 by the agent provides the agent with the ability to intercept memory accesses, and more specifically, intercept them only when the memory is not locally present.

There are three aspects of this interception: interception of the constructor, interception of the destructor and interception of access.

For memory resources, interception of the constructor happens by a page fault occurring when a thread from the application accesses a memory page that has not been accessed by other threads before. That means that the first access to a page by any of the application's threads is the cause of invoking the constructor. The agent forwards the access request to the grid switch, which determines that this is the first time any thread, on any server that runs this application, is accessing the particular page, and allocates the page; more details on the allocation/distribution of resources are provided further in this disclosure.

The destructor for memory pages is preferably implicit—when a memory page is no longer needed, it is freed. This happens typically on termination of the application, on freeing of a large memory segment, etcetera. Note that memory pages are not considered destroyed as long as at least one server holds the contents of the page, i.e., just unmapping the page from a particular server is not considered a destruction of the page.

Access to memory pages is intercepted by the page fault occurring when a thread from the application accesses a memory page that has previously been accessed by this or other thread of the application and is already allocated, but is not presently mapped on the server on which the thread runs. The agent forwards the access request to the grid switch, which determines how the access will be provided. If the grid switch provides the data of the memory page in response to the agent's request, the agent maps the provided memory page in the address space of the member process and resumes the thread, similarly to the way a virtual memory handler in the standard OS does that when it recovers a memory page that has been swapped to disk.

The interception mechanism provided by the agent is independent from the virtual memory mechanism provided by the OS. In simpler systems, the agent may disable virtual memory completely; in other systems, the agent may work in parallel with the virtual memory mechanism, allowing memory pages to be stored on disk without changing the intercept behavior and allowing the virtual memory manager to manage the physical pages mapped in the server.

Intercepting Access to Resources Available Through OS API

The agent intercepts access to opaque resources, as well as to transparent resources that are available through OS API, by intercepting the OS API calls used to access such resources. The OS API calls are also known as "system calls".

In modern operating systems, applications invoke OS API by executing a software interrupt and providing a function number and arguments in various processor registers. For example, in Windows for Intel x86 the software interrupt for accessing OS API is INT 0x2E and the function number is specified in the EAX processor register; in Linux the interrupt is INT 0x80 and the function number is also specified in the EAX register.

Still with reference to FIG. 4, when an application thread from the member process 251 executes the OS API software interrupt, the processor indexes the interrupt table 401 with the software interrupt number and locates the vector 403 pointing to the API handler 270 for system calls. The code in the handler 270 performs certain common entry functions 420 (e.g., checks that the specified function number is valid), then indexes a service table 421 with the specified function number to locate the pointer to the handler for the requested system call. The handler further invokes that function and upon return from the system function performs some common exit functions 425. It then returns from the software interrupt, resuming the execution of application's code after having completed the requested system call function.

Looking more specifically at the service table 421 in a Linux operating system, where such table is also known as the sys_call_table, we see that the system call function 0 is sys_exit and it is specified by the pointer 422 at offset 0 in the table 421, which points to the handler 430 for the sys_exit function. The system call function 1 is sys_fork specified by pointer 423 which points to the sys_fork handler 431. All other system call functions are similarly specified in the service table 421.

The agent intercepts access to resources available through OS API by copying and replacing the pointers to the system call functions in the table 421 with pointers that point to code provided by the agent for handling the respective function. By first copying the original pointer for each function, the agent is able to later invoke the original function as part of handling the intercepted request.

For example, in order to intercept the sys_read system call, which is used for accessing file and device resources, the agent replaces the pointer in location 424 in the service table 421 to point to the handler 442 provided by the agent 240 to handle sys_read. By first saving the pointer originally in location 424, the agent's handler 442 is able to call the original handler 432 provided by the OS to handle the sys_read function. The agent may call the original function before, after, in addition to or instead of its agent-provided functionality; or it may not call it at all.

In an alternative embodiment, the agent intercepts access to resources that are available through OS API by intercepting the software interrupt vector 403 and replacing the pointer to the OS API 270 with its own handler 441. In that alternative embodiment, the agent further uses a similar service table to dispatch the requested function to its handlers, such as the handler 442, and may invoke the original OS functions by calling the API 270 using the original value of the vector 403.

Using the provided intercept mechanism, the agent preferably intercepts all types of resource calls, including the constructors, destructors and accessors. For example, to intercept file access, the agent intercepts the sys_open function (the constructor), the sys_close function (the destructor), and the sys_read, sys_write, and other file-related functions (the accessors). Additionally, the agent preferably intercepts all process-related calls, such as sys_fork, used for creating new processes, and sys_exit, used for terminating processes.

Intercepting Access to Resources Available Through Library API

While the preferred method of intercepting resource access for opaque resources (and transparent resources that are accessed via API) is by intercepting the operating system API 270 as described above, for certain resources the agent preferably intercepts resource access API by replacing and/or intercepting user-mode libraries, such as libc.

To intercept static libraries, the agent provides a replacement static library that needs to be linked in the application instead of the standard static library. To intercept for shared libraries, also known as dynamic-link libraries, the agent provides a replacement shared library is to be copied in the place of the original library in the operating system and/or application file directories.

In such replacement libraries, the agent provides the original functionality of the library as well as the agent-specific functionality; one skilled in the art will appreciate that other methods of intercepting libraries are possible and are within the scope of this invention.

The agent preferably provides such user-mode interception only for resources that are not convenient to intercept at the OS API and for resources that are fully managed in user mode. Such resource, for example, is the heap memory allocated via malloc( ) and free( ), which in Linux is implemented by the OS-provided runtime library libc. For heap allocation, libc uses the OS API internally to allocate large blocks of memory, and provides the smaller granularity division in user mode.

Similar to the OS API interception, the agent intercepts all types of resource calls for accessing these resources, including the constructors, destructors and accessors.

Variations in Resource Access Interception

One skilled in the art will appreciate that other embodiments of the invention can use different ways for intercepting resource access, including resource allocation and deallocation, and that the invention applies equally regardless of the particular way of resource access interception.

For example, it is possible to provide all interception in user mode code by replacing the user-mode libraries that provide access to the OS API and intercepting page fault exceptions in user mode. Even though such interception may require more readily available skills to implement, the preferred embodiment using a kernel mode interception of memory access and OS API provides a more generic solution that is easier to integrate with existing systems and affords a complete interception of all resources needed by applications.

Aggregated Process Context

In traditional computer systems, applications run as conventional processes and the operating system assigns them memory and other resources. Modern operating systems treat processes as owners of resources and keep track of the resources owned by each process. To do this, the operating systems keep a set of related data structures known as the process context, and maintain one such process context for each process currently executing on the server.

Since one aspect of the present invention is to distribute the resources owned by a single application to multiple servers, the present invention preferably provides a way of allocating and tracking resources in a distributed fashion, transparently to the application's code and without modifying the tracking mechanisms in the OS.

The inventive system provides an aggregated process context used to keep track of resources for applications that run in aggregated processes. This section will first describe the process context kept for conventional processes and then describe the aggregated process context.

Conventional Process Context

Figure 5:
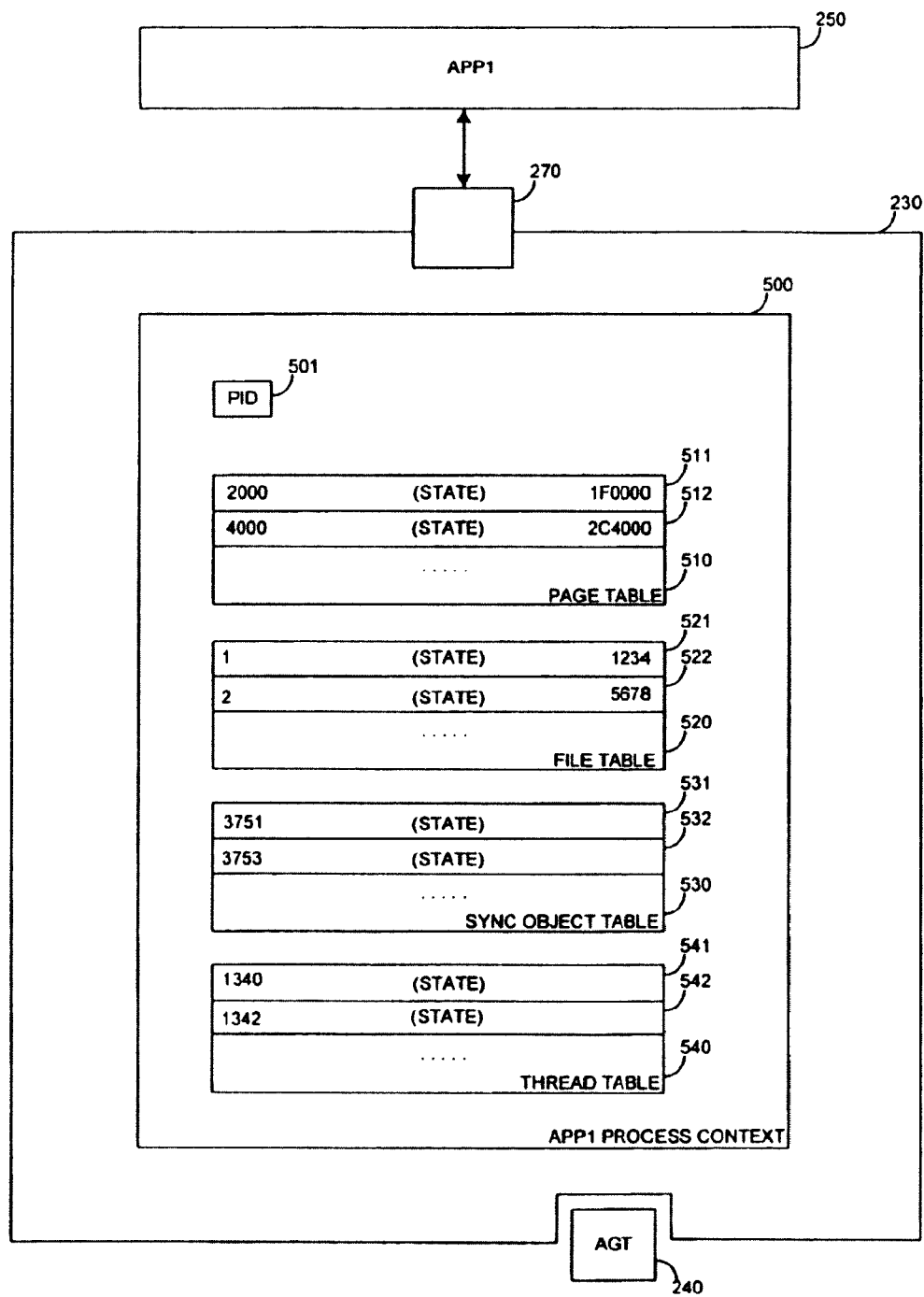
FIG. 5 illustrates the process context maintained for a conventional process.

FIG. 5 illustrates the preferred logical structure of the process context for a conventional process. The process context 500 consists of the process ID field 501 and several resource tables, at least one table per resource type.

Each resource table contains entries, one per unit (instance) of the particular resource type. Each entry maintains the identification of the resource unit within the set of resources and the state of the resource. For some resources, like memory pages and file handles, the entry may not contain the resource unit identifier itself; instead, the identifier is used to index the table to locate the entry.

The key resource types kept track of in the process context are the memory page table 510, containing page entries 511 and 512; the file handle table 520, containing file entries 521 and 522; the synchronization object table 530, containing object entries 531 and 532; and the thread table 540, containing the thread entries 541 and 542.

For a resource unit, such as the file represented by the file entry 521, the OS keeps the file handle number, the present state of the file, including the current offset in the file, as well as the pointer to a file iNode maintained by the operating system 230. Similarly, for physical memory page resource, such as the memory page represented by the entry 511, the page table 510 is indexed by the logical page number to locate the page entry 511. The entry 511 contains the state of the page, including the 'page dirty' and 'page present' flags, and the number of the physical page frame allocated for this logical page, if one is allocated.

Whenever an application process, such as the application process 250, tries to access a resource via the OS API 270 of the operating system 230, the OS locates the process context 500 for that process using the process ID field 501, and then locates the resource entry in the proper resource table. It then proceeds performing the function requested by the application over that resource using the state kept in the resource entry.

Another important use of the process context 500 is the automatic resource cleanup provided by the operating system when a process terminates. Upon termination of the process 250, the operating system 230 enumerates each and every resource entry in the process context 500 and frees the resource unit, thus ensuring that the memory and other resources previously owned by process 250 are now available to other applications.

For access to resources of conventional processes running on the inventive system, the agent 240 is preferably invoked just to forward the resource request to the original handler in the operating system 230.

Aggregated Process Context

Figure 6:
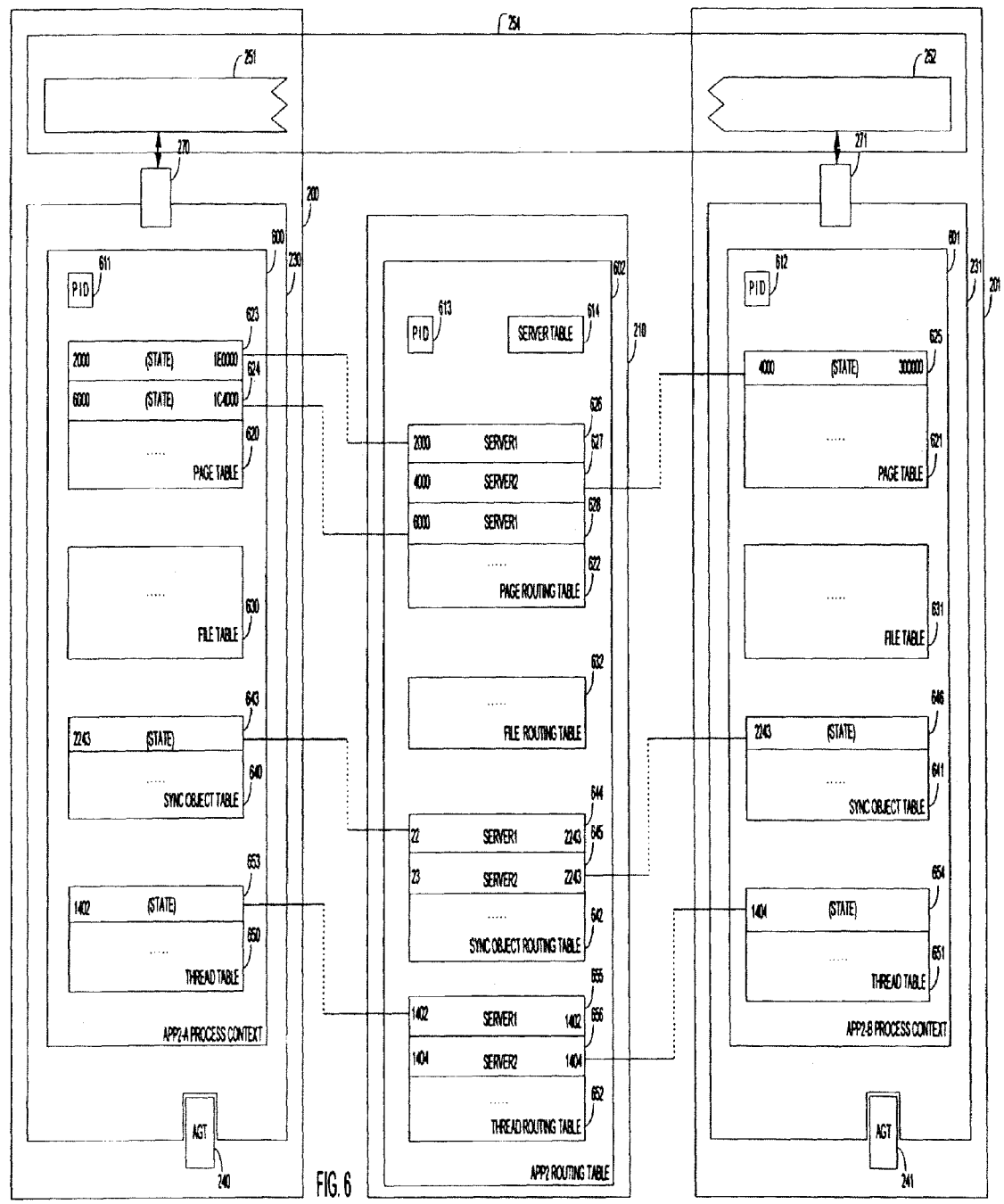
FIG. 6 illustrates the inventive aggregated process context.

FIG. 6 illustrates the aggregated process context maintained in the inventive system for aggregated processes.

Aggregated processes consist of member processes running on different servers. Each of member processes is seen as a conventional process by the operating system on the particular server on which it runs. As a result, the operating system on each server keeps a conventional process context for each member process.

The process context of each of the member processes keeps the resources that are currently allocated to the server on which the member process runs; it preferably does not contain all the resources allocated to the aggregated process. The sum of all conventional process contexts of all member processes contain the full set of resources allocated by the inventive system to the aggregated process.

For example, the aggregated process 254 consisting of a member process 251 and member process 252, has a conventional process context 600, maintained by the operating system 230, and a conventional process context 601, maintained by the operating system 231.

The process context 600 contains the process ID 611 of the member process, which is the same as the process ID of the aggregated process. It further contains a page table 620, a file table 630, a synchronization object table 640 and a thread table 650. The page table 620 has at least two entries: the entry 623 for the memory page at logical address 2000, and the entry 624 for the memory page at logical address 6000. The synchronization object table 640 contains at least the entry 643 for a semaphore with handle 2243. The thread table 650 contains at least one entry 653 for a thread with handle 1402.

The process context 601 contains the process ID 612, whose value is preferably identical to the value of the process ID 611 and equal to the process ID of the aggregated process. The context 601 further contains a page table 621, a file table 631, a synchronization object table 641 and a thread table 651. The page table 621 contains at least one entry 625 representing the memory page at logical address 4000. The synchronization object table 641 contains at least one entry 646 representing the semaphore with handle 2243. The thread table 651 contains at least one entry 654 representing the thread with handle 1404.

In order to keep track of which resource of the aggregated process is allocated on which server, the inventive system keeps a process routing table 602. The system keeps one such routing table for each aggregated process. The routing table 602 is preferably stored in the grid switch 210 responsible for the particular aggregated process and maintained by it.

The routing table 602 contains the process ID field 613, which has the process ID of the aggregated process for which table 602 contains information. The value of the field 613 is preferably equal to the value of the field 611 of the context 600 and the field 612 of the context 601.

The routing table 602 further contains a server table 614 which contains the server IDs for each server currently allocated for the aggregated process. The table 614 may contain additional information per server, such as the total amount of memory allocated on that server for the aggregated process, etcetera.

The routing table 602 further contains resource routing tables for each type of resource handled by the inventive system. Specifically, it contains a page routing table 622, a file routing table 632, a synchronization object routing table 642 and a thread routing table 652. Each of the resource routing tables in the table 602 consists of resource routing entries, one entry for each unit of resource allocated to the aggregated process. Each of routing entries preferably contains an identifier of the resource unit which the entry represents, the server ID of the server on which the resource is currently allocated, the local resource identification for that resource on the server, as well as miscellaneous state and statistics associated with the resource unit.

The page routing table 622 contains at least the following page entries, one for each page existing in a member process context: the page entry 626, representing the memory page at logical address 2000; the page entry 627, representing the memory page at logical address 4000; and the page entry 628, representing the memory page at logical address 6000. The synchronization object routing table 642 contains at least the following entries: entry 644 representing the semaphore with handle 22 and the entry 645 representing the semaphore with handle 23. The thread routing table 652 contains at least the following entries: the entry 655 representing the thread with handle 1402 and the entry 656 representing the thread with handle 1404.

Unlike the resource entries kept in the conventional process contexts 600 and 601, the resource routing entries preferably do not contain the specific dynamic state of a resource, such as the physical memory page assigned to a logical page, or the count value of a semaphore. The reason for this is that this dynamic state may change frequently, and having to forward it to the grid switch every time when it changes will introduce unacceptable overhead.

Instead, the resource routing entries in the process routing table 602 specify how to find the resource: they contain the server ID where the resource is currently located as well as any local to that server identification of the resource (if needed; see description of local resource handles below). Keeping only the resource routing information allows the grid switch to use less memory than would be required to keep the full state of all resources of the application. The routing information is preferably sufficient for the grid switch to forward any resource requests it receives to the server where the resource resides.

For example, the page routing entries 626 and 628, corresponding to the memory pages at logical addresses 2000 and 6000, respectively, contain the server ID of the server 200, indicating that these pages are physically allocated on the server 200. The page routing entry 627, corresponding to the memory page at logical address 4000, contains the server ID of the server 201, indicating that this page is physically allocated on the server 201.

It is the entry 623 in the conventional process context 600 which keeps the state indicating that the memory page 2000 is mapped into the physical memory page 1E0000 on the server 200, together the page's state, such the 'page dirty' and 'page present' flags. Similarly it is the conventional process context entries 624 and 625 what keep the state that the pages 4000 and 6000, respectively, are mapped to physical memory pages 1C4000 on the server 200 and 300000 on the server 201.

Handling Local Resource Handles

Since modern operating systems generate themselves the handles to identify opaque resources, such as semaphores, the inventive agent may not have control over the particular handle values generated by the operating system for each resource unit, thus making it possible that the same resource handle be assigned to two distinctly different resources by the operating systems on two different servers.

In order to handle such situation properly, the original resource handles assigned by the operating system are preferably replaced by the agent with resource handles assigned by the grid switch. The application receives only the resource handles assigned by the grid switch and the grid switch keeps the original handles in the resource routing entries.

For example, in response to a request to create a semaphore coming from a thread in the member process 251, the operating system 230 has assigned a handle value 2243 to the semaphore represented by the entry 643. Similarly, in response to a request to create a semaphore coming from a thread in the member process 252, the operating system 231 has assigned the same handle value, 2243, to the semaphore represented by the entry 646. However, these are two different semaphores, allocated independently by threads running on the servers 200 and 201, respectively.

In order to allow the application to distinguish the two semaphores, the grid switch 210 has assigned a handle value of 22 to the semaphore represented by entry 643 and a handle value of 23 to the semaphore represented by entry 646. The agents that had intercepted the constructors for those semaphores, agents 240 and 241, respectively, have replaced the locally assigned, duplicate-prone handles with the switch-assigned, unique handles returned by the grid switch. The grid switch stores the server ID and the locally assigned handle for each of those semaphores, in the routing entries 644 and 645, respectively.

When a thread from the member process 251 tries to access the semaphore using the handle value 22, the agent 240 sends an access request to the grid switch. By the handle value 22, the grid switch locates the routing entry 644 which indicates that the semaphore is on the server 200 and therefore can be accessed directly by that thread, and contains the locally assigned handle for that semaphore, 2243. The grid switch returns the locally assigned handle to the agent, which substitutes the handle value 22 with the handle value 2243 and forwards the function call to the operating system 230. As a result, the operating system 230 sees the handle value that it had assigned, and completes the operation successfully.

One skilled in the art will appreciate that it is possible for agents to cache the locally-assigned resource handles for the opaque objects present locally on a server, so that no request to the grid switch will be needed to obtain such handle; alternatively, it is possible to modify the way in which the locally assigned resource handles are assigned, e.g., similar to the way process ID are assigned in the inventive system, so that a duplication is avoided and there would be no necessity to recode locally-assigned handles.

Virtual Machine Process

Most conventional server systems contain operating systems that execute directly over the server hardware and virtualize access to that hardware for application processes. In many cases, however, an additional layer of abstraction exists and is useful. This layer of abstraction is typically provided by virtual machine monitor that resides between the hardware and the operating system.

A virtual machine monitor abstracts the physical hardware of the server, including its memory, CPUs and peripheral devices into multiple logical entities called virtual machines. Each virtual machine is capable of running an independent set of software which can be a complete operating system and one or more applications, embedded software, or even software developed to run directly over hardware. Examples of such virtual machines are the VMware ESX Server product and the real-mode MS-DOS emulation environment in Microsoft Windows NT.

Conventional processes in modern operating systems are a form of virtual machine abstraction, providing access to a subset of the hardware resources to a particular application, and enabling the sharing of a single server among multiple applications. Therefore, the context of a virtual machine consists of the same principle elements as the context of a process described above and can be aggregated in a similar fashion.

In an alternative embodiment of the present invention, the aggregated process consists of multiple virtual machines, each executing preferably on a separate physical server. The aggregated process represents a single aggregated virtual machine capable of booting and running a general-purpose operating system such as Linux or Microsoft Windows.

Summary

We have described the conventional process contexts kept by each of the member processes belonging to an aggregated process, as well as the resource routing table for the aggregated process. The aggregated process context kept by the inventive system comprises the conventional process contexts of all the member processes of that aggregated process, as maintained by the respective operating system on each server, and the process routing table for the aggregated process, as maintained by the grid switch responsible for the aggregated process.

The aggregated process context allows the inventive system to keep track of all resources allocated in a distributed fashion to the aggregated process, in a uniform way and transparently to the application.

One skilled in the art will appreciate that in other embodiments of the invention the aggregated process context and the process routing tables may be organized in various ways, as well as augmented by additional information (e.g., such as may be kept per process by the agent in each server and/or miscellaneous statistics, hash values, etcetera), and that the invention applies equally regardless of the particular way in which the aggregated process context and its components are organized. For example, the inventive aggregated process context may be modified so that the resource routing tables are indexed by the resource identifier and the resource routing entries do not contain such identifier, resulting in both reduction of the routing table sizes and improved speed of handling resource requests in the grid switch.

Distribution of Resources

When an application starts, its process typically has a single thread; this thread allocates resources and creates other threads which also allocate resources during their operation.

In order to utilize the resources of multiple servers in executing an aggregated process, the inventive system distributes the resources allocated by application's threads among the servers that run member processes for it. This initial distribution of resources is preferably done whenever a new a resource is created by the application.

The determination on which server a resource will be created is made by the grid switch, using the distribution process and distribution policies described below. This approach ensures that the resources are distributed in a uniform fashion and that the grid switch always knows the where each resource is.

Distribution Process

Figure 7:
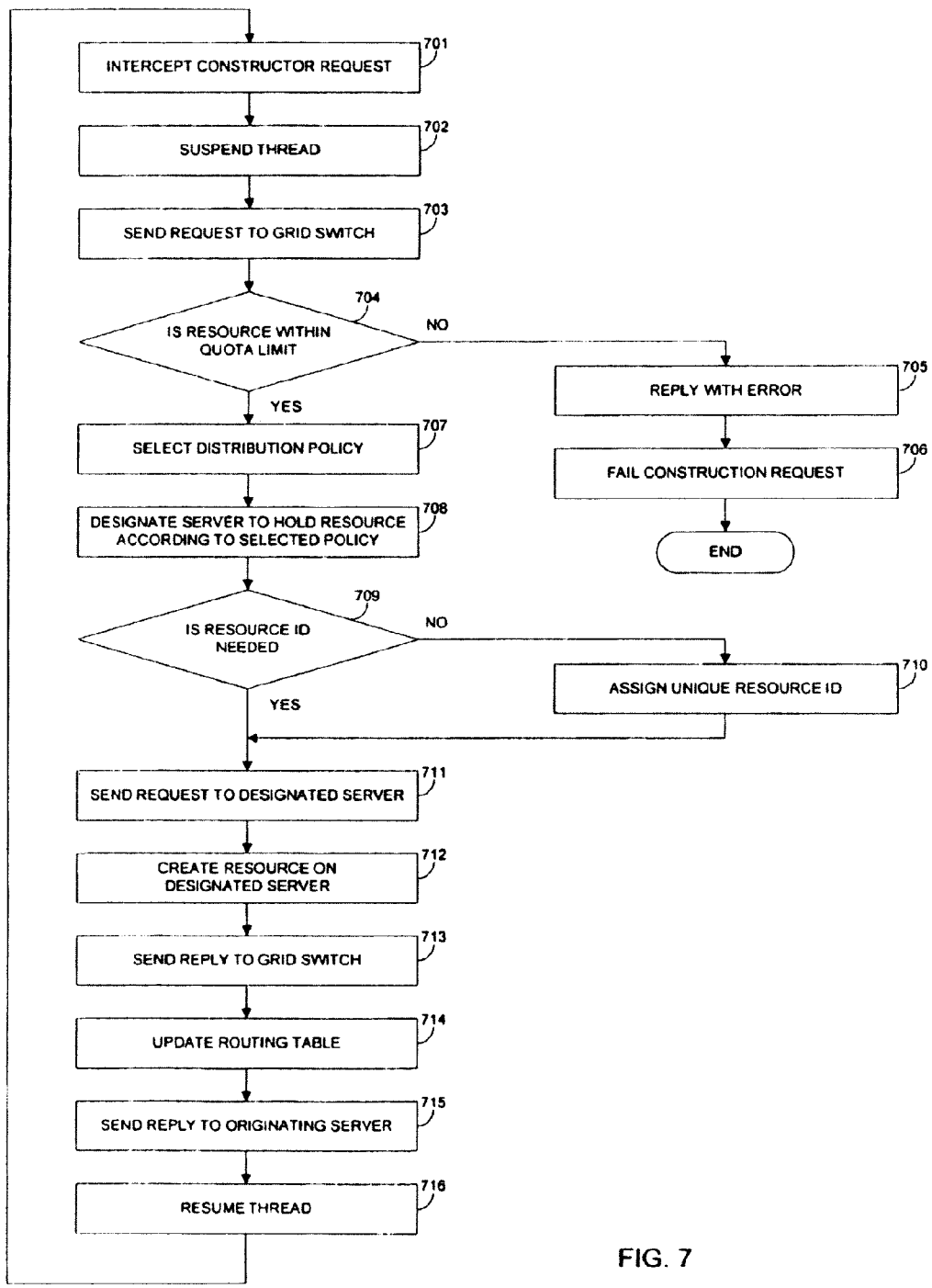
FIG. 7 illustrates the preferred logic flow for distributing resources.

FIG. 7 illustrates the preferred logic flow for the process of distributing resources.

In step 701, a thread belonging to a member process tries to create a resource. Using one of the resource access interception methods described herein, the agent running on the same server intercepts the resource creation request. Hereinafter, the server on which the request occurs will be referred to as the "originating server."

In step 702, the agent suspends the thread in the originating server, so that the thread will wait until the resource is created. In the following step 703, the agent collects information about the resource creation request, such as process ID of the process that is trying to create the resource, the thread context (as necessary), resource creation arguments, etcetera, and sends a message to the grid switch containing the resource creation request with its arguments.

In step 704, the grid switch receives the message and consults any quota limits for the requested resource; the quotas may be per process, per user, etcetera, and may include both security and load limitations. If the resource creation would exceed the quota, the grid switch forms an error reply message in step 705 and sends it back to the agent in the originating server. In step 706, the agent fails the resource creation request, using the same manner for indicating the error to the application as the operating system on the originating server would if it detected the exceeded quota condition itself. This manner may include status code, setting an error number variable, raising exception, sending a signal, etcetera.

In case the grid switch determined in step 704 that the resource creation will be allowed, the grid switch proceeds with step 707, in which the grid switch chooses a distribution policy. In step 708, the grid switch, according to the policy chosen in step 707, designates a member server on which the resource will be created, or the "designated server".

Before proceeding, in step 709 the grid switch determines whether the new resource will need a unique resource ID to be assigned; this identifier is needed in case duplicate handles are possible, as described in the previous section. If such an identifier is needed, the grid switch assigns it in step 710 and then proceeds with step 711. If such identifier is not needed, the grid switch proceeds directly with step 711.

In step 711, the grid switch forwards the resource creation request to the designated server, including also the unique identifier if one was assigned in step 710. The agent in the designated server receives the request from the grid switch, and in step 712 creates the resource as requested by invoking the operating system on the designated server to create the resource. Further, in step 713, the agent forms a reply that contains the creation status—success or error—and, in case of success, any local handle for the resource as it is known the operating system on the designated server; and sends that reply to the grid switch.

In step 714, the grid switch updates the routing table for the process, including the resource ID, the server ID of the designated server, as well as the local handle for the resource assigned by the designated server, into the routing table entry for the new resource. Further, in step 715, the grid switch replies to the agent on the originating server, including the resource ID for the resource and creation status.

In step 716, the agent on the originating server resumes the previously suspended thread, completing the resource creation request to the application. In the same step, the agent further passes to the application any return values that are expected by the application, such as the creation status and the resource ID, in the same manner in which the operating system would pass them to an application for locally created resources.

The process in steps 701-716 is preferably repeated for each resource for which the application requests creation. The same process is also used when the application requests that a new thread be created, allowing not only resources but also threads to be created in a distributed fashion.

An example result of such distribution processes is the resource allocation recorded in the aggregated context 602 for the aggregated process 254, as illustrated in FIG. 6 and discussed in the previous section. The memory pages at logical addresses 2000 and 6000 are allocated to the server 200, as indicated by the routing entries 626 and 628 and further in resource entries 623 and 624, respectively; the memory page at logical address 4000 is created on server 201, as indicated by the routing entry 627 and the resource entry 625. Further, the semaphore with unique resource handle value of 22 is created on the server 200, as indicated by the routing entry 644 and resource entry 643, and has a local handle 2243 on server 200; the semaphore with unique resource handle 23 is created on server 201, as indicated by the routing entry 645 and the resource entry 646, and has a local handle 2243 on server 201. Further, the thread with unique resource handle 1402 is created on server 200, as indicated by the routing entry 655 and resource entry 653, and has local handle 1402; the thread with unique resource handle 1404 is created on server 201, as indicated by the routing entry 656 and resource entry 654, and has a local handle of 1404.

One skilled in the art will appreciate that other embodiments of the present invention may use different processes for resource distribution that result in the resources used by the application being distributed among multiple servers, and that the invention applies equally regardless of the distribution process used. Further, one skilled in the art will appreciate that the steps 711-713 may be performed using various other access methods, such as the thread hop method described further in this disclosure.

Distribution Policies

Unlike prior art systems, the inventive system aims to achieve balance of load preferably not by moving tasks from highly loaded servers to less loaded servers, but by properly distributing resources, such as memory, files and synchronization objects, among the servers and allowing threads to hop to where the resources are. As the system achieves good distribution of resources, the load distribution is also achieved. The way the resources are distributed is preferably determined by a resource distribution policy.

The resource distribution policies supported by the present system include: (a) round-robin, (b) striping, (c) load-balanced, (d) load-weighted, and (e) affinity context. Each of these policies is described below, assuming a system with N servers, a single grid switch and a single application that runs as an aggregated process, with all N servers running member processes for that aggregated process. The N servers are numbered from 0 to N−1.

The round-robin policy is a simple distribution policy in which each new resource is created on the next in order server, starting with the server number 0, going to server N−1, and then wrapping around to server number 0. Thus, the first resource creation is sent to server number 0, the next to server number 1, the (N−1)-th creation is sent to server number N−1, the N-th again to server number 0, the (N+1)-th to server number 1, and so on. The round-robin policy is simple, has low overhead and achieves good distribution in absence of any additional information about the running application.

The round-robin policy can be varied by keeping separate or common round-robin counters for the different types of resources, by moving to the next server every several creations instead of on each creation, etcetera. Another variation of the round-robin policy is a random policy, in which a random number from 0 to N−1 is computed at each resource creation request and is used to designate the server on which the resource will be created.

The striping policy is based on the numeric value of the resource identifiers, such as the logical address for memory resources and the handle for resources other than memory. In this policy, a portion of the resource identifier is extracted, starting from a bit S and taking K bits, and used to choose the server on which the resource is to be created. For example, for a 64-bit logical memory address, the selected bits may be the K=8 bits starting from bit S=16. The selected bits are shifted 16 times right to form a number in the range from 0 to 256 and taken modulo N to produce the server number for the server on which the memory page will be created. The resulting memory allocation looks like stripes of 64 kilobytes sequentially allocated on the servers. Similar bit selection is performed for resources other than memory, by selecting bits from the resource handles. K is preferably a number such that 2 to the power of K is equal or greater than N.

The striping policy is a low overhead distribution policy that provides additional flexibility in the resource distribution, allowing easy control and tuning of the granularity of distribution. For applications that use smaller data structures, the administrator can choose the K bits to be selected from the less significant bits of the address, while for applications that use larger granularity data structures, he or she can use the K bits from the more significant bits. The K and S values are preferably configurable as policy parameters.

The load-balanced distribution policy is based on the currently reported load of the servers at the time the resource creation is requested. The grid switch preferably receives periodically load statistics about each server, including statistic elements such as the processor utilization, number of threads ready to run, memory free and in use, etcetera. In addition, the grid switch preferably keeps track of how many resources of each type are present on each server, e.g., incrementing the number by one when a resource is created and decrementing it by one when the resource is destroyed. The grid switch combines the different statistics for each server, preferably giving different weights to each statistic, computing an abstract load value L for each server. Whenever a new resource is to be created, the grid switch designates the least loaded server, which has the lowest load value L, and creates the resource on that server.

The load-balanced distribution policy achieves better results for applications in which different resources are used vastly differently and works well when even few resources are being created; it also takes into account varying load and resource access patterns. This policy is also highly configurable, allowing the administrator to tune the performance and distribution to particular applications, by adjusting statistic weights used to compute the load value.

The load-weighted policy combines the round-robin policy with the load-balanced policy in order to achieve better long-term balancing. In this policy, the grid switch computes the abstract load value L to be in the range 0 through M for each server, with M preferably being 4; it then constructs a list of servers, in which each server is listed cyclically as many times as the difference M-L for that server, resulting in less loaded servers occurring more often in the list. Whenever a resource creation request is received, the grid switch chooses the next server from the list, in round-robin fashion; the list is rebuilt periodically, using the last received load statistics. The load-weighted policy achieves load balanced distribution and avoids hot-spotting in which frequently accessed resources are allocated on the same server.

The affinity context policy uses a correlation between resources allocated in a given context in order to group related resources on the same server. For example, in object-oriented applications, child objects allocated by a parent object are typically used together with the parent object and are preferably allocated on the same server. In another example, for applications in which a large number of threads are used as mini-processes and have significant amount of private data which is not shared with other threads, resources belonging to the same thread are preferably allocated on the same server.

Other affinity context correlations are possible, including an application-defined affinity context. In that variation, the application provides explicitly to the agent an affinity context value which allows the system to group together resources from the same application context. Using this value, the system ensures that resources which have the same context value are preferably allocated on the same server.

The preferred way for the application to provide a context value is by calling library functions affinity_context_enter( ) and affinity_context_leave( ) provided by the inventive agent. The affinity_context_enter( ) function takes one numeric argument which is the application-defined affinity context. The application calls this function when entering a new context, such as entering a method of an object; the context value may be a pointer to the object or any other value chosen by the application to denote the particular context. On this call, the system saves any previous affinity context and sets the provided value as the current affinity context. Upon subsequent resource creations, the agent sends the current affinity context with each resource creation request, allowing the grid switch to allocate the new resource on the same server where previous resources with the same affinity context are allocated.

The inventive system preferably does not interpret the affinity context value and keeps a separate affinity context value for each thread of the aggregated process. When the application leaves the affinity context, it calls the affinity_context_leave( ) function, which takes no arguments. The inventive system then restores the previous affinity context value, as saved for that thread on affinity_context_enter( ). The system preferably provides a stack for keeping multiple nested affinity contexts for each thread.

The affinity context policies take into account application-specific patterns, such as parent-child object affinity and private data affinity, allowing grouping of resources that are used together. For applications that exhibit these patters, the resource grouping results in higher performance.

One skilled in the art will appreciate that other embodiments of the present invention may use variations and combinations of these policies and/or other policies for resource distribution, and that the invention applies equally regardless of the particular policies used.

The various policies in the system are preferably selected by an administrator or another person who is authorized to make configuration changes to the system. In addition to a default policy selected by the administrator, additional policies may be defined to apply to various applications. For example, a given policy can be selected for a particular application, by specifying a rule containing the applications name and/or file path and the selected policy, as well as any tuning parameters for the policy, such as K, S, M, etcetera. The policies may also include the number of servers N to be used for an application, as well as any specific list of servers. The policy selection and the policy's tuning parameters can be further adjusted automatically by the system based on statistics from the execution of the application.

Having resource distribution and the ability to manually and automatically adjust the resource distribution policies in the system allow the system to utilize the resources of multiple servers with high efficiency, while providing the aggregate amount of resources to the applications running in the inventive system.

Resource Access

Threads of an application preferably access resources by manipulating memory and/or calling API functions, as described earlier in this disclosure. Applications that run as conventional processes have all their threads and resources allocated on a single server, and their access to resources is handled by the operating system on that server.

Applications that run as aggregated processes in the inventive system have their threads and resources distributed across multiple servers. When a thread of such application attempts to access a resource belonging to the application, there are two possible cases: (a) the resource may be located on the same server as the thread, i.e., it is a "local resource", or (b) the resource may be located on a different server, i.e., it is a "remote resource".

The determination of which of these two cases occurs is preferably made by the agent on the server where the thread is running, and with the help of the MMU on that server. The agent intercepts all resource requests as described earlier in the disclosure. For access to memory resources, the agent is preferably assisted by the MMU, which provides page fault exception in order to intercept memory accesses to pages that are not local, while allowing direct access to memory that is already mapped locally.

If the resource is local, the agent allows the request to proceed to the operating system. The operating system performs the requested action the same way as it would for a conventional process that tries to access a local resource. Additionally, if the agent had recoded the resource handle to a grid switch-assigned unique handle during resource creation, then the agent preferably replaces that unique handle with the local handle before passing the request to the operating system.

If the resource is not local—i.e., we have a situation where a thread of the aggregated process attempts to access a resource that is not on the same server as the thread—the agent preferably provides the access transparently to the application. In the inventive system, there are 3 possible strategies to achieve this: (a) remote procedure call (RPC), (b) bring the resource to server where the thread is, and (c) bring the thread to the server where the resource is. In the following descriptions, the server where the thread is will be referred to as the "thread host" and the server where the resource is as the "resource host."

The RPC method of access is similar to its namesake method widely used in networked Unix and other systems. Examples of the RPC method for resource access in prior art include access to files via the NFS file system (RFC1813) and access to a remote clock resource via the Network Time Protocol (RFC1305).

For the RPC method in the inventive system, the agent on the thread host packages all arguments of the request and sends it to the grid switch. The grid switch forwards the request to the resource host. The agent at that server unpacks the arguments and issues the request locally; upon completion, it then packages the results and sends them back through the switch to the thread host. The agent at the thread host server completes the request to the application, passing the results the same way as the operating system would if the resource was local, resulting in transparent access for the application's code. The RPC method preferably uses 4 messages to complete the request: from the thread host to the grid switch, from the grid switch to the resource host, then the reply from the resource host to the grid switch and the reply from the grid switch to the thread host.

The main advantages of the RPC method are that it is well understood and straightforward to implement. The main disadvantages of the RPC method are that it requires resource-specific implementations and that a pair of request-reply messages needs to be exchanged for each and every access to the resource. It is preferably used only when more of the other access methods can be applied.

Bringing the remote resource to the thread host is a method in which the resource is moved from the resource host to the thread host. The method has two variations: resource reassignment and resource caching. In resource reassignment, the resource is destroyed in the resource host and re-created in the thread host, with any state of the resource transferred. In resource caching, a copy of the resource is created at the thread host, mirroring the state of the original resource; usually all instances of such cached resource are read-only. In both variations, once the resource is present locally, the agent at the thread host forwards the access request to the local operating system which executes the request the same way as if the resource was local prior to the access request.

The resource assignment and caching methods use 4 messages for each resource request: from the thread host to the grid switch, from the grid switch to the resource host, then the reply from the resource host to the grid switch and the reply from the grid switch to the thread host.

The main advantage of this method is that once the resource is moved to the thread host, any further accesses that the thread performs are executed locally, without the 4 message exchanges for subsequent accesses. The main disadvantages of the method are that it preferably requires resource-specific implementations and/or interface descriptions for each resource type and that it may result in thrashing—moving the resource back and forth between servers—in case the resource is being accessed concurrently by threads from different servers. Additionally, sometimes resources cannot be moved—e.g., the case of page-locked memory or some opaque resources. The resource reassignment and resource caching methods are used preferably for resources that are mostly accessed privately by a thread and resources that are accessed primarily for reading, respectively.

The third method used in the inventive system brings the thread from the thread host to the resource host. This method is also known as a thread hop. In this method, the thread context is packaged and sent through the grid switch to the resource host. The agent at the resource host creates a thread (or uses an available worker thread) in the member process there and restores the thread context to that thread; it then makes the newly created thread ready-to-nm from the instruction that tried to access the resource. When the thread starts executing at the resource host, the resource access attempt is repeated, this time reaching the agent at the resource host, which determines that the resource is local and forwards it for execution to the local operating system. The thread hop method requires only two messages: from the thread host to the grid switch and from the grid switch to the resource host, where the thread resumes execution.

The main advantages of the thread hop method are: (a) unlike the resource reassignment, it can always be performed; (b) it is more efficient because it does not require response messages, reducing in half the number of messages exchanged; and (c) it is polymorphic, meaning that it is independent of the type of resource being accessed and does not require a separate implementation code specific to the resource type. Similar to the resource caching and reassignment methods, once the thread hops to the resource host server, any further accesses for the same resource are processed locally.

In all three methods described above, the grid switch routes the request received from the thread host to the resource host, using the routing tables for the aggregated process in order to locate the resource host among the servers participating in the execution of the aggregated process.

Of the three methods, the RPC method is well understood and used widely in network, distributed and other client-server systems and one skilled in the art will appreciate the simplicity of its implementation. In the following sections we will describe in detail the system's primary resource access method, the thread hop, and the auxiliary resource caching and reassignment methods, as well as some special cases of resource access, such as binary operations and pinned resources.

Resource State Transfer

We will start by first describing a method for transferring the state of a resource from one resource instance into another, in most cases on a different server. This method is preferably used at least in the resource caching and reassignment processes described herein.

Although resources are preferably distributed to different servers when they are created, in some cases it is necessary to move the resource to a different server. Simply destroying the resource on the old server and creating a new resource on the new server is not always sufficient, as the resource may hold state. For this purpose, it is necessary to have a method for saving the resource state from a resource and then restoring that state into a resource. Depending on the type and kind of resource, the method has different variations, all preferably resulting in obtaining a memory segment containing a saved, or "serialized", state of the resource from the resource, and being able to restore, or "deserialize", the state of a resource from a memory segment containing the state.

For memory pages, the serialization consists of simply copying the contents of the page; the deserialization consists of copying the serialized content into the page. An improved method for serialization of memory includes using the page by reference, with zero copies; this may be achieved by (a) unmapping the page from its logical address and putting it in a saved page list; (b) mapping the page into the desired logical address, or (c) passing the content of the page by reference for transmission through a protocol stack to another server. An improved method of deserializing memory consists of mapping the page, in which the saved content is, into the logical address where the content needs to be restored.

For transparent resources which are self-contained and stored in memory, the serialization is preferably performed by saving the memory structure that contains the resource; the deserialization is preferably performed by copying the saved state over the memory allocated for the new resource.

For opaque resources and other resources that are not self-contained, the serialization and deserialization is preferably performed by a pair of functions for each resource type. The functions are preferably named xxx_serialize( ) and xxx_deserialize( ), where xxx is the name of the resource type, such as semaphore, file, mailslot, etcetera.

The xxx_serialize( ) function preferably takes three arguments: the resource ID of the resource to serialize, a pointer to buffer to serialize into, and size of the provided buffer. The function preferably returns the number of bytes copied into the buffer on success, or a status indicating an error. When invoked, the function stores all state of the resource necessary to restore the state into another resource instance of the same type, into a continuous sequence of bytes (e.g., a self-contained binary structure or XML data).

The xxx_deserialize( ) function preferably takes 3 arguments: the resource ID of the resource to deserialize into, a pointer to buffer containing the serialized state returned by xxx_serialize( ), and the number of bytes provided in the buffer. The function preferably returns a status value, indicating success or error. When invoked, the function takes the serialized state provided as argument and makes the resource identified by the resource ID identical as state to the resource from which the state was saved.

The serialization and deserialization functions can be used to move a resource from one server to another, e.g., by serializing the resource instance, destroying it, then creating a new resource instance on a different server and deserializing into it (In order to prevent race conditions related to the resource, any requests for the resource being moved are preferably delayed from the moment before serializing the resource on the first server until the deserialization completes on the second server. This is preferably achieved by marking the resource as not present on either server for the duration of the move, and holding the requests for it on a queue in the grid switch; upon completion of the move, the requests are preferably executed in the order received). Further, the same mechanism may be used to save the state of resources used by a process during checkpointing or hibernation, and later restore it during recovery or wake-up.

The functions for each resource are preferably provided by the operating system on the servers and invoked by the agent when serialization or deserialization of a resource is needed. One skilled in the art will appreciate that other ways of serializing and deserializing resources are possible and that the invention equally applies regardless of the particular way used.

After having described the resource transfer methods, we proceed with the description of the various resource access methods in the inventive system.

Thread Hopping

Figure 8:
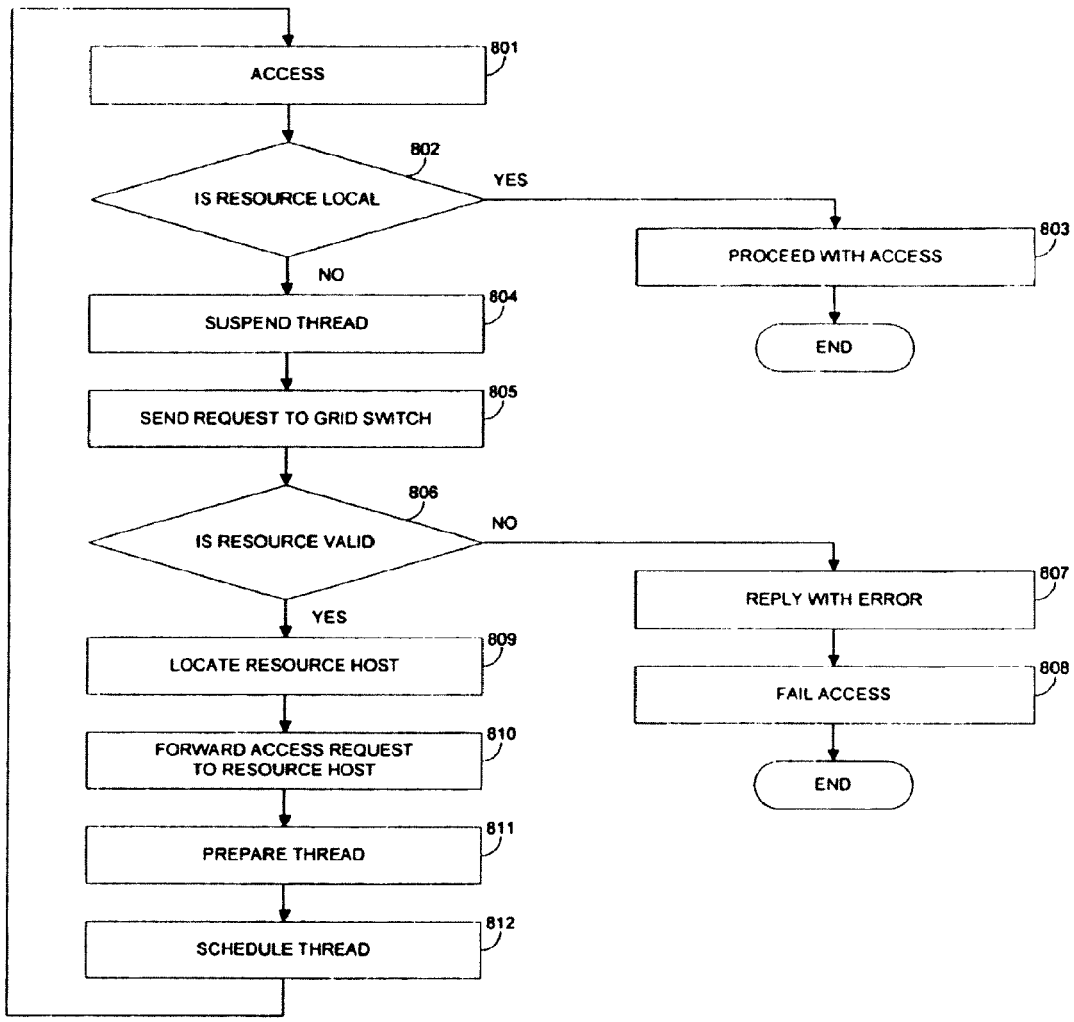
FIG. 8 illustrates the preferred logic flow for resource access.

FIG. 8 illustrates the preferred logic flow for the thread hop method for accessing resources. In step 801, a thread from the thread host tries to access a resource. The access attempt is intercepted by the inventive agent. In step 802, the agent checks whether the resource is local or not. If the resource is local, in step 803 the agent passes the request to the original handler in the local operating system which executes and completes the request.

If the resource is not local, in step 804 the agent suspends the thread that tried to access the resource so that its execution will stop until the resource becomes available. In step 805, the agent collects the resource access arguments, such as the resource ID (e.g., handle or memory address), as well as the thread context and sends the request containing this information to the grid switch.

The thread context collected in step 805 preferably includes the process ID; the thread ID; the processor registers typically saved by the OS scheduler on thread switch, such as the general purpose registers, flags, and instruction pointer, as of the time the thread was suspended in step 804; and the memory page at top of stack. It may further include TLS entries for the thread.

In step 806, the grid switch preferably checks in its routing tables whether the resource ID is valid. If it is not valid, in step 807 the grid switch sends an error reply to the agent in the thread host, which in step 808 resumes the thread and fails the original request.

If the resource ID is valid, in step 809, the grid switch uses the provided resource ID to locate the routing entry for that resource and extract the server ID of the resource host and any local handle for the resource. Further, in step 810, the grid switch forwards the resource access request to the resource host using the server ID found in step 809.

Upon receiving the request in the resource host, in step 811, the agent in the resource host prepares a thread to take the thread context included in the request. The agent may create a new thread, or use an already existing thread from a pool of ready-to-use threads. The thread preparation preferably includes at least mapping the top-of-stack page in memory and setting the thread's registers. Finally, the agent makes the thread ready to run, e.g., by including it in the list of ready to run threads of the scheduler in the operating system on the resource host, or by signaling a semaphore on which that thread is blocked.

In step 812, the operating system on the resource host schedules the transferred thread for execution, resuming the execution of the thread from the instruction that made the original thread request. Additionally, if the code memory page pointed by the current instruction pointer of the thread is not mapped in, it is preferably loaded by the operating system. Once its execution is resumed, in step 801 the thread is essentially retrying the resource request, this time running in the resource host. In step 802, the agent determines that the resource is local and in step 803 passes the request to the local operating system which executes and completes the request.

The process leading to resource access is preferably executed using only two messages that pass through the grid interconnect: the message formed in step 805, sent by the agent in the thread host to the grid switch, and the message in step 810, sent by grid switch to the agent in the resource host. Unlike other resource access methods, this method does not require waiting for a response—the moment the second message reaches the resource host, no further grid interconnect messages are needed in order to get the thread to execute and access the resource. This is in sharp contrast to both the RPC and the resource caching/reassigning methods, in which the system experiences the latency of waiting for the response and has a heavier traffic, including twice the number of messages sent.

As a result, this method reduces the impact of the interconnect latency on the performance of the system. This is particularly important as fast, switched network interconnects, such as 10 Gigabit Ethernet, become available and have relatively low cost. These networks have relatively high latency, especially when using store-and-forward layer 2/3 switching and have multiple switching hops between nodes. The latter, although increasing the latency, is the key mechanism that allows such networks to scale easily and cost-effectively to tens of thousands of nodes. By being significantly less sensitive to latency, the thread hopping allows the aggregated grid to scale to high number of servers using commodity interconnects, without prohibitive degradation of performance due to interconnect latency.

Whenever a thread accesses a resource, it is likely that it will access it again in subsequent instructions. A typical example is a thread that is accessing fields of a data structure: often, the thread will access several fields of the data structure in sequence. Because after the hop the thread is located on the same server as the resource, any immediately subsequent accesses by the thread to the resource are satisfied locally and efficiently.

Thread hopping further provides the most efficient way of dealing with concurrent access to a resource—e.g., atomically incrementing counters in a data structure. Whenever two threads from different servers attempt to access the same remote resource, both threads are preferably hopped to the server where the resource is and now can access the resource locally on that server. In addition, unlike resource reassignment, in which the resource travels between servers and is unavailable for access during transit, when thread hop is used to provide access, the resource that is in demand remains available for access by other threads that have already hopped to that server.

The thread hop is applicable to accessing any type of resource access, including access to memory, files, devices, synchronization objects, etcetera. In some cases, however, when the thread is requesting access to a memory page from its own stack or a page of code, the access may be better served by one of the other mechanisms described herein.

Resource Caching

During the execution of most applications, a lot of memory belonging to the application's process is used read-only. For example, code that is executed is preferably never modified in memory, as well as constant static (global) data is never modified; configuration data is often initialized early in the process, e.g., from configuration files, and not changed during the remainder of the process execution. In a similar fashion, input data in computing and image rendering applications is accessed only for reading and is not modified during the calculations. Other types of resources may also fit in this category, e.g., a queue for exception processing which remains empty most of the time during the execution of the process and may be checked by multiple threads periodically.

What is common between all these examples is that the resources remain the in the same state for prolonged periods of time. When such resources are being accessed from multiple threads of an aggregated process and the threads are running on different servers, it is possible to cache these resources at the servers where each of the threads is. The caching is performed by sending a copy of the resource to the thread host, and protecting the resource from being modified both on the resource host and the thread host which now has a cached copy of the resource, in order to ensure state coherency between all copies of the resource. In case threads from other servers try to access the same resource, the cached copy can be provided to them as well. In case any thread tries to modify the resource, the cache copies are revoked, and the modifying access is executed using a different access method.

Figure 9:
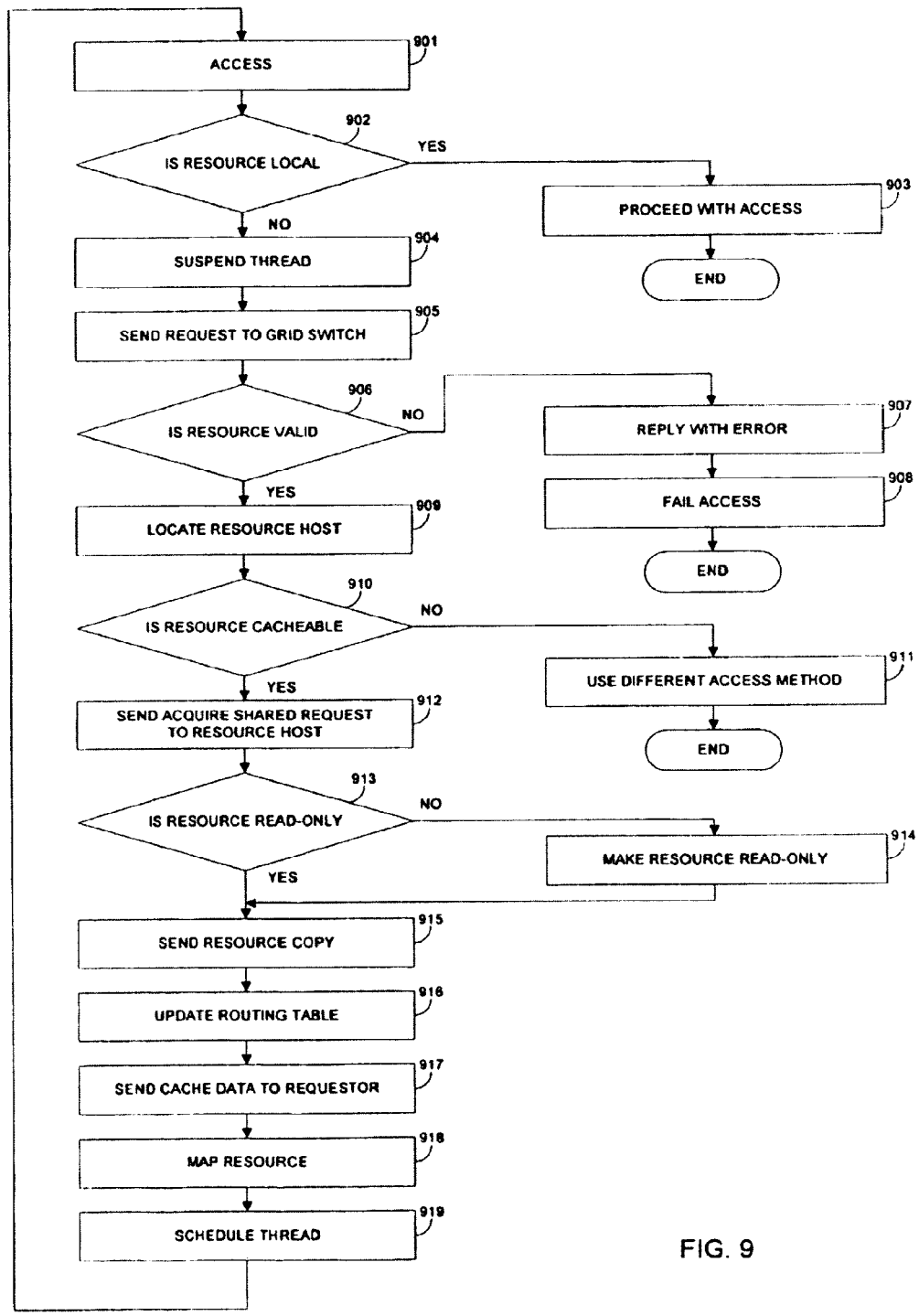
FIG. 9 illustrates the preferred logic flow for resource caching.

FIG. 9 illustrates the process of resource caching in providing resource access. In step 901, a thread of the aggregated process, running on the thread host, attempts to access a resource. The request is intercepted by the inventive agent, which, in step 902, checks whether the requested resource is local. If the resource is local, in step 903 the agent forwards the request to the local operating system, which executes it the same way as it would for a thread of a conventional process making a local resource request.

If the resource is not local, in step 904, the agent suspends the thread in order to stop it from running until the resource is made available. In step 905, the agent collects the resource access arguments, such as the resource ID, and any other arguments associated with the request (e.g., parameters of the API function used to access the resource), and sends them as part of the request to the grid switch. In case the resource being referred to is a memory page, the resource ID is the logical address of the memory location being accessed; for other types of resources, the resource ID is the appropriate identifier, such as handle, etcetera.

In step 906, the grid switch which received the request uses the resource ID to check whether the resource ID is valid within the process context. If it is not valid, in step 907 the grid switch replies to the thread host's agent with error indication, and in step 908 the agent fails the request to the application.

If the resource ID is valid, in step 909 the grid switch uses that ID to locate the routing entry for that resource and extract the server ID of the resource host and any local handle for the resource. Further, in step 910, the grid switch checks whether the resource is cacheable; the resource may not be cacheable if it is frequently written to or for any other reason. If the resource is not cacheable, in step 911 the grid switch chooses a different access method for the resource and proceeds using the logic flow for that method. If the resource is cacheable, the grid switch continues with step 912.

In step 912, the grid switch sends a request to acquire the resource in shared, or cached, mode to the server whose server ID was found in step 909—the resource host. The request preferably contains the same information that was sent in step 905. In step 913, the agent on the resource host checks whether the resource is already marked as read-only on its server. If it is, it proceeds with step 915; if it isn't, in step 914, the agent first makes the resource read-only. To make the resource read-only, the agent marks the resource for read-only access in any of its resource tables; for memory pages, the agent also sets the "page is read-only"

flag in the page table provided to the MMU, so that any write access to the page will cause a page fault, but any read accesses will proceed normally.

In step 915 the agent on the resource host prepares a response containing a copy of the requested resource, which copy is obtained preferably using the resource serialization method described herein, and sends it back to the grid switch. In step 916, the grid switch updates the resource routing entry for the resource being cached. The update preferably includes marking the resource as cached and including the server ID of the thread host in the list of servers that have a cached copy of the resource. In step 917, the grid switch sends the resource copy to the agent in the thread host.

In step 918, the agent in the thread host receives the resource copy, creates a local resource of the same type, or uses a pre-created instance from a pool, and deserializes the copy into it, further marking the resource as read-only. The agent also updates any of its resource tables marking that the resource is now local and read-only. If a local handle is assigned to the resource by the local operating system, the agent preferably saves that handle as well, optionally sending the local handle also to the grid switch.

In step 919, the agent at the thread host resumes the thread that requested the resource from the instruction that requested the access. When the thread starts again, it attempts to access the resource in step 901; the agent intercepts the request, and in step 902 determines that the resource is now local. In step 903, the agent passes the request to the local operating system, which completes the request as it would for a conventional process that is accessing a local resource. The whole process is repeated for any server that tries to access the resource and hasn't already cached it.

If the resource is truly read-only and is never modified through the lifecycle of the aggregated process, such as program code, the resource will end up being cached on all servers that need it and threads running on these servers will access the resource locally. If the resource is occasionally modified, the system preferably flushes the cached copies before allowing modifications to the resource.

Once the resource is cached on at least one server, it is marked as read-only on all servers, including the server on which the resource was originally located (the resource host). If any thread, from any server, attempts to modify the resource, the agent will intercept this request. For memory, since the agent has marked the memory page as read-only, a write access will cause a page fault; for non-memory resources, the agent recognizes the accessor functions that can potentially modify the resource. Once it intercepts the write request, the agent sends a "flush", or cache invalidate, request to the grid switch for this resource. The grid switch sends a flush request to all servers that have cached the resource, using the resource routing entry which preferably contains the server ID of all servers on which the resource is cached; the switch also sends a "no-longer-cached" notification to the agent on the resource host. The agents on all servers that receive the flush request destroy the cached copy of the resource on their local servers; the agent on the resource host upon receiving the no-longer-cached notification unprotects the resource, allowing both read and write accesses to the resource on that server. The grid switch preferably awaits confirmation that the flush and no-longer-cached actions have completed and then proceeds satisfying the request to modify the resource.

One skilled in the art will appreciate that other embodiments of the present invention may use variations of the caching process to achieve the caching of rarely modified resources on multiple servers, and that the invention applies equally regardless of the particular process used for establishing and flushing the caching.

One likely variation is to have the resource server make the cacheability decision taken by the grid switch in step 910. For memory resources, the decision is preferably based on using the "page is read-only" and "page is dirty" flags associated with the requested memory page on the resource server. If the page is read-only, then it is cacheable; if the page is not read-only but is not dirty, then it is cacheable (In systems in which memory paging is disabled, the dirty flag can be used to indicate that the page hasn't been modified for a period of time. The flag is set by the MMU on memory writes and is reset periodically and/or on remote access by the agent. This mechanism allows caching of pages that are rarely modified). Otherwise, the page would not be cacheable, or caching is not the best access method; the resource host can then use the thread hop method, provided that the thread agent and the grid switch have sent the thread context of the thread that attempted the access.

For non-memory resources, the agent may add a "read-only" and "dirty" flags to these resources, either in the OS-maintained resource entries or in separate resource tables maintained by the agent. The agent is further programmed to treat API functions that cannot modify the state of a resource as "read accessors" and API functions that can possibly modify the state of the resource as "write accessors", and use this designation to control the "dirty" flag on write accessors, and to prevent write accessors from directly modifying the resource if the "read-only" flag is set.

One of the key characteristics of the resource caching method for providing access to remote resources in an aggregated process is that for rarely modified resources, it allows each server that needs access to the resource to have a copy of that resource locally and access it efficiently, resulting in better performance for the application being executed by the inventive system. At the same time, resource caching does not prevent the occasional modification of the resource and does not jeopardize the resource's state coherency.

Resource Reassignment

Many resources in an aggregated process cannot be efficiently cached because they are being modified frequently. While thread hop is the preferred access method in those cases, for some accesses, it is preferable to move the resource to the thread, via the resource reassignment method. These cases preferably include access to memory pages belonging to a thread's stack and access to resources in a thread's local, or otherwise private, storage. Those resources are typically accessed exclusively by the thread that owns them; in case that thread was hopped to another server to access a resource there, many of its stack pages and other private resources may have remained in the original thread host. Bringing these resources to the thread may improve thread's locality and allow the thread to continue to access locally the resource for which it hopped.

The method of resource reassignment is used preferably both for memory and non-memory resources. This method changes the original distribution of a resource: it moves the resource from the server on which is was created, preferably based on the distribution policies, to the server on which access to the resource is needed locally, resulting in "reassignment" of the resource to that server. Further reassignments of the resource to other servers can also occur.

Figure 10:
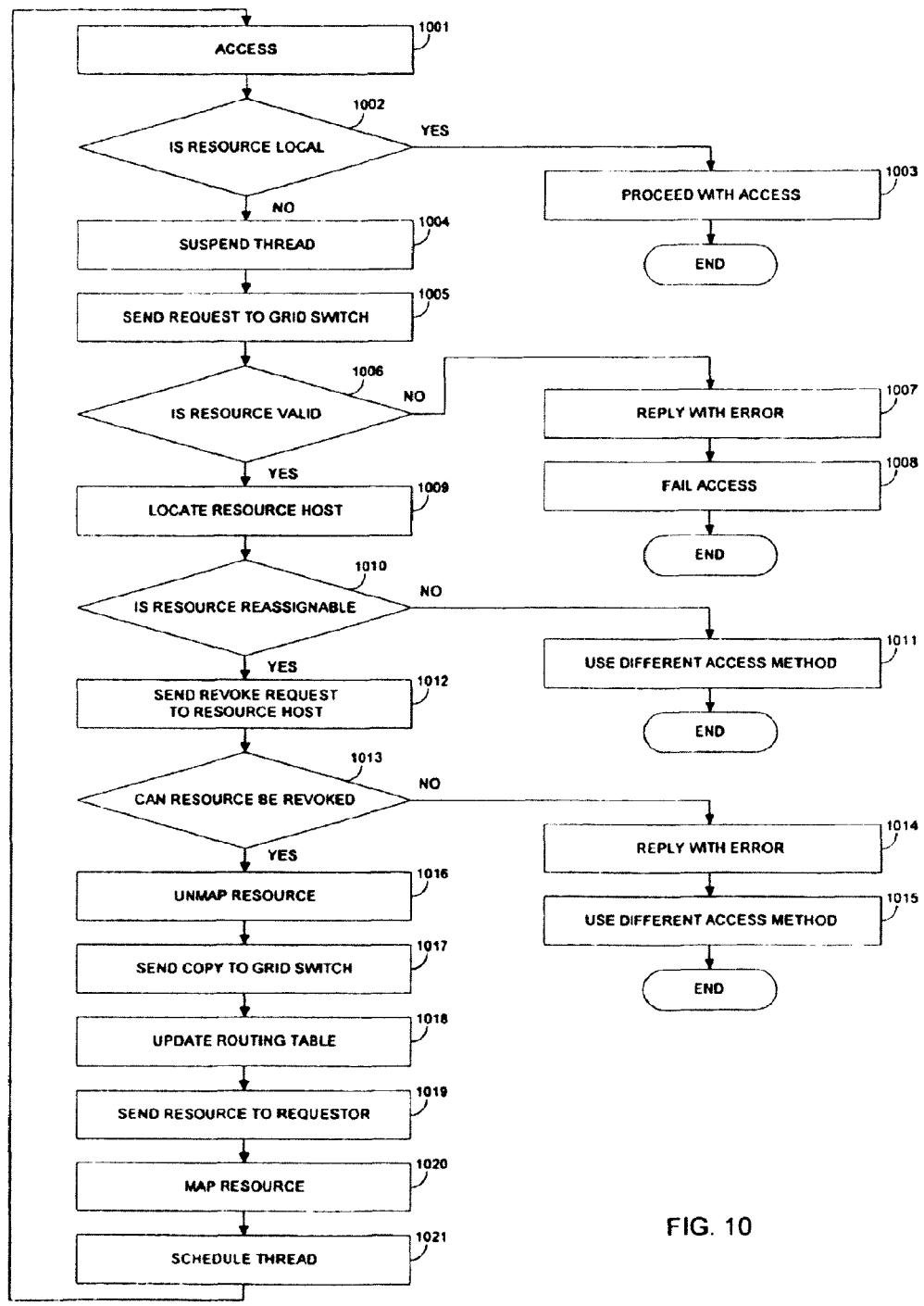
FIG. 10 illustrates the preferred logic flow for resource reassignment.

FIG. 10 illustrates the process of resource reassignment used for accessing resources. In step 1001, a thread of the aggregated process, running on the thread host, attempts to access a resource. The request is intercepted by the inventive agent, which, in step 1002, checks whether the requested resource is local. If the resource is local, in step 1003 the agent forwards the request to the local operating system, which executes it the same way as it would for a thread of a conventional process making a local resource request.

If the resource is not local, in step 1004, the agent suspends the thread in order to stop it from running until the resource is made available. In step 1005, the agent collects the resource access arguments, such as the resource ID, and any other arguments associated with the request (e.g., parameters of the API function used to access the resource), and sends them as part of the request to the grid switch. In case the resource being referred to is a memory page, the resource ID is the logical address of the memory location being accessed; for other types of resources, the resource ID is the appropriate identifier, such as the resource handle.

In step 1006, the grid switch which received the request uses the resource ID to check whether the resource ID is valid within the process context. If it is not valid, in step 1007 the grid switch replies to the thread host's agent with error indication, and in step 1008 the agent fails the request to the application.

If the resource ID is valid, in step 1009 the grid switch uses it to locate the routing entry for that resource and extract the server ID of the resource host and any local handle for the resource. Further, in step 1010, the grid switch determines whether the resource is reassignable; the resource may not be reassignable if it is page-locked memory or for any other reason. If the resource is not reassignable, in step 1011 the grid switch chooses a different access method for the resource and proceeds using the logic flow for that method.

If the resource is reassignable, the grid switch continues with step 1012. In that step, the grid switch sends a request to revoke the resource from to the server whose server ID was found in step 1009—the resource host. The request preferably contains at least the resource ID of the resource to be revoked, as well as the process ID.

In step 1013, the agent on the resource host checks whether the resource can be revoked. If it can, it proceeds with step 1016; if it can't, as in a case of page-locked memory, in step 1014 the agent replies to the grid switch with error, and in step 1015 the grid switch chooses a different access method for the resource and proceeds using the logic flow for that method. Alternatively, in step 1013, as the agent determines that the resource cannot be revoked, it can instead accept a thread hop, provided that the thread agent and the grid switch have sent the thread context together with the request; if that is done, the resource access continues according to the thread hop logic flow described above.

In step 1016, the agent on the resource host makes a copy of the requested resource, saving its state, preferably using the serialization method described herein, and destroys the local resource. The destruction for memory pages is unmapping the physical page and adding it to the list of free pages. The destruction for handle-based resources involves destroying or freeing the object on the local server.

In step 1017 the agent sends the saved copy of the resource to the grid switch. In step 1018, the grid switch updates its routing table to denote that the resource is no longer on the resource host and stores the server ID of the thread host as the new location for the resource. In step 1019, the grid switch sends the resource copy to the thread host, where in step 1020 the agent on the thread host creates a resource of the same type and deserializes the received copy into it. The agent further preferably sends an update message to the grid switch, passing any local handle of the newly created resource, so that the grid switch updates the routing entry for the resource with that handle.

In step 1021, the agent at the thread host resumes the thread that requested the resource, from the instruction that requested the access. When the thread starts again, it attempts to access the resource in step 1001; the agent intercepts the request, and in step 1002 determines that the resource is now local. In step 1003, the agent passes the request to the local operating system, which completes the request as it would for a conventional process that is accessing a local resource. The resource is now located at the thread host, as if the grid switch had designated that server for the creation of the resource.

One skilled in the art will appreciate that other embodiments of the present invention may use variations of the reassignment process to achieve the movement of resources from the server on which they were originally created to another server where they are needed, and that the invention applies equally regardless of the particular process used for that movement.

A key characteristic of the resource reassignment method is that it allows resources that are primarily accessed by a particular thread, or from threads running on a particular server, to be located on that server, thus increasing locality and improving the performance of the application run by the inventive system. This mechanism, however, is preferably used sparsely, because it may lead to resource thrashing, in which a resource that is being accessed concurrently is reassigned rapidly back and forth between servers. The reassignment method is preferably used only for resources that are determined to be private or mostly private to threads that run on a given server.

Pinned Resources

In some cases resources cannot be moved (reassigned) from the server where they exist to another server. Examples of such cases may include: (a) the resource is physically attached to a server, such as an I/O device; (b) locked-down memory pages, such as pages prepared for direct device I/O via DMA; (c) resources that cannot be serialized in a particular state, such as an acquired semaphores on which a thread has blocked and there is a pointer to the semaphore in another object; (d) opaque resources for which no serialization or deserialization functions are available. The immovability may be temporary, as in the case of page-locked memory, or permanent, as the case of opaque resources without serialization functions.

Resources that cannot be moved, regardless of whether temporarily or permanently, are referred to as "pinned". While a resource is pinned, it may not be reassigned to another server. In this case, a remote access to the resource is preferably satisfied through one of the other methods, such as RPC, thread hop or resource caching.

Specifically in the case of resource caching, it is important to ensure that once the resource becomes cached, it is marked as read-only, or non-modifiable, on the resource host. For resources that are temporarily pinned for a very short time, such as page-locked memory during a file read from disk, and/or in case other access methods are not appropriate, the access request may be delayed until the resource is unpinned; once unpinned, the resource can be reassigned.

Binary Operations

Most resource access operations involve access to a single resource, such as a memory location or a semaphore. Some important operations, however, may take two or more resources as arguments. Operations that take two resources are called binary operations; operations that take more than two resources will also be called binary, since the access methods available for them are preferably the same as for operations with two resources.

Key examples of binary operations are: (a) memory copy from one memory address to another, especially on a CISC processor where a single processor instruction is used to perform the copy and (b) file read or write, which involve a file resource and a memory resource. In case of binary operations, it is possible that the two resources reside on different servers; in that case, there is no way to hop the thread so that both resources will become local. Binary operation access to resources residing on different servers is preferably handled using at least one of the other access methods described herein, such as the RPC, resource reassignment or caching.

For the example with memory copy on CISC, such as can be performed on Intel x86 processors using the "REP MOVSB" instruction, the inventive system preferably causes the source memory page to be cached on the server where the destination memory page is, and the thread hopped to that server. Alternatively, the source and the destination pages can be moved to the server where the thread is.

For the example with file write, the memory pages that contain the data to be written may be cached on the server where the file resource is. Alternatively, either the pages or the file resource (if moveable) can be reassigned to the server where the other resource is. Another alternative is using the RPC method to send the data to the resource host server and the file write request issued locally on that server.

Many other combinations are possible and the preferred choice differ depending on the semantics of the binary operation, e.g., resource caching of the source memory pages works well for file write but does not work at all for file read.

Summary

This section of the disclosure described in detail the principles of operation of the preferred embodiment. We showed how the system succeeds in its primary purpose—aggregating resources from different serves and making them available transparently to even a single scalable application.

We described how the inventive system distributes resources and threads of the application on multiple servers. We further disclosed the various methods used to provide access to remote resources, as well as the roles of the inventive agent and grid switch in these methods. In the next section, we will focus on the detailed description of the operation of the grid switch in the preferred embodiment.

3. Operation of the Switch

Overview of Responsibilities

The key responsibilities of the grid switch preferably include implementing the inventive aggregated process by coordinating the creation of member processes, deciding on which servers they will run, and generally maintaining the aggregated process context throughout the lifecycle of the aggregated process. The grid switch further provides resource distribution and tracking, and facilitates resource access within aggregated processes.

The grid switch preferably maintains tables of servers available for process execution, as well as per-process routing tables representing process contexts. On a process creation request, the grid switch preferably selects on which server(s) the application will run and organizes the creation of the aggregated process by switching and distributing the creation request. On a resource creation request, the grid switch preferably determines on which server each resource will be created and switches the creation request accordingly. On a thread creation request, the grid switch preferably determines on which server the thread will be created and switches the creation request accordingly. On requests to access a resource, the grid switch preferably locates the resource host server using its process routing tables, chooses an access mechanism and switches the access request according to that selected mechanism.

In the process of performing the above switching operations, the grid switch maintains its routing tables, as well as preferably collects statistics on all resources and servers in order to facilitate its switching decisions. The grid switch preferably enforces system policies and quota limits with respect to resource accessibility and allocation.

The following sections describe in more detail the preferred data structures maintained by the grid switch, and the detailed operation of the grid switch in performing its key functions.

Data Structures

Figure 11:
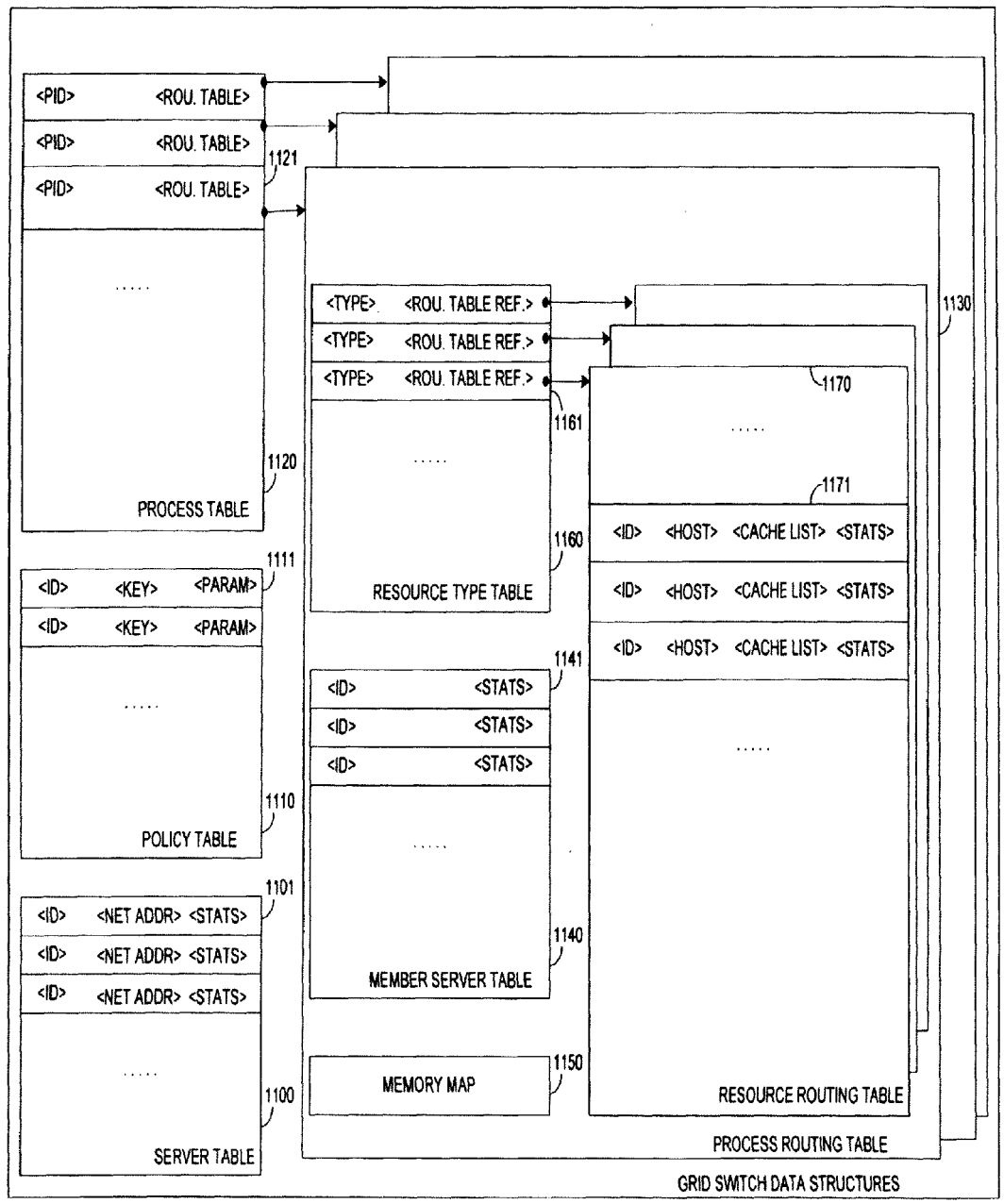
FIG. 11 illustrates the preferred data structures maintained by the inventive grid switch.

FIG. 11 illustrates the preferred key data structures maintained by the grid switch. The structures include the server table 1100, the policy table 1110, the process table 1120, as well as a plurality of process routing tables, such as the table 1130. The grid switch can have any other data structures that may be necessary for its operation.

The server table 1100 contains a plurality of server entries, such as the entry 1101. The table preferably contains one server entry for each server on which the grid switch can create member processes and/or create resources. The entry 1101 preferably contains the (a) server ID of the server; (b) the network address of the server, if different from the server ID, such as it is needed to send messages to the server over the grid interconnect; (c) server capacity and configuration data, such as type and number of processors on the server, clock speed of the processors (or another performance metric, such as benchmark results for the server), amount of physical memory, and preferably any specific devices, such as network cards, frame grabbers, printers, etcetera, that are attached to the server; and (d) periodically updated statistics about the server, preferably including processor utilization, number of threads ready to run, amount of memory available, etcetera.

The policy table 1110 contains a plurality of policy entries, such as the entry 1111. The table preferably contains one policy entry for each policy defined for the switch. The entry 1111 preferably contains (a) a policy ID used to distinguish this policy from all other policies in the table 1110; (b) a policy key, which is used to determine whether the policy will be applied to a particular application process, the key containing elements such as an application name, file name or directory path of the application's executable, user name, organization/domain name, time of applicability of the policy, etcetera; one or more key elements can be simultaneously defined using AND or OR rules, and some key elements may be unspecified; and (c) policy parameters, which state what preferences and limitations are to be applied for processes that match the policy key. Policy parameters preferably include: whether the application should be run as an aggregated or conventional process; how many servers or processors it should be distributed to (minimum, maximum and initial values); the standard Unix or similar quota limits, such as maximum number of files, amount of memory, etcetera, resources that can be used by the application; scheduling priority; as well as any desired preferences for resource distribution disciplines and methods used to provide resource access.

The process table 1120 contains a plurality of process entries, such as the entry 1121. The table preferably contains one process entry for each process that runs under the control of the particular grid switch. Such processes preferably include aggregated processes and conventional processes running on the servers listed in the server table 1100 (Note that the servers may run other processes that are not controlled by that grid switch. Such processes may include conventional processes, such as are necessary for the servers operating system to operate properly, as well as conventional and aggregated processes controlled by another grid switch in the system). The process entry 1121 preferably contains the process ID of the process for which this entry is and a reference to a process routing table, such as the table 1130. Once skilled in the art will appreciate that each of the process routing tables may alternatively be included in the process entry instead of being referred from it.

The process routing table 1130 is the preferred implementation of the process routing table used in the inventive aggregated process context, as described earlier in this disclosure. The table 1130 preferably includes a member server table 1140, a memory map 1150, a resource type table 1160, and a plurality of resource routing tables, such as the resource routing table 1170. For each process controlled by the grid switch, there preferably is one process routing table instance, such as 1130, with its contained tables 1140, 1150, 1160 and resource routing tables, such as 1170.

The member server table 1140 contains one or more server entries, such as the entry 1141. For conventional processes, the member server table preferably has a single server entry. For aggregated processes, the table preferably contains one entry for each server on which a member process of the aggregated process is running. Each server entry preferably corresponds to one member process. The server entry 1141 preferably contains: (a) the server ID for that server; (b) the local identifier that identifies the member process to the server's operating system, if different from the process ID assigned to the aggregated process; (c) resource allocation statistics, such as the amount of memory and other resources allocated to the member process; and (d) resource access statistics, such as number of remote accesses performed by or to the server. The resource allocation and resource access statistics are preferably used by the grid switch in determining resource distribution according to distribution disciplines, automatic adjustment of distribution disciplines, and deciding which resource access method to use.

The memory map 1150 describes the memory segments currently allocated to the application, preferably specifying the address ranges of such segments and segment type and attributes. The structure is preferably similar to the memory map structures maintained by modern operating system such as Linux. The memory map 1150 kept in the routing table for a process is preferably the definitive memory map for the aggregated process.

The resource type table 1160 contains a plurality of resource routing table entries, such as the entry 1161. The table 1160 preferably has one entry for each type of resource supported by the system; e.g., memory, semaphores, files, threads, etcetera. The entry 1161 preferably contains, or is indexed by, a numeric identifier of the resource type; the entry further contains a reference to the resource routing table for that type of resource, such as the resource routing table 1170. One skilled in the art will appreciate that the table 1160 may be a structure with named fields, each corresponding to a resource type, and either containing or pointing to a resource routing table for the resources of that type.

There is preferably one resource routing table, such as the table 1170, for each type of resource supported of each process controlled by the grid switch. The table 1170 contains resource routing entries, such as the entry 1171. The table 1170 preferably has one entry for each resource instance, or unit of resource, that is currently allocated to the aggregated process.

The resource routing entry 1171 preferably contains: (a) the resource ID that uniquely identifies this unit of resource within the aggregated process; (b) the server ID of the resource host server where the resource is allocated; (c) any local ID or handle of the resource for identifying the resource to that server's operating system; (d) the list of servers on which the resource is currently cached (empty if the resource is not cached); (e) the resource state from the standpoint of the grid switch, such as "ready" and "in transit"; as well as (f) access statistics for this resource instance. The resource access statistics for a resource preferably include the total number of times each of the resource access methods has been used for the resource and the number of times each of the resource access methods has been used in the last second (trailing sum). For example, they may include the number of times the resource has been reassigned to a different server, the number of threads that have hopped in the last second order to access the resource, the number of times the cached copies of the resource have been flushed, etcetera. The grid switch preferably uses these statistics in determining the resource access method for this particular unit of resource whenever an access request needs to be switched.

The resource routing tables for each type of resource are preferably organized using the most appropriate data structures. For example, (a) the memory routing table is preferably organized as a hierarchical data structure similar to the page table used by the MMU; (b) the file routing table is indexed by the file handle, which is sequentially assigned in most OS, such as Unix; and (c) the semaphore table is preferably a double linked list. The routing tables are preferably organized in the best way for the particular resource identification schema used by each type of resource, allowing fast—preferably indexed—access to the resource entry and providing an efficient use of memory on the grid switch.

One skilled in the art will appreciate that other embodiments of the present invention may use different organization of the data tables in the grid switch, as well as omit elements and/or add elements to each table, and that the invention applies equally regardless of the way the tables are organized or the particular elements contained in the tables.

Detailed Theory of Operation

This section describes the preferred operation of the grid switch in the following key use cases: (a) creation of a new process, (b) destruction of a process, (c) creation of a resource, (d) access to resource, (e) creation of a thread, and (f) load rebalancing. Additionally, it describes the preferred operation of the grid switch for moving the aggregation control of a process from one grid switch to another, and for checkpointing and restoring a process from checkpoint.

In general, the switching decisions of the grid switch are preferably based on information contained in the process and resource routing tables maintained by the grid switch. For example, in routing resource access requests the grid switch preferably uses the process ID, resource type and the resource ID provided in the request to first locate the process routing table for the aggregated process and then locate the resource routing entry for the particular resource. The grid switch uses the process ID to look up in the process table 1120 and locate the process entry, such as the entry 1121, that corresponds to the aggregated process on whose behalf the resource access request is made. Using the located process entry, the grid switch locates the process routing table, such as 1130, for the aggregated process, as referred to by the process entry.

The grid switch further uses the resource type to look up the resource type table 1160 for this process and locate a resource routing table entry, such as 1161. The entry points to the resource routing table, such as the table 1170, for the requested type of resource. The grid switch further looks up in the resource routing table and locates the resource routing entry, such as 1171, that corresponds to the resource ID provided in the request. The grid switch then extracts the server ID of the resource host server for that resource from the located entry. Using the server ID and the server table 1100, the grid switch preferably locates the server entry, such as 1101, that corresponds to the resource host. The grid switch extracts the network address of the resource host from the server entry, and uses it to forward the access request to the resource host server. One skilled in the art will appreciate that the grid switch uses the data structures described herein similarly to route and distribute requests for its other operations.

Upon creating a process, the grid switch preferably adds a new entry in the process table 1120 and a new process routing table instance, such as the table 1130, together with its contained member server table, memory map, resource type table and resource routing tables for each type of resource. Upon destruction of a process, the grid switch preferably removes the process routing table, together with its contained tables, and the process entry in the process table 1120. Upon creating a new resource or a new thread, the grid switch preferably adds a new entry to the resource routing table for the requested resource type in the process table for the particular process. Upon destruction of a resource, the grid switch removes the resource routing entry added for that resource.

In creation, destruction and access operations, the grid switch preferably updates its statistics, such as counters that are preferably kept per server in the server table and in the member server table, as well as in the resource routing table entries.

The following sections describe the preferred operation of the grid switch in the key use cases.

Creation of a Process

Figure 12:
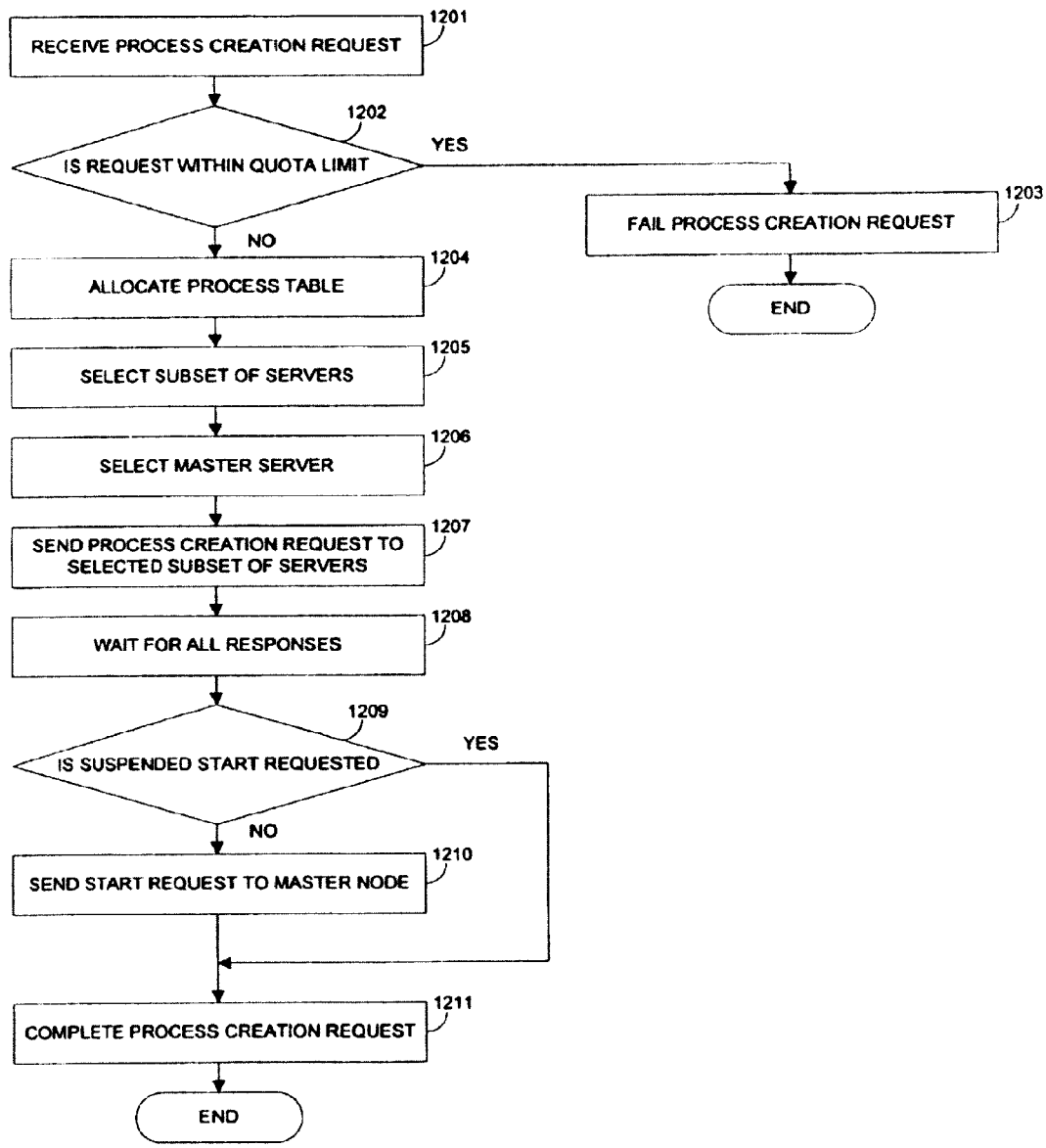
FIG. 12 illustrates the preferred logic flow used by the inventive grid switch for creating a new process.

FIG. 12 illustrates the preferred logic flow used by the inventive grid switch for creating a new aggregated process. In step 1201, the grid switch receives a process creation request, such as may be sent by an agent in one of the servers in the system. In step 1202, the grid switch verifies whether the resource creation request, if completed, is within the resource quotas limits. If it isn't, in step 1203, the grid switch fails the process creation request by responding with error to the received process creation request. If the request is within quota limits the grid switch proceeds with step 1204.

In step 1204, the grid switch allocates a new process entry for the process and a new process routing table, with all of its contained tables. In step 1205, preferably using the policy table and the server table, the grid switch chooses the subset of servers that will be used to run member processes for the new aggregated process and stores the server ID of each of the selected servers in the member server table for the process. The selection is preferably based on the policy, which may, for example, determine the number of servers desired for the new process, and on current load statistics for the servers, so that the least loaded servers are selected. If no policy matches the process, a default policy is preferably used.

In step 1206, the grid switch selects one of the servers in the subset to be the master server on which the first thread of the process will run. In step 1207, preferably using the selected subset of servers and the server table, the grid switch forwards a modified process creation request to all of the selected servers, the request containing the process ID for the new process, as well as other information that is included in the original process creation request, and an indication that a member process is to be created on the server that receives the request. In step 1208, the grid switch awaits a response from each of the selected servers indicating that the server has completed the creation of a member process.

In step 1209, the grid switch checks in the arguments of the original request received in step 1201 whether the process is requested to be started in suspended state. If yes, the grid switch proceeds directly to step 1211. If not, the grid switch proceeds with step 1210 to send a process start request to the selected master server and preferably update the thread resource routing table for the process to include a resource routing entry for the process's main thread in it. The grid switch then continues with step 1211.

In step 1211, the grid switch updates its process routing tables to indicate that the process is now created and completes the original process creation request received in step 1201.

One skilled in the art will appreciate that other embodiments of the present invention may use different steps to provide creation of member processes on a plurality of servers in order to provide resource distribution and aggregated process context for executing an application, and that the invention applies equally regardless of such variations. In particular, one variation removes the selection of a master server in step 1206 and determines the master server to be the first server that responds in step 1208, and proceeds to start the process and complete the request before all other servers have completed the creation of their member processes. In another variation, the grid switch can indicate to a server that it is the selected master server and is to start the first thread of the process in the request sent in step 1207, and omit steps 1209 and 1210.

One skilled in the art will further appreciate that other embodiments will preferably provide error handling and cleanup steps to the above logic flow.

One skilled in the art will appreciate that the described flow can also be used for creating conventional processes under the control of the grid switch, preferably by selecting a single member server in step 1205.

Destruction of a Process

Figure 13:
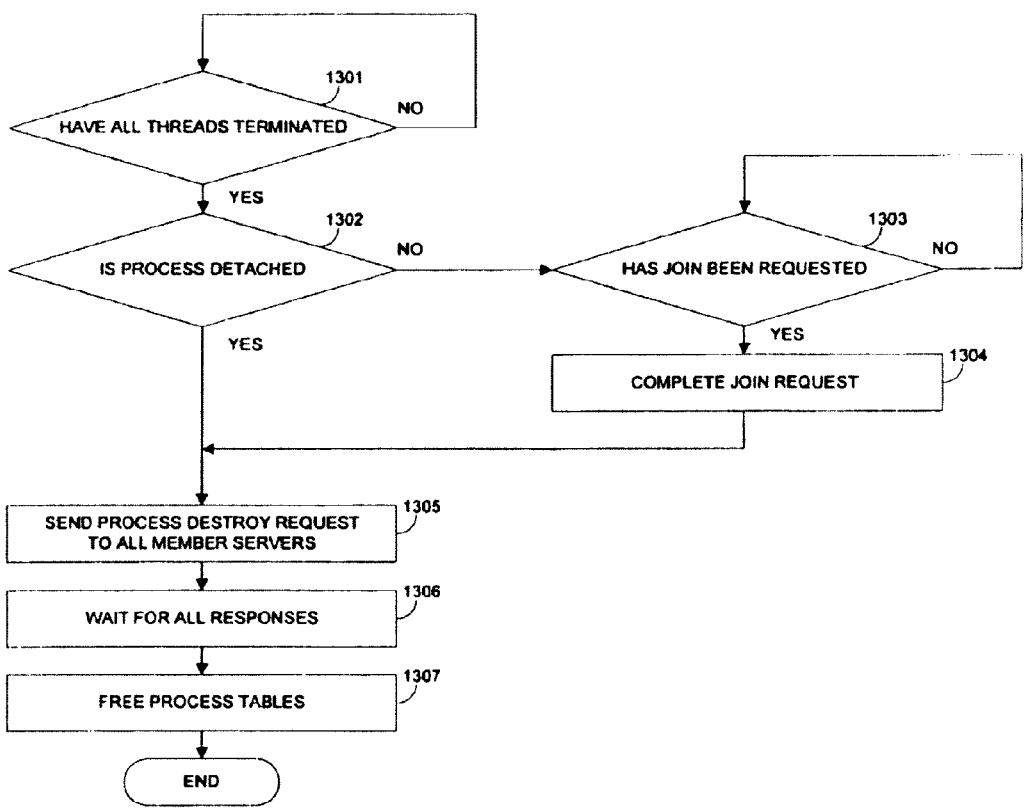
FIG. 13 illustrates the preferred logic flow used by the inventive grid switch for destroying a process.

FIG. 13 illustrates the preferred logic flow used by the inventive grid switch to perform destruction of a process that has completed its work. In step 1301, the grid switch checks whether all threads of the process have terminated; if not, the grid switch returns to the step 1301. If yes, it proceeds with step 1302.

In step 1302, the grid switch checks whether the process is detached, meaning that no other process is or may be waiting for the termination of this process using the Unix "join" function or similar. If the process is detached, the grid switch proceeds with step 1305. If the process is not detached, the grid switch continues with step 1303.

In step 1303, the grid switch checks if a join is requested for this process. If it isn't, the grid switch returns to step 1303. If it is, in step 1304 the grid switch completes the join request.

In step 1305, the grid switch sends process destroy request to all member servers listed in the member server table for the process. In step 1306, the grid switch waits for all member servers to complete the process destroy request. In step 1307, the grid switch updates its data structures, preferably freeing the process routing table and process entry, together with all tables contained in the process routing table, and updating any per-server statistics in the server table maintained by the grid switch.

One skilled in the art will appreciate that although steps 1301 and 1303 are described as sequential steps, they are preferably provided using event driven rather than polling mechanisms. One skilled in the art will further appreciate that other embodiments of the present invention may use variations of the described logic flow that provide cleanup of member processes on all servers used by an aggregated process, and that the invention equally applies to such variations. A variation of the flow includes a flow in which the completion of the join request in step 1304 is performed after the step 1307 in order to ensure that the join completes only after the process has been completely cleaned up. Another variation may include forcedly terminating the process's threads in case the process is being terminated instead of orderly completing its work.

Creation of a Resource

Figure 14:
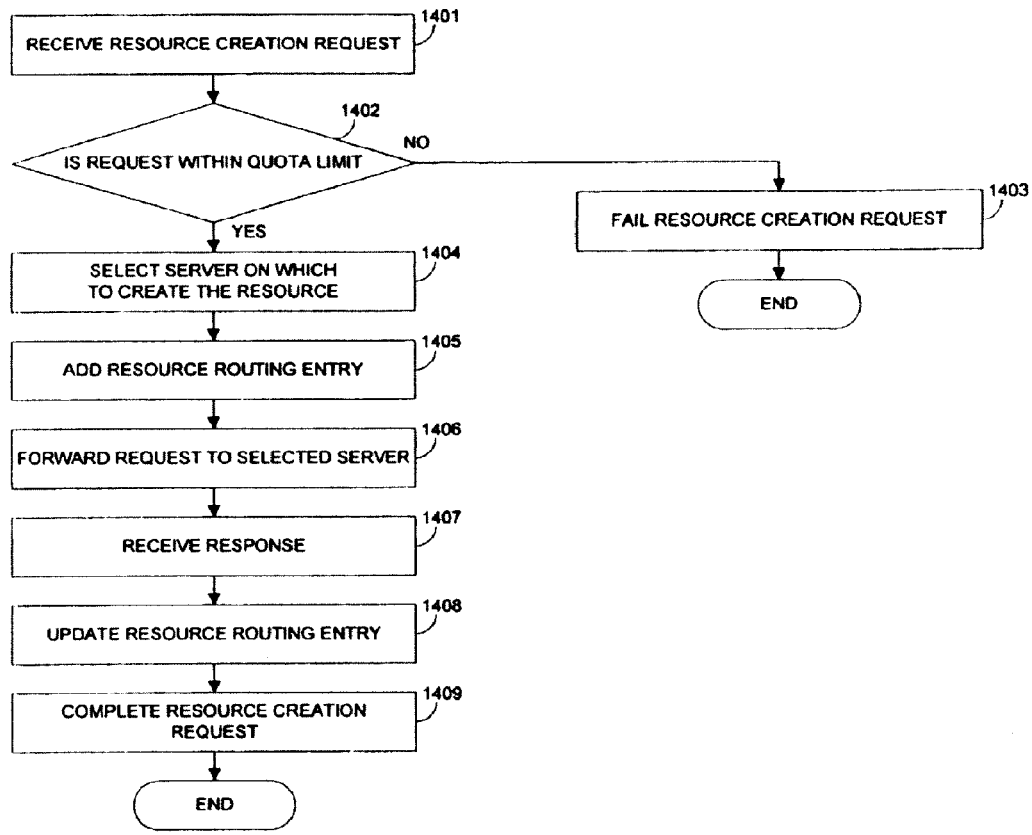
FIG. 14 illustrates the preferred logic flow used by the inventive grid switch for creating a new resource.

FIG. 14 illustrates the preferred logic flow used by the inventive grid switch in creating a new resource for an aggregated process. In step 1401, the grid switch receives a resource creation request sent by the agent on one of the member servers for the process. The request preferably identifies the aggregated process for which the request is made, the server from which the request originates, the type of resource requested, and, for some resources, the resource ID referred to (e.g., for memory resources, the logical address of the memory location). The request preferably also contains the thread context of the thread that requested the creation.

In step 1402, the grid switch checks whether if the resource creation succeeds, it will fit within the quota limits. If no, in step 1403 the grid switch fails the resource creation request by responding to the creation request with error, which ends the resource creation flow. If the resource fits within the quota, the grid switch proceeds with step 1404.

In step 1404, the grid switch selects the server on which to create the new resource. In order to select the server, the grid switch preferably uses the resource distribution discipline currently applicable to the process among the distribution disciplines described in this disclosure. Depending on the selected discipline, the grid switch may further use the member server table and its statistics, as well as the server table and its statistics, in order to make the selection.

In step 1405, the grid switch updates the resource routing table by adding a new resource routing entry for the new resource and storing the server ID of the server on which the resource will be created; if a unique resource ID assigned by the switch is needed for the resource, the switch further assigns such ID and stores it in the just-created resource routing entry. In step 1406, the grid switch forwards the resource creation request to the selected server which becomes the resource host for the new resource. In step 1407, the grid switch waits until it receives the response from the resource host. In step 1408, the grid switch updates the resource routing entry, indicating the success of the resource creation and storing any local handle for the resource that may have been assigned by the resource host.

In step 1409, the grid switch completes the resource creation request that it received in step 1401, indicating the success of the request and providing the unique resource ID if it assigned one in step 1405.

One skilled in the art will appreciate the request forwarded in step 1406 may be modified to indicate that the requesting thread is to be hopped and accepted to run on the resource host, so that it will re-issue the resource creation locally on that server.

One skilled in the art will further appreciate that other embodiments of the present invention may use different flow to create the requested resource on a server selected by the resource distribution policy, and that the invention applies equally regardless of such variations.

When the grid switch receives a resource destroy request, it locates the resource routing entry for the requested resource, extracts the server ID of the resource host, and forwards the destroy request to that server. Additionally, the grid switch removes the resource routing entry for the destroyed resource.

Access to Resource

Figure 15:
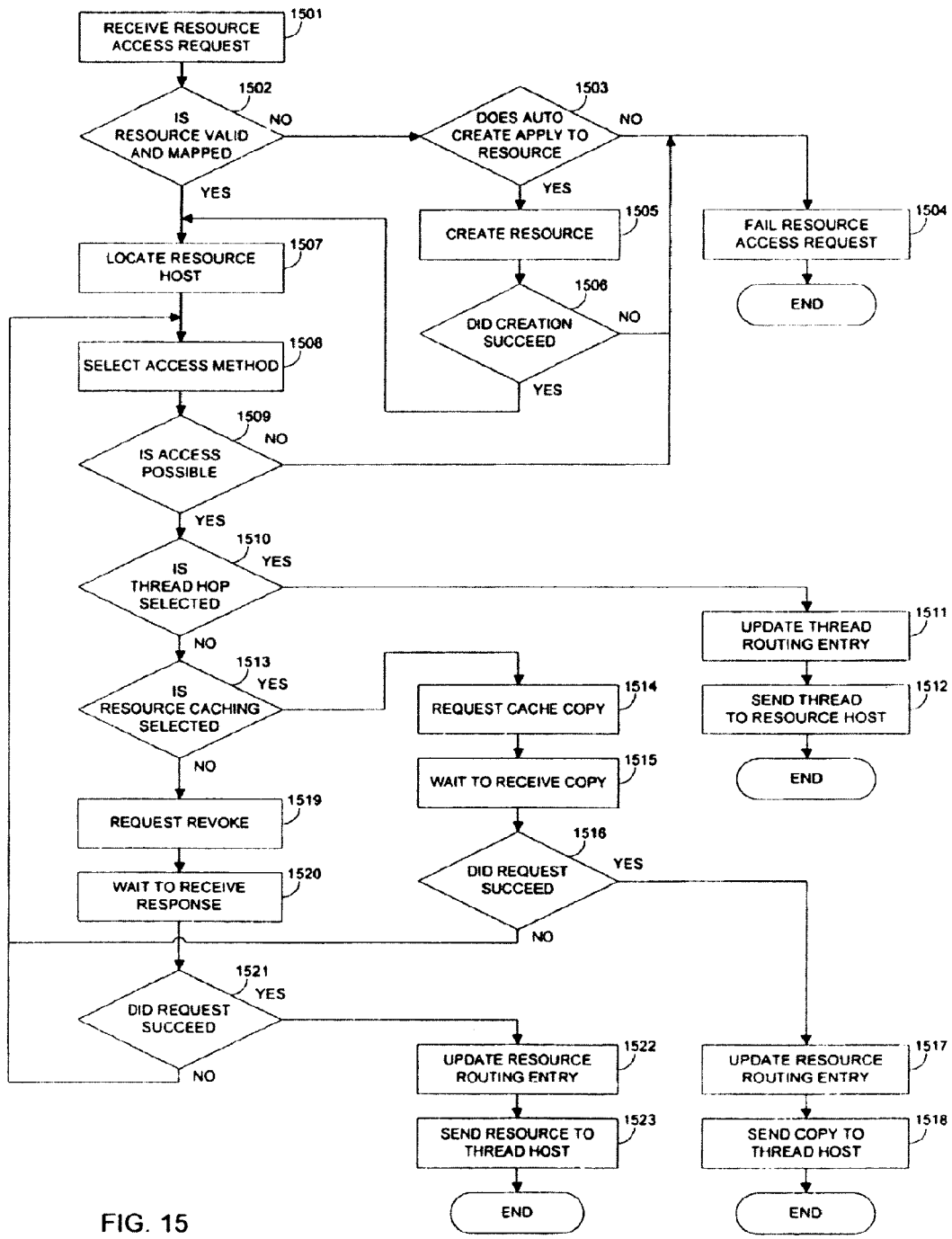
FIG. 15 illustrates the preferred logic flow used by the inventive grid switch for providing resource access.

FIG. 15 illustrates the preferred logic flow used by the grid switch in providing access to resources. In step 1501, the grid switch receives request to access a resource. The request preferably includes the process ID of the requesting process, the server ID of the server on which the thread requesting access runs (the thread host), the resource type of the resource to be accessed, the resource ID of the resource to be accessed, and the thread context of the thread requesting access.

In step 1502, the grid switch checks whether the provided resource ID refers to a valid resource. If yes, the grid switch proceeds with step 1507. If not, in step 1503 the grid switch checks whether the type of resource is such that a resource unit is automatically created upon first access request (e.g., for memory resources). If it isn't to be created automatically, e.g., a semaphore or file, in step 1504 the grid switch fails the access request by replying to the request with error, which completes the resource access handling. If the resource is to be created automatically upon first access, as determined in step 1503, the grid switch creates the resource in step 1505, preferably according to the logic flows and other descriptions provided in this disclosure. In step 1506, the grid switch checks whether the creation is successful. If it isn't, e.g., in case of invalid memory location or exceeded quota, the grid switch proceeds to fail the request in step 1504. If the creation is successful, the grid switch proceeds with step 1507.

In step 1507, the grid switch locates the resource routing entry for the requested resource and extracts the server ID of the resource host server, which is the server at which the resource resides. In step 1508, the grid switch selects a particular access method, preferably according to policies applicable for the process and the type of resource.

In step 1509, the grid switch checks whether the access is possible, including that a resource access method was selected and available. If access is not possible, e.g., no access method is available for the type of resource and/or all access methods have failed, the grid switch proceeds with step 1504 to fail the access request. If access is possible, the grid switch proceeds with step 1510.

In step 1510, the grid switch checks whether the selected method is a thread hop. If it isn't, the grid switch proceeds with step 1513; if it is, the grid switch proceeds with step 1511. In step 1511, the grid switch updates its thread resource routing table for the process to record the server ID of the resource host as a server ID where the thread will reside. In step 1512, the grid switch forwards the request received by the thread host to the resource host, further indicating in the request that a thread hop is to be performed and that the resource host should accept the thread for execution. This step concludes the handling of access request in case the thread hop method is selected.

In step 1513, the grid switch checks whether the access method selected in step 1508 is resource caching. If it isn't, the grid switch proceeds with step 1519; if it is, the grid switch proceeds with step 1514. In step 1514, the grid switch generates and sends an "acquire-shared" request to the resource host, which requests a cacheable copy of the resource. The request preferably contains the process ID, the resource type and resource ID, as well as an indication that the request is for a cacheable copy of the resource. In step 1515, the grid switch waits until a response is received from the resource host. In step 1516, the grid switch checks whether the acquire-shared request was successful. If it wasn't, the grid switch returns to step 1508 to select another access method. If the request was successful, the grid switch proceeds with step 1517, in which it updates the resource routing entry for the resource to include the thread host as a server that has a cached copy of the resource. Further, in step 1518, the grid switch sends the copy of the resource to the thread host that requested access, thus completing the handling of the resource access request.

In step 1519, the grid switch generates and sends a "revoke" request to the resource host, indicating that the resource host should give up the resource, so that it can be reassigned to another server. In step 1520, the grid switch waits until it receives the response to the revoke request. In step 1521, the grid switch checks whether the revoke request was successful; if it wasn't, the grid switch returns to step 1508 to select another access method. If the revoke request was successful, the grid switch proceeds with step 1522, in which it updates the resource routing entry for the resource, setting the server ID of the thread host as a new resource host for this resource. Further, in step 1523, the grid switch sends the resource data received in the response in step 1520 to the thread host, thus completing the handling of the resource access request.

One skilled in the art will appreciate that other embodiments of the present invention may use variations of the described logic flow to handle resource access request, and that the invention applies equally to such variations. One possible variation is to provide RPC method of handling the access request, by forwarding the request to the resource host and, upon receiving the response, forwarding such response to the thread host, thus completing the resource access request. Another variation may include waiting for a pinned resource to become unpinned in order to use the resource reassignment and resource caching methods.

The selection of a resource access method is preferably based on resource type, policy applicable to the process and statistics for the resource and thread host servers, as well as statistics for the resource and the thread that requested access; in a simple embodiment, thread hop is always the preferred method for unary operations, and resource reassignment and thread hop for binary operations.

Figure 16:
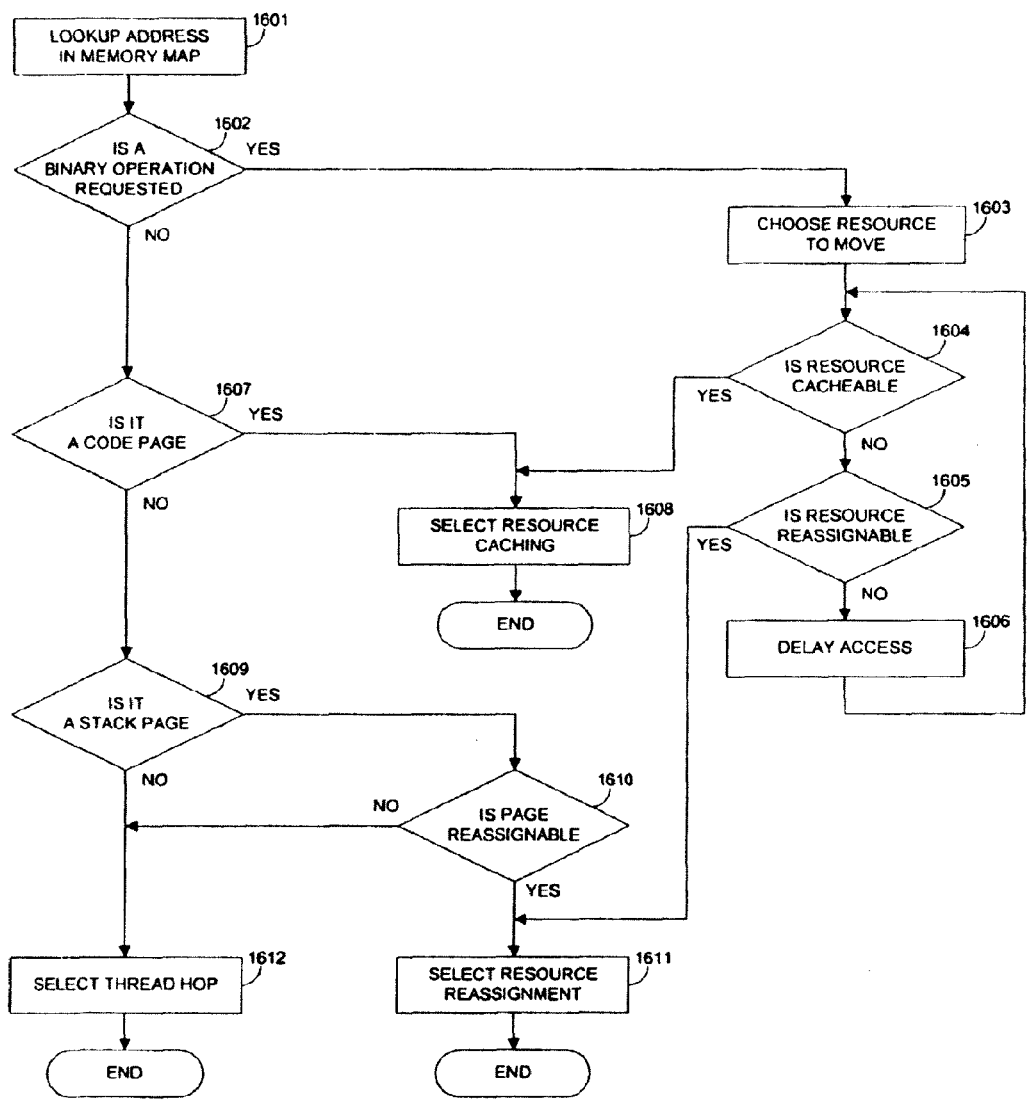
FIG. 16 illustrates the preferred logic flow used by the inventive grid switch for selecting resource access method for memory resources.

For memory resources, the selection is preferably also based on the type of memory needed by the thread. FIG. 16 illustrates the preferred logic flow in selecting the resource access method for memory access.

In step 1601 the grid switch looks up the memory map in the process routing table for the requesting process, to find which memory segment the requested page belongs to and determine the type of memory requested: code, stack or heap. Any other types are mapped to code if read-only, to stack if thread-private, and to heap otherwise.

In step 1602, the grid switch checks whether the requested access is for a binary operation. If it is not, the grid switch proceeds with step 1607. If the requested operation is binary, in step 1603 the grid switch chooses which of the two resources to move, by caching or reassignment. If both resources are memory resources, the grid switch preferably chooses the source page; if one of the resources not memory, the grid switch chooses the other resource, which is a memory resource. In step 1604, the grid switch checks to see if the resource selected for moving is cacheable (e.g., it is a code page or infrequently modified page, and the resource caching method has not failed for this page); if it is, the grid switch proceeds with step 1608. If it is not cacheable, the grid switch proceeds with step 1605.

In step 1605, the grid switch checks whether the memory page selected for moving in step 1603 is reassignable (e.g., it is not device memory and the resource reassignment method has not failed for that page). If it is, the grid switch proceeds with step 1611. If it is not reassignable, in step 1606 the grid switch preferably waits for the memory to become cacheable or reassignable, e.g., to be unpinned, and returns to step 1604.

In step 1607, the grid switch checks if the requested memory page is a code page. If it isn't, the grid switch proceeds with step 1609. If it is a code page, the grid switch proceeds with step 1608. In step 1608, the grid switch selects resource caching as access method and completes the method selection.

In step 1609, the grid switch checks if the requested memory page is a stack page. If it is, and it is a stack page of the requesting thread's stack, in step 1610, the grid switch checks whether the page is reassignable (i.e., the reassignment method has not failed for this page). If it is not reassignable, the grid switch continues with step 1612. If it is reassignable, the grid switch proceeds with step 1611. In step 1611, it selects resource reassignment as access method and completes the method selection.

In step 1612, the grid switch selects the thread hop as access method and completes the method selection.

One skilled in the art will appreciate that the logic flow for selecting access method can be varied to include statistics, further balancing load on the servers and increasing resource locality, as well as to include fewer and/or additional access methods.

Creation of a Thread

The grid switch processes thread creation requests preferably using the same logic flow as for creating resources. One skilled in the art will appreciate that other ways to distribute the threads of the aggregated process are possible and that the invention equally applies regardless of the particular way used to distribute the threads.

Load Rebalancing

The grid switch preferably receives periodically load statistics for all servers in the system. The statistics for each server preferably include processor utilization percentage, memory utilization percentage and number of threads ready to run, averaged over the period. The grid switch preferably compares these values for the different servers, and if the difference exceeds a predetermined value, the grid switch performs rebalancing.

To rebalance the load, the grid switch preferably reassigns some resources from a more loaded server to a less loaded server, resulting in improved resource balance. As threads hop to access the moved resources, the processor load of the server also rebalances.

Adjusting Number of Servers for an Aggregated Process

The grid switch preferably monitors the number of threads ready to run but not running and the number of threads running in each of the member servers for each aggregated process. This metric shows whether the aggregated process needs more processing resources or less processing resources. If there are many threads ready to run consistently across all member servers, this means that adding more servers to the aggregated process will increase its performance. If there are many servers with no threads ready to run or running, this means that the aggregated process may be limited to fewer servers, which will increase resource locality and free up servers for other aggregated processes.

When increasing the number of servers on which a given aggregated process runs, the grid switch preferably checks the quota limit as well as the policy applicable to the process, to ensure that additional servers are allowed to be added to the process. If the check allows such increase in number of servers, the grid switch preferably selects the additional servers, and sends them a process creation request for member processes of the aggregated process. Once the requests complete, the grid switch preferably reassigns some resources from the previous set of servers to the new servers, so that the process starts using resources of the new servers. Additionally, new resources that are created by the process can now be created on any of the member servers, including the old set and the newly added set.

When decreasing the number of servers on which a given aggregated process runs, the grid switch preferably checks the policy applicable to the process, to ensure that the policy allows the process to run on fewer servers. If the check allows the reduction, the grid switch selects the subset of member servers to remove, and reassigns all of the resources they hold for the aggregated process on the remaining member servers. Whenever one of the selected servers successfully disposes of its resources for the process, the grid switch destroys the member process on that server. After completing the resource reassignment, the aggregated process has its resources distributed to fewer servers, resulting in higher probability of local access and reducing the total number of member processes in the system.

Moving a Process to Another Grid Switch

There may be a need to move the process control and management for an aggregated process from one grid switch to another. The reasons for doing this preferably include load balancing between multiple grid switches in the system, as well as moving all processes out of a given grid switch in order to shut it down for maintenance.

Moving a process control preferably includes the following steps: (a) send process suspend request to all member servers, which results in stopping the execution of the process; (b) wait until all member servers complete the suspend; (c) package all the process routing information—the process routing table, together with all its contained tables—of the process to be moved and send it to the new grid switch; (d) unpackage the process routing information into the routing tables of the new grid switch and include the process in its process table; (e) send a grid switch identifier, such as the grid switch's network address, to all member servers, so that they will send any subsequent requests regarding this process to the new grid switch; and (f) send a resume request to all member servers for that process, upon which the servers resume the execution of the aggregated process.

Checkpointing a Process

Applications that perform long computations frequently record intermediate results, or "checkpoint", to persistent storage so that if the system fails and an application needs to be restarted, it can continue from the last checkpoint rather than from the beginning of the computation. In most prior art systems, this periodic checkpointing needs to be specifically programmed in the application. Such programming depends on the type of application and is often quite complex.

The present invention provides a transparent mechanism for checkpointing applications, without requiring specific programming in each application. This simplifies programming of new applications and allows existing applications that do not provide checkpointing to be automatically checkpointed. The administrator preferably defines in the policy parameters whether the system is to perform checkpointing for an application and how often to do it. One skilled in the art will appreciate that the checkpointing may be automatically initiated by the grid switch, by operator request, programmatically, and/or from another computer, such as a grid management system.

The grid switch preferably performs checkpointing of an aggregated process using the following steps: (a) send suspend request to all member servers for the process, (b) wait until all member servers stop executing threads of the process and complete the suspend requests, (c) send a serialize request to all member servers, which results in each of the member servers serializing all resources—including memory and other resources—used by the member process on that server to a persistent storage location specified in the serialize request, (d) store the process routing table for the process to the designated persistent storage, and (e) send a resume request to all member servers, so that the application continues its execution.

When an application is being restarted from a checkpoint, the grid switch preferably performs the following steps: (a) create all member processes preferably on the same number of member servers as when the process was checkpointed, requesting their creation in suspended state; (b) load the process routing table from the persistent storage and update the member server table with the correct server ID of the new servers; (c) send a deserialize request to all member servers, resulting in the member servers deserializing all resources of their respective member processes from persistent storage, and updating their local resource handles; (d) receive the updated local resource handles from all member servers and update the resource routing tables; and (e) send a resume request to all member servers, resulting in the application continuing execution from the restored checkpoint.

Summary

In this section we described the inventive grid switch and its primary functions in the process of creation, control and management of aggregated processes. By providing the necessary coordination between member processes, the grid switch plays a key role in fulfilling the primary purpose of the system.

Having this functionality handled by the grid switch simplifies the operation of the system by cleanly dividing the responsibilities between servers and grid switches, so that: (a) each server deals with the execution and management of individual member processes and the resources that reside on that server, and is preferably unaware that other servers participate in the execution of the same application instance; and (b) each grid switch handles the relationships between servers with respect to processes and resources, and knows the set of member servers for each aggregated process but is unaware of what the servers do and how they handle their local requests, as well as of the particular program algorithms that execute on the servers.

This division of responsibilities preferably removes the necessity to have each server know, or need to learn, where each resource resides; this removes the major need for broadcasts on resource creation, reassignment and/or access, which in other systems, such as distributed shared memory clusters, quickly leads to bottleneck in the interconnect as the number of servers in the system increases. The combination of these two node types—the servers and the grid switches—and the described inventive division of responsibilities between them results in a system that can scale to much larger number of servers and better utilize the available resources in executing applications.

4. Scaling the System

The present invention provides a system that can grow easily to a large number of servers, resulting in linear increase of the amount of resources available to applications. Unlike the less scalable prior art systems, which need to be built from high-end servers in order to achieve high overall system performance, systems built with the present invention use a larger number of standard, commodity servers to reach the same or even higher system performance at much lower cost.

The inventive system provides higher performance and capacity, by preferably scaling in two dimensions: by adding more servers and by adding more grid switches.

Adding Servers

The present invention provides for scaling the system to the desired capacity and performance values simply by adding more servers to the system, each server providing additional memory, processing power and other resources. The additional servers can be used to increase the resources available to a single process, e.g., by adding more member servers to an aggregated process, as well as to run more processes concurrently.

The new servers preferably have the same or compatible processors and run the same operating system as the servers already in the system. The new servers can be added to a running system without disrupting processes already running in that system, by assigning to them server ID that don't overlap with the server ID of already existing servers in the system. The grid switches include the added servers in their server tables, thus making them available for new processes, as well as for increasing the number of member servers of existing processes.

When adding new servers to aggregated grid, the selection of type and capacity of the servers is preferably determined by the needs of the applications that will run on the aggregated grid. For example, adding servers with lots of memory and few weak processors will increase the amount of memory in the system without significantly increasing the processing performance of the system (other than from reducing virtual memory thrashing); adding servers with many and high-performance processors will significantly increase the performance; and adding servers with multiple network cards or other specialized hardware will increase the I/O bandwidth of the aggregated grid. This approach allows the tuning of the system to the needs of the applications, without buying unnecessary hardware. Alternatively, the new servers can be well balanced, providing the simplest and most cost efficient way to expand the system for a generic set of applications.

Further, the servers added to the system may use processors with architecture different from the processor architecture of the servers already in the aggregated grid, allowing the system to execute natively applications written for these newly added processors. For such grids, when starting a new process, the grid switches preferably select member server subsets for the process by including only servers that can run the process natively.

The addition of the new servers is preferably performed in a centralized fashion, e.g., by an administrator sending requests to all grid switches, the requests preferably containing the server ID, network address and configuration data for each of the new servers. One skilled in the art will appreciate that the procedure for such centralized addition of servers can be automated, and that the decision to add the new servers and the discovery of such servers can be performed by a program, such as a grid or cluster management system.

Adding Grid Switches

The inventive grid switch is preferably capable of controlling more than one aggregated process. As more processes need to run concurrently in the system, it becomes desirable to add more grid switches, so that individual grid switches will not be overloaded by having to control, dispatch requests and store information for a large number of processes at the same time.

Depending on the applications being run on the system, and on their resource access patterns, the ratio between grid switches and servers may vary, to ensure that there is a sufficient number of grid switches to control the processes running on the servers. The preferred ratios range between 1:8 and 1:32. The ratio further depends on the performance of the grid interconnect, the number of grid interconnect ports in each grid switch, as well as on the performance of individual grid switches.

New grid switches can be added to the system without disrupting already executing processes. In order to balance the load among the grid switches, once the new grid switches are added, some processes may be moved from some of the old grid switches to the newly added grid switches. To select on which grid switch a new process will start, the inventive system preferably uses one of the distribution disciplines described in this disclosure, such as round-robin, load-weighed, etcetera.

Adding new grid switches is preferably done in a centralized fashion, e.g., by an administrator sending requests to all nodes in the grid interconnect, the requests preferably containing the network address and other address and configuration data about the new switches. One skilled in the art will appreciate that the procedure for such centralized addition of grid switches can be automated, and that the decision to add the new grid switches and the discovery of such grid switches can be performed by a program, such as a grid or cluster management system.

Scaling a Process Beyond a Switch

When there is a need to distribute a single aggregated process to a large number of processors and have a large number of servers as member servers for the process, a single grid switch controlling the process may become a bottleneck in serving resource creation and access requests. Because such requests are served by the grid switch and the grid switch preferably has a limited number of grid interconnect ports, memory and processing power, the bandwidth of a single grid switch can be exceeded as the number of request exceed a certain amount.

In the preferred embodiment, the software on the grid switch controlling a single aggregated process is itself an application, called a "process control application". The process control application is executed by the grid switch, which is preferably a computing device with memory, processors and operating system. For the purpose of running the process control applications, the grid switch acts as a server—it manages and executes the instances of the process control application. Using the present invention, a separate grid switch, or a master switch, can be assigned to manage individual instances of the process control application as aggregated processes, and the grid switches to execute member processes for it.

One skilled in the art will appreciate that the master grid switch is preferably programmed the same way as the grid switches that control user applications, and that more than one master grid switch may control the different instances of the process control application.

If a single aggregated process needs an even larger number of servers and a single master grid switch becomes a bottleneck, the master process control application itself can be further aggregated by a higher level master grid switch which controls member processes of the process control application running on the master grid switches. One skilled in the art will appreciate that the process of adding higher level master grid switches can be continued in the same recursive fashion in order to achieve the desired performance, capacity and bandwidth for executing applications in the system.

One skilled in the art will appreciate that other embodiments of the present invention may use other ways of combing multiple grid switches for the purpose of controlling a single aggregated process, such as clustering grid switches in an application-specific cluster for executing the process control application, or assigning different resource types of the aggregated process to be controlled by a different grid switches, or partitioning subsets of resources to be controlled by different grid switches, etcetera; and that the invention applies equally regardless of such variations.

A Practical System

In order to facilitate the disclosure, the inventive system description so far referred to a relatively simple system, such as the system described in FIG. 2. A number of considerations may be taken into account when building any particular system under the current invention. These considerations include manageability, scalability, persistent storage, adequate interconnect bandwidth, connection of the system to the outside world, etcetera.

To illustrate how such considerations can be taken into account, we will now describe a second embodiment of the present invention which is based on the same servers, grid switches, aggregated process and methods.

Figure 17:
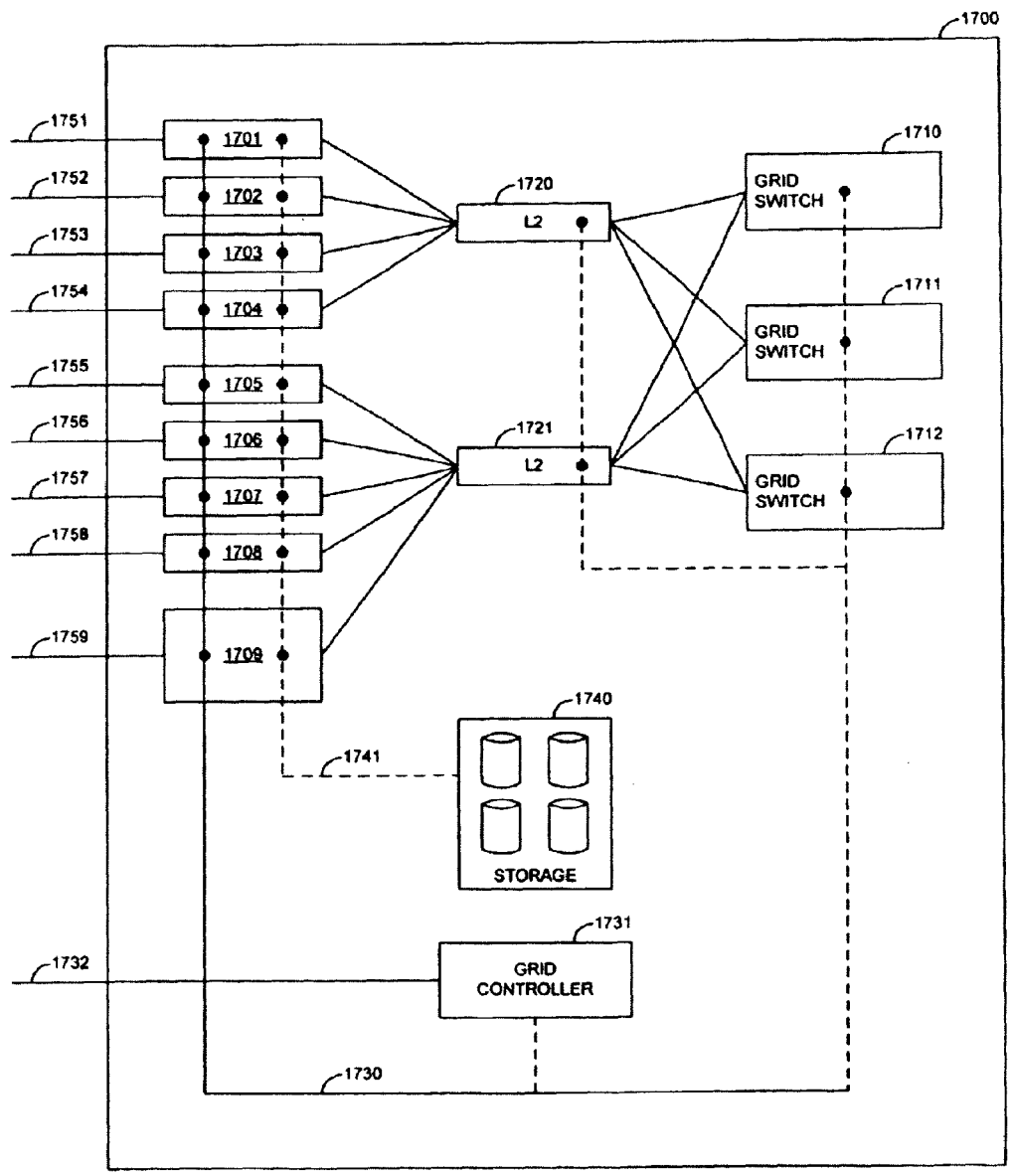
FIG. 17 illustrates a second embodiment of the present invention.

FIG. 17 illustrates the second embodiment. The inventive system 1700 comprises:

(a) a plurality of servers, such as the servers 1701-1708; each server is a commodity 64-bit computer based on AMD Opteron processors and having 4 GB of RAM, grid interconnect host adapter, a storage network host adapter, as well as two Gigabit Ethernet adapters. Each of the servers is preferably programmed with the inventive agent.

(b) one or more legacy servers, such as the server 1709, which participate as servers in the aggregated grid. The legacy servers can be any NUMA or SMP servers that are programmed with the inventive agent and have a grid interconnect host adapter. Examples of legacy servers include the Sun Fire 12000 from Sun Microsystems, or the 64-way Integrity Superdome from HP.

(c) a plurality of grid switches, such as the grid switches 1710-1712; each grid switch is an appliance based on a 64-bit computer having 4 AMD Opteron processors, 32 GB of RAM, two grid interconnect host adapters and two on-board Gigabit Ethernet adapters. The grid switches are preferably programmed according to the present invention.

(d) a plurality of grid interconnect layer 2 switches, such as the switches 1720 and 1721, connected so that each server can access any grid switch and vice-versa. The switches preferably have 10 Gigabit/sec ports, such as the 4.times. Infiniband switch Topspin 360, and compatible with the grid interconnect host adapters in the servers 1701-1709 and the grid switches 1710-1712. The grid interconnect is preferably separate from any other networks in order to ensure highest performance and lowest latency possible for the aggregated applications.

(e) a grid controller 1731 which is preferably a 64-bit commodity computer based on AMD Opteron, further comprising two processors, 4 GB RAM, and two Gigabit Ethernet adapters. The grid controller preferably controls the system 1700, presents a unified management view of the system, collects and distributes server and grid switch statistics, initiates automatic checkpointing, and may optionally direct process creation requests to less loaded grid switches.

(f) a storage network 1741, for accessing persistent storage, such as a Fibre Channel network. It is separate from other networks in order to provide dedicated high performance and accommodate traditional media and architectures used in storage systems. The network may include a number of layer 2/3 switches, such as the Silkworm 3900 from Brocade Communications Systems.

(g) a scalable storage system 1740, preferably based on Fibre Channel RAID arrays, such as the Symmetrix 3000 series from EMC. The storage system is used to keep persistent data used by applications running on the inventive system.

(h) a management network 1730, used to manage the servers 1700-1709, the grid switches 1710-1712 and the grid controller 1731. The management network is preferably a Gigabit Ethernet network, which is less expensive than the grid interconnect and storage networks, and provides dedicated access for management. The separate management network preferably improves security, makes it possible for the system to be controlled remotely, and improves the manageability of the system in case of failure of one of the other networks. The network 1730 may include layer 2 switches such as the PowerConnect 5224 from Dell Computer. The management network may be connected to any Fast Ethernet or Gigabit Ethernet management ports of the storage system 1740. The management network 1730 may further be connected to some remote systems, such as over wide area network, in order to allow remote control and monitoring of the inventive system.

Each of the servers 1701-1709 is connected to the grid switches 1710-1712 using the grid interconnect built on the layer 2 switches 1720 and 7121. The servers 1701-1709, the layer 2 switches 1720 and 1721, the grid switches 1710-1712, and the grid controller 1731 are preferably connected via the management network 1730 using at least one of their Gigabit Ethernet adapters. The servers 1701-1709 are preferably connected to the storage system 1740 through the storage network 1741, using their storage network host adapters. Further, some or all of the servers 1701-1709 have one of their Gigabit Ethernet adapters used for connecting to an external to the system network, through the network connections 1751-1759, respectively. The grid controller 1731 is preferably connected to an external to the system network, via the connection 1732, using one of its Gigabit Ethernet adapters.

One skilled in the art will appreciate that the system 1700 appears as a large, scalable, high-performance server, with its own RAM, large number of processors, and persistent storage, as well as with multiple network adapters for the external connections 1751-1759 and a management connection 1732.

Grid Controller

The grid controller 1731 is preferably a computer that performs all functions typically performed by cluster controllers or cluster master nodes, including load monitoring, node membership control, health monitoring, lifecycle control, etcetera. The grid controller is the preferred grid management system referred to elsewhere in this disclosure.

The grid controller preferably provides timely information about the load and other statistics from the servers to the grid switches, so that the grid switches can make good load-balancing decisions. The grid controller further preferably monitors the load on the grid switches, and upon detecting significant load differences, initiates movement of process control from more loaded to less loaded grid switches.

The grid controller serves as a central management point for the aggregated grid system, so that changes to policies, configuration, etcetera, can be done for multiple grid switches and multiple servers from a single place. For example, when new servers are added to the system, the grid controller is preferably the node in the system that requests that all grid switches add the new servers to their server tables. In addition, the grid controller preferably selects the master-level grid switches whenever a single large aggregated process needs to be controlled by multiple grid switches.

The grid controller serves as a central point for aggregating the management view of the system, allowing the system to be managed as a single computer and the management and monitoring utilities receive consistent information for the system as a whole. For example, when the Unix/Linux "ps" utility is run, which displays the list of running processes in a computer, the grid controller will preferably display the list of all processes in the aggregated grid, regardless of on which server each process is running, and show each aggregated process once, hiding all its member processes.

Legacy Servers

In most environments, businesses, academia and laboratories already have multi-processor servers in place that they may want to include in the aggregated grid. The reasons for including such servers range from simply centralizing management of the system, to process-level load balancing, to aggregating multiple legacy servers with the inventive grid switch in order to run applications with higher performance.

As more of the high-end servers, such as the HP Integrity Superdome, are being based on commodity 64-bit Intel Itanium2 processors and run Linux—the same processors and operating system used in many commodity servers—it is possible to also include such legacy servers to be aggregated with the remaining servers in the grid to run a single aggregated process together (preferably provided that the remaining servers have the same processor architecture).

To become included in the aggregated grid, the legacy server is preferably programmed with a version of the inventive agent that is compatible with the legacy server's processor architecture and operating system. Aggregating multiple legacy servers allows scaling applications written for those servers to scale beyond what is possible with even the highest-end versions of those servers, without having to port the applications.

By combining servers with different architectures, the inventive system provides a unified system that can execute applications designed and written for different processor architectures transparently to administrators and programs that start such applications automatically.

Variations

One skilled in the art will appreciate that other embodiments of the present invention can use variations of the described system, and that the present invention applies regardless of such variations. One variation includes using an administrator- or grid controller-designated subset of the servers as grid switches, e.g., by causing servers from that subset to load and start the grid switch software. Another variation includes running the software of the grid switch on a plurality of the servers, making the grid switch function as a second function of the servers and not having separate grid switch appliances in the system. Yet another variation may include hardware acceleration adapters to accelerate the functions of the grid switches. One other variation includes building the grid switches by using a cross-bar architecture that provides higher throughput and stores the incoming requests in special buffer memory instead of in the main memory controlled by the grid switch processor.

Further variations include running the grid controller software on one or more of the grid switches; running the grid controller software on one or more of the servers; or running the grid controller software on a separate, specially programmed appliance, or simply a Unix/Linux workstation. The grid controllers, regardless of their implementation, may be clustered for high availability, e.g., in a active-passive configuration. The system may also include one or more gateways that allow the grid controller and/or the grid switches to access the storage system 1740. Further, the storage system 1740 may be external to the system 1700, such as an existing SAN in a data center.

One skilled in the art will appreciate that the system can easily be extended to include a large number of servers and grid switches, higher performance and capacity interconnects, and to be modified to satisfy specific application needs.

Summary

For the purposes of administration and management, the inventive system appears as a single, highly scalable server with multiple network adapters, built-in storage, large number of processors and large amount of memory. Unlike traditional high-end servers, the inventive system has the following characteristics:

(a) the system scales easily and incrementally with respect to the resources it provides to applications;

(b) the system can be built from commodity, mass produced servers and using an inexpensive or commodity, mass-produced, standards-based interconnect;

(c) it is an open system, in which different nodes—servers, interconnect switches, grid switches—can be purchased at different times and from different vendors, using the nodes that are most appropriate based on price and features;

(d) unlike clusters and proprietary SMP/NUMA systems, it runs existing applications without complex software porting to use message passing or proprietary operating systems;

(e) the system makes it easy to write new scalable applications that can take advantage of a practically unlimited amount of resources.

The inventive system has an application architecture that makes it suitable for any computer application where high performance is desired, including: executing existing SMP/NUMA server software; executing Java and other non-native applications using virtual machines without sacrificing performance; executing message passing applications with better performance taking advantage of the common memory provided by the system; executing OpenMP or similar applications.

Alternate Embodiments

Since the functionality of the inventive system can be implemented entirely in software, various mappings between logical entities, such as grid switch, grid controller and server, and the actual physical computing devices in the system may exist.

In one embodiment, some of the servers are designated and configured as grid switches. Such servers execute the grid switch software on standard hardware to reduce system cost and allow for flexible changes of the ratio between application servers and grid switches to accommodate various workloads.

In another embodiment, some or all servers are designated to be both application servers and grid switches, and execute the grid switch software, the agent and the application. In addition to reducing the system cost, this embodiment makes it possible to maintain one-to-one ratio between application servers and grid switches and to dynamically re-assign processing resources between grid switches and the application in an optimal fashion.

In a yet another embodiment, grid switch software executes together with the agent and the application on the same physical server(s) but has an individual CPU, or a subset of the CPUs available on that server, assigned exclusively to execute the grid switch code. In addition to achieving more predictable response times, this embodiment also optimizes the use of CPU caches achieving greater overall performance.

The functionality of the inventive system may also be divided between software and hardware. In such embodiments, the fast path operations of the grid switch and/or the agent, are implemented in hardware such as ASIC, FPGA or configurable logic.

In one embodiment, the hardware-implemented logic is integrated with the rest of the grid switch by means of integrating the appropriate chip(s) in the grid switch device.

In another embodiment, the software portion of the grid switch and/or the agent is integrated with the hardware portion on an adapter board that is plugged into a standard interface (such as PCI Express) of some or all of the application servers.

In yet another embodiment, the fast path operations of the grid switch and/or the agent are implemented in software using a specialized processor, such as a network processor, and integrated with the rest of the grid switch/agent software. The network processor may be integrated on the grid switch hardware or be part of an adapter board plugged in the application server(s).

In another embodiment, the functionality of the grid switch and/or agent is implemented in software, designed to be downloaded and executed on the network interface adapter that connects application servers to the network.

5. Memory Architecture

Overview

Memory resources are preferably the key entities that are being managed within a computing system. Regardless of the type of object which applications request from the operating system, all are ultimately represented within memory either directly or by a reference.

Unlike applications that run on a single server which have all of their memory resources available locally, an application that runs as an aggregated process preferably is distributed across multiple servers where not all memory resources are available locally. Since the processing of the data can be handled only when the thread that does the processing is on the same server which holds the data been processed, the thread and the data must be brought together.

Prior art systems (e.g., DSM or MPI based systems) typically transfer the needed data over the network to the server designated to process it. This approach works well when the application is structured so that each thread manipulates a separate subset of data and relatively small portion of the data is shared among all threads. Most real world applications, however, require significant use of shared data; moreover, applications that interact over networks, such as database engines, web servers, file servers and many others, tend to evolve toward a model in which a set of worker threads operates over the full set of data, so that there is no pre-defined association between an individual thread and a subset of the data. In these conditions, moving memory to where the thread resides results in excessive load on the system interconnect.

In typical commodity interconnects, bandwidth is limited to 1 to 10 Gigabits per second and the network latencies are measured in tens of microseconds both of which limits the total amount of memory that can be transferred over the network without incurring significant time overhead.

The network limitation problems are especially visible in transactional applications where a big portion of the data is shared among the servers. When two or more servers access the same data, the data has to be copied to each of the servers repeatedly (since a single server may not be able to hold all the data in local memory), which saturates the network quickly. The latency problem is clearly visible when one considers the case of a hotly contested page accessed by multiple servers concurrently. Since the page is constantly accessed by different servers, it has to be moved to the server accessing it resulting in page thrashing. Moreover, whenever the page is in transit—which is in often during 90% of the time for such pages, the page becomes unavailable to any of the servers. The more often the page is accessed, the more time it spends in transit, the more time the system spends waiting for the page to become available. Since the time a page spends in transition is directly proportionate to the network latency, such systems will always suffer from higher network latencies.

The inventive system deals with the issues related to the network interconnect by utilizing thread move as a preferred mechanism for accessing shared data.

This section describes the memory architecture of an alternate embodiment of the inventive system, with emphasis on how memory is accessed, managed and load balanced.

Figure 18:
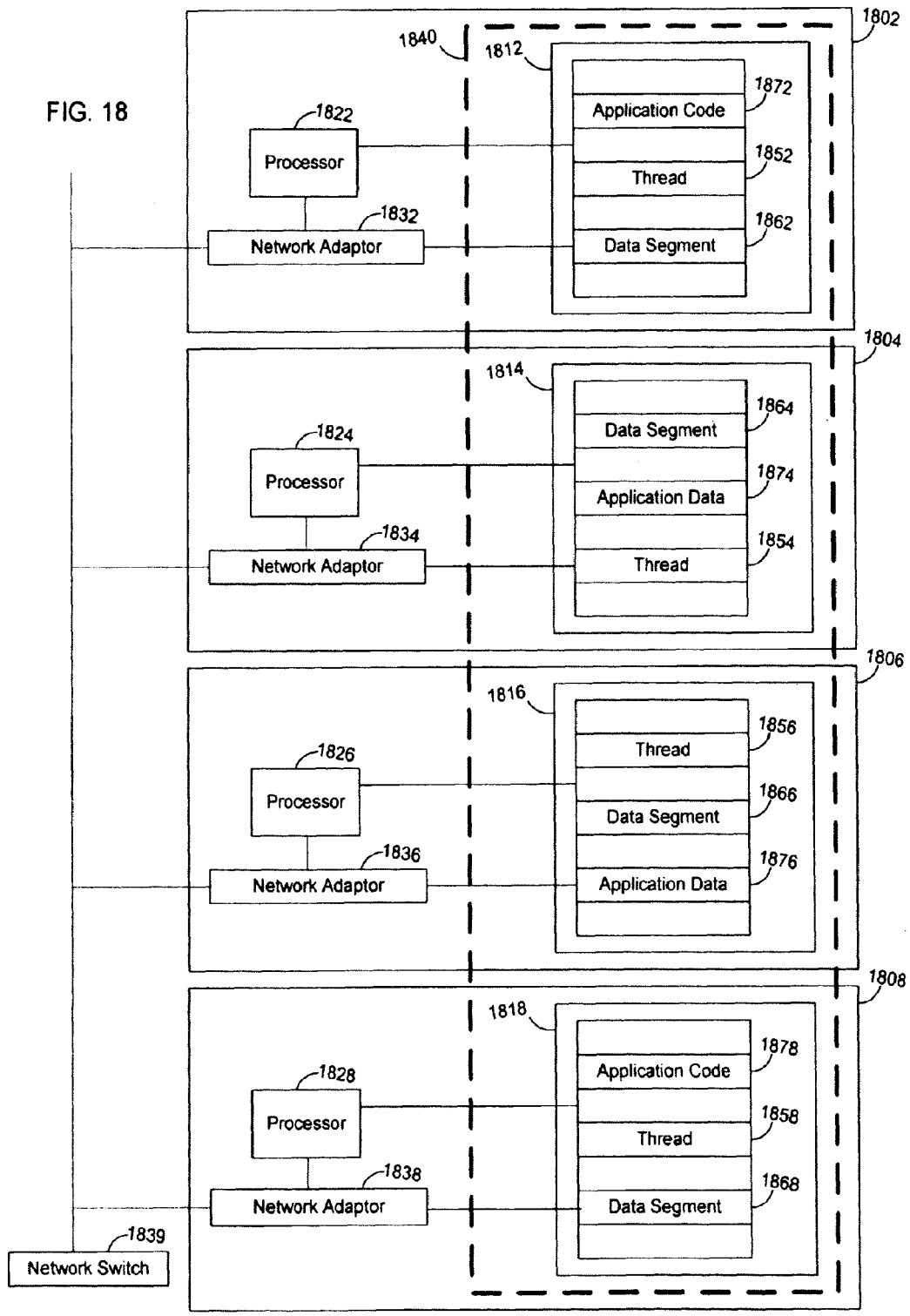
FIG. 18 illustrates the memory architecture of an alternative embodiment of the present invention.

First, this section provides an overview of the basic access mechanisms to aggregated memory illustrated in FIG. 18 as it applies to the inventive system. Then, this section provides a detailed description of inventive methods for managing the aggregated memory space so as to achieve the optimal performance of the application executing on the inventive system. Further, this section provides a detailed description of a method for maintaining the balance of memory across all servers within the system.

Finally this section provides an overview of advanced topics and improvements in relation to the memory architecture of the system.

Basic Access Mechanisms

FIG. 18 illustrates the basic memory architecture of a simplified inventive system comprising of four servers (1802, 1804, 1806 and 1808) each of which contains a memory (1812, 1814, 1816 and 1818), a single CPU (1822, 1824, 1826 and 1828) and a network card (1832, 1834, 1836 and 1838). The servers are connected through their network cards by the network switch 1839. (The terms "network" and "interconnect" are used interchangeably.)

Each CPU and network card has direct access to the memory and each CPU has a control access to the network card. Logically, the memory on all servers is interconnected through the network cards to form an aggregated memory space (1840) which an application running on the inventive system can use. Within the memory, there are threads (1852, 1854 and 1856) as well as data segments (1862, 1864, 1866 and 1868) that comprise an aggregated process running over the system.

In a typical single server system, when an application thread attempts to access a memory resource, the underlying hardware (memory management unit—MMU) verifies that the memory is available and in case it is not, raises a memory exception to the operating system. The operating system then suspends the thread that caused the exception, assigns a memory resource and resumes the thread operation.

In the inventive system, there are two different cases in which a memory exception can be raised: (a) when the memory resource is (or should be) located on the same server as the thread (e.g., thread 1852 attempts to access data 1862), or (b) when the memory resource is located on a different server (e.g. thread 1856 attempts to access data 1868).

Whenever the memory resource turns out to be located on the same server as the thread, the inventive system preferably lets the operating system handle the exception in the way it is handled for the single server case.

Whenever a memory resource is located on a different server, one of three possible methods are disclosed to place the thread and the memory resources on the same server so that the request may be satisfied by the local operating system. Those methods are: (a) a "thread hop", in which the threads is moved from its current server to the server on which the memory resides, (b) a "resource cache", in which the memory is marked as read-only and a copy of it is obtained from the server that currently owns it and cached on the server on which the thread resides, (c) a "resource reassignment", where ownership of the memory resource is transferred from its current server to the server on which the thread resides.

Thread Hop

The rapid transfer of a thread from its current server to the server on which the desired memory resource resides is known as a "thread hop". Such action may be performed if thread 1852, residing within memory 1812, attempts to access data 1864, which resides within memory 1814. Whenever a thread is hopped, its context is packaged and sent over the network to the server on which the memory resource resides, and is then unpacked and made ready to continue execution from the point at which it tried to access the memory resource. When the thread is so resumed, the attempt to access the memory as well as all subsequent accesses to the same resource will be satisfied locally on that server (by the operating system or by the hardware on that server).

Hopping a thread has several distinct advantages: (a) it is unidirectional, which means that it only requires a single message to be sent over the network, (b) it preserves the balance of memory resources across the inventive system because memory is not being moved around, and (c) it improves the CPU cache performance on all servers, by keeping the memory contents of those servers relatively constant.

When hopping a thread, the following information is expected to be available on the server to which the thread is hopped: (a) application code, (b) thread stack, (c) thread private data (sometimes in the form of thread local storage) and (d) the CPU context.

Since the application code (1872, 1874, 1876 and 1878) is usually not modified and quite small, it may be cached on all servers thus reducing the amount of information required on subsequent thread hops. Thread private data may pose a significant challenge in old-style applications where data is partitioned among threads; however, network-enabled and transactional applications are increasingly being designed with minimum or no thread private data.

The CPU context is usually saved on the top of the stack when the memory exception is generated, and so does not require separate handling.

In most practically important cases, thread hop requires only the transfer of small number of pages from the top of the thread stack.

Cache

While thread hopping is an effective mechanism for bringing together data and execution threads, in many cases caching the data on one or more of the servers is preferable. In general, whenever the system is dealing with data that is constant or modified relatively infrequently, caching such data utilizes unused memory to reduce significantly execution overhead and interconnect traffic.

The inventive system utilizes caching in the following way: for resources for which caching is considered useful, the system locates the server on which the resource resides, marks the resource as cached and read-only, transfers a copy of the resource to a server that may use it and marks it read-only on that server as well. Preferably, the system uses MMU to enforce the read-only status of the cached data and detect attempts to modify such data, so that the caching mode can be canceled and the data made modifiable in a manner transparent to the application code.

Memory resources that are typically cacheable are those that contain application code, read-only data (e.g., configuration data and input data) or infrequently modified data.

Move

Another way of bringing memory and execution threads together involves moving the memory page to the server currently running the thread. This method is useful when the operation of the thread involves simultaneous use of other resources that cannot be moved (such as hardware peripherals) or in any other situation where caching or thread hopping are not desirable.

When a memory resource is moved, the resource is destroyed on its current server and re-created on the server on which the thread resides along with any state of the resource transferred. Following the transfer of the memory, the thread is resumed and the attempt to access the resource is retried, this time with the accessed resource and the accessing thread been on the same server.

Variations

Although the preceding description of hop, cache and move methods deals with memory resources, one skilled in the art will easily see that the same methods can be applied to other computing resources in the system.

Summary

The inventive system avoids the limitations of the prior art by providing a set of resource access methods, including hop, move and cache, that can be used together to implement a variety of resource access strategies optimized by memory use and type of data residing in it. This combination also makes it possible to implement the inventive system using industry-standard hardware which typically has high interconnect latencies and small CPU caches.

Special Access Mechanisms

I/O Operations

The description in the preceding section assumed that the memory resources being accessed are freely moveable due to them not being associated with any fixed resource. This may not be the case when the memory resource is associated with an I/O device, such as a file, which is physically attached to a particular server.

When the memory resource becomes associated with a fixed resource (e.g., NIC card or a hard drive controller), the memory resource may become unmovable. Preferably, this is a temporary state and when the memory is no longer needed by this device, the memory resource will be released and it can restore its previous state.

An example of such resource is the file object (i.e., the memory in which the representation of the file object is stored). Whenever a read or a write operation to such file is requested, the I/O buffers (the memory to/from which data is read/written) may reside on a different server than the file object. In such case, the preferred access method is to move the memory buffers to the same servers where the file object is.

This access method is preferably applied to any I/O operation with any kind of I/O object (incl., file, socket, etcetera).

Binary Operations

Most memory resource access operations involve access to a single resource. However, especially in CISC CPU architectures, some operations may take two or more memory resources as arguments. Operations that take two memory resources are called binary operations; operations that take more than two resources are also termed binary since the access methods available for them are preferably the same as for operations with two resources. The access methods described above are utilized to bring together the thread and both resources in the following manner:

1. Thread 1852 residing on server 1802 attempts to access the first memory resource data 1864 which resides on server 1804.

2. An access method is chosen to bring together thread 1852 and data 1864. For example, thread 1852 may be hopped to the server 1804 on which data 1864 resides.

3. Now that thread 1852 and the 1.sup.st memory resource both reside on the same server, thread 1852 attempts to access the second resource data 1866 which resides within server 1806.

4. An access method is then chosen to bring on the same server all three resources: thread 1852, data 1864 and data 1866. In this case, data 1866 may be moved to the server 1804 on which thread 1852 and data 1864 are currently residing. When the thread and the two memory resources are placed on the same server the memory exception can be satisfied and the thread execution can be resumed.

Depending on the current state of the two memory resources, it may be decided to first place together the thread and the 2.sup.nd resource followed by bringing the 1.sup.st resource to where the thread is—this may be the case if for example, the 2.sup.nd resource can not be moved. In case both memory resources are unmovable, the system preferably suspends the operation until one of them becomes movable again and after the resource is moved the suspended operation is completed as described above.

Summary

The inventive system preferably provides special handling for I/O operations and memory operations over multiple memory pages residing on different servers. Those operations are performed by moving the pages to the server where the I/O device resides or bringing two or more pages on the same server. If this is not possible due to the resource been temporary unmovable (e.g., the resource is locked in memory), the application thread is suspended until the resource becomes movable again.

Memory Management

Overview

The present invention divides interactions with memory into two different categories: (a) memory access, which includes actions required to bring a thread and data together in real time, and is frequently hardware assisted, and (b) memory management, which includes all other actions, such as allocation, re-assignment and discarding/recycling pages.

Memory access preferably relies on the hardware memory management unit (MMU) to provide an exception when a memory page is not found locally or is missing appropriate access rights. For this reason, the inventive system preferably structures memory access in fixed-size pages as supported by given MMU (typically 4 kilobyte or 8 kilobyte per page).

Since the MMU pages are both small and fixed-size, making memory management decisions on a page-by-page basis is not a good choice. For this reason, the inventive system manages memory by defining segments covering a range of pages in a single management unit. The memory segment characteristics can then be defined by the application explicitly or the system can automatically recognize and designate them.

Memory Segments

Figure 19:
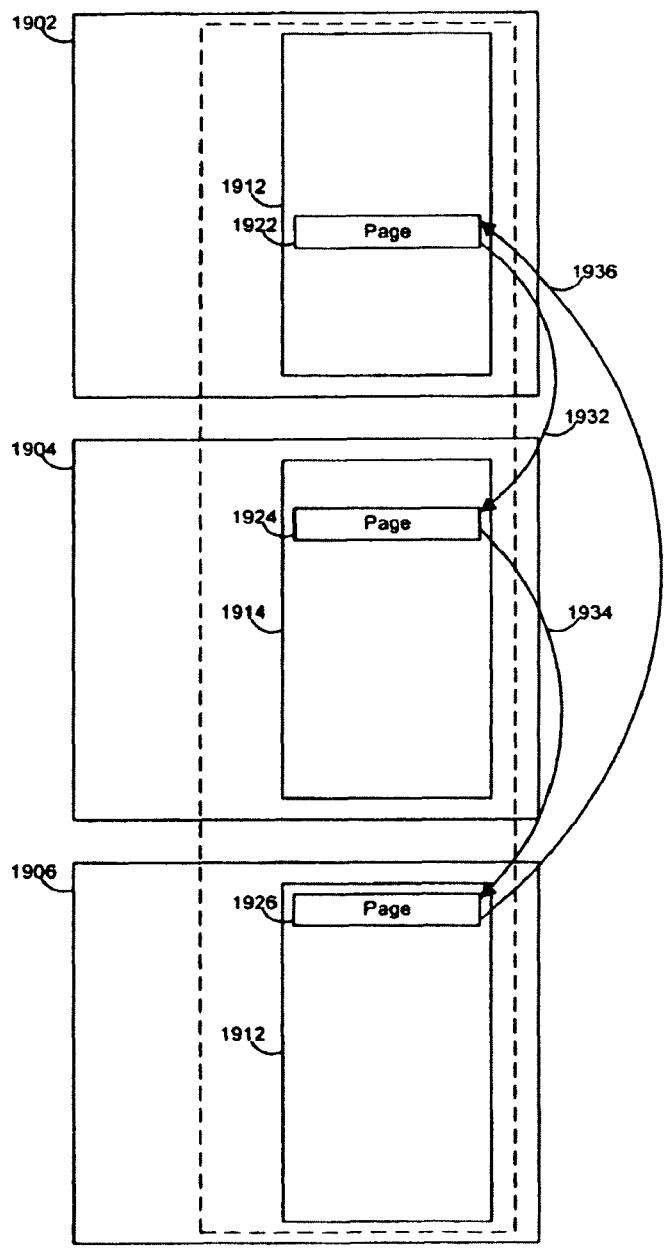
FIG. 19 illustrates a logical data structure distributed among multiple servers.

FIG. 19 illustrates a simplified inventive system comprising three different servers (1902, 1904 and 1906) each containing a memory (1912, 1914 and 1916, respectively). An application thread (not shown) executes its algorithm, for example, by walking in a loop through the memories 1922, 1924 and 1926. Each time it access a page on a new server, the thread makes a hop (1932, 1934 and 1936). Since memory is used by applications to hold logical data structures, tables, lists, queues, and other similarly organized data, it is clear that pages that do not reside on the same server may nevertheless be part of the same logical data structure as viewed by the application code.

Whenever such logically adjacent pages are placed on the same server, the number of network interactions in the system can be significantly reduced. The mechanism of identifying logically adjacent pages and bringing them together is known as a data locality improvement. Data locality improvement can be achieved in many different ways, including: (a) by a compiler or a virtual machine providing appropriate information to the system, (b) by the application supplying sufficient context to the system (e.g., by calling API), or (c) by the system itself observing interactions between threads and memory at runtime and adaptively relocating memory.

A set of logically adjacent pages managed by the inventive system as a single entity is known as a memory segment. Because different memory segments can contain different number of pages the segment size may vary. Please note that pages that make up a single segment do not have to be physically contiguous.

Segment Data Structure

Figure 20:
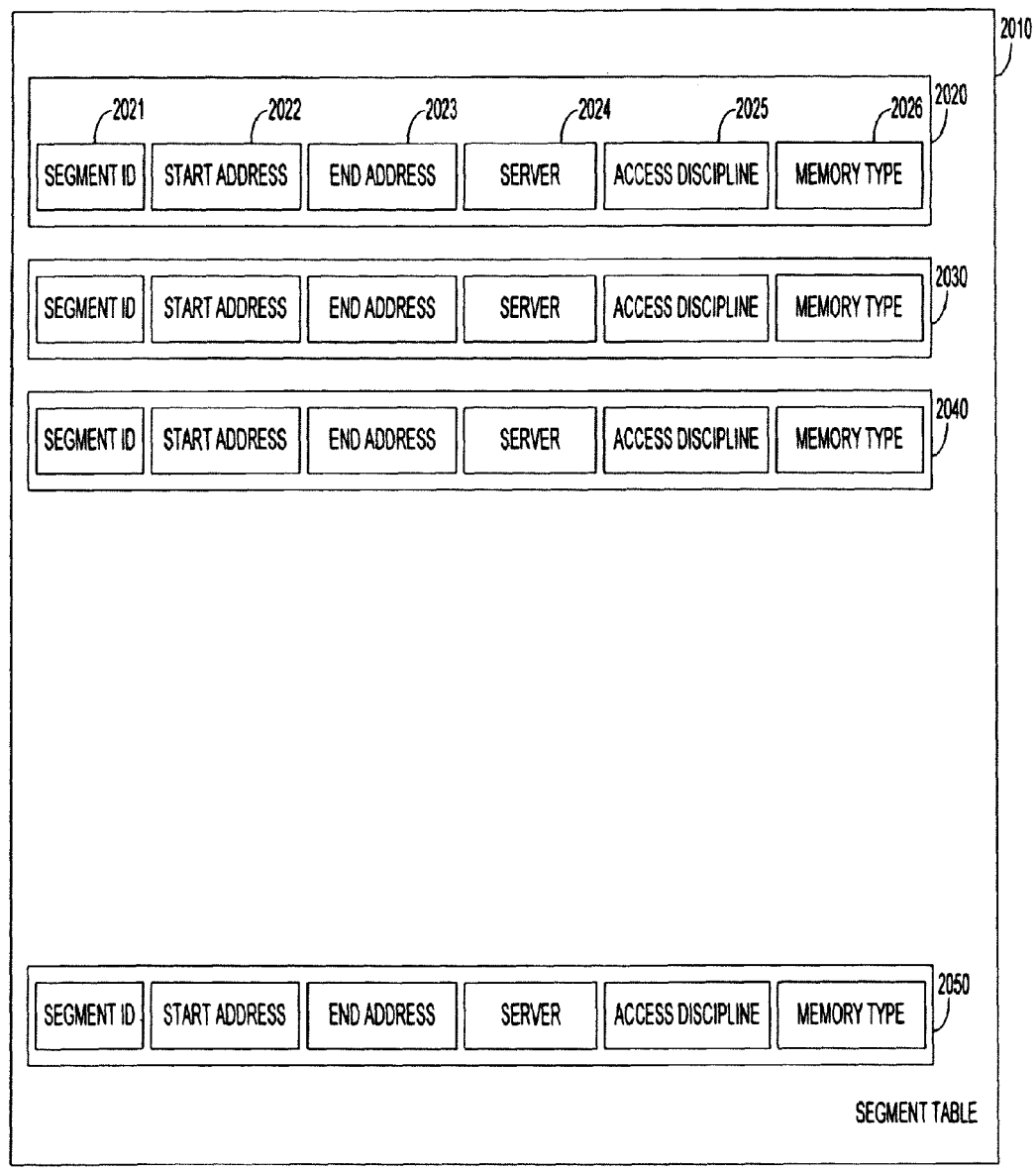
FIG. 20 illustrates the preferred data structure for the segment table.

FIG. 20 illustrates the preferred logical structure of the segment table 2010.

The segment table contains entries, one per segment instance (2020, 2030, 2040, 2050, etcetera). Each entry contains a unique segment identifier 2021, the start (2022) and the end (2023) address of the segment, the server (2024) assigned to this segment (if any), the preferred segment access discipline (2025) and the segment memory type (2026).

When a new page is allocated, the inventive system performs a look up in the segment table using the page address as a key and finds to which segment this page belongs. It then stores the ID 2021 of the segment in the appropriate entry of the page table (e.g., the entry 510 in FIG. 5). On further access to such page, the segment ID is quickly resolved from the page table and used to define the appropriate actions of the system.

Memory Types

While memory is used to store a wide variety of different objects, the inventive system uses a simple classification schema defining a limited number of memory types based on the predominant access/use pattern for each object. The inventive method preferably recognizes the following five different memory types: (a) code, (b) stack, (c) private data, (d) common data and (e) message data.

Code

As evident by the name, code segments contain executable code. They are rarely modified since self-modifying code is not a common practice and even when an application contains such code, the majority of the code is not modified and the code that is modified remains unchanged for a relatively long period. This allows the inventive system to heavily cache the application code among the servers thus lowering the amount of data transferred between them and improving the performance of the system.

Thread Stack

The thread stack is a private memory that is used by the applications as a private/per-thread storage for local variables and call stack. In very rare conditions, the thread stack is used as a temporary storage for objects that are passed to other threads.

Private Data

Memory used to store data that is private to an application module, subsystem or object is called private data.

The private data memory is usually encapsulated in the object or subsystem to which it belongs and is not accessed directly by any other code in the system. The term object here is used in the broader scope, not only as a programming language abstract, but as a logical entity whose interactions with the outside world happen through a limited set of interfaces.

Private data usually contains the state of the application or part thereof and has relatively long life comparing to the typical interaction or transaction performed by the system. As an example, in database engines the instance data of a user connection, session or a database transaction constitutes a private data.

Common Data

Memory containing data that is shared by multiple objects or subsystems in the application is called common data. Examples of common data include in-memory database caches, open files in a file system, data dictionaries, routing tables, etcetera.

The common data is modified relatively infrequently and so is inherently cacheable. In addition, while multiple objects and/or threads may access common data at any given time, each individual unit of data is rarely contested by multiple threads.

Message Data

In many applications, separately allocated data structures are used as carriers of data and requests between different objects. The memory containing such structures is used differently than any other class of memory and is known as message data. Examples of message data include windows messages, kernel I/O request packets, Java events and I/O requests that interact with hardware and/or are asynchronous.

Message data is frequently transferred from one object to another by reference. It is, however, typically accessed in the context of a single thread at a time. Contention over message data is rare. In addition, message data frequently transcends multiple threads when a thread deposits the message in a queue from where it is picked up later by another worker thread.

Messages are typically short-lived with one or more of them created in the course of handling a typical unit of application interaction.

Preferred Access Disciplines

Figure 21:
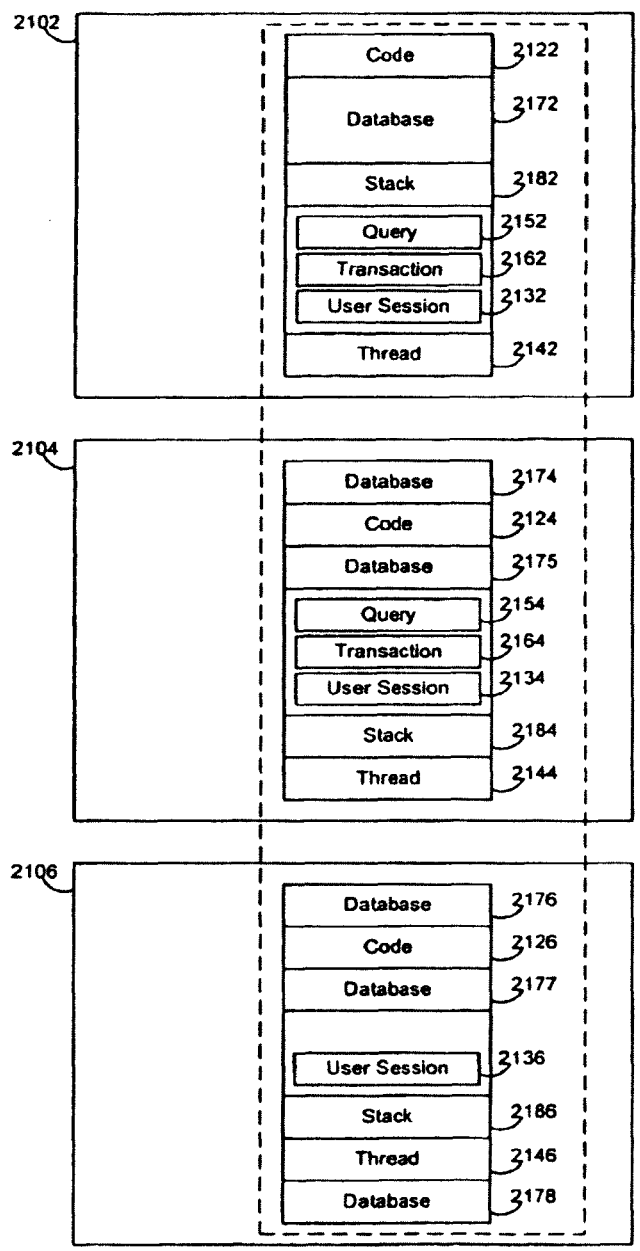
FIG. 21 illustrates the use of memory segments in the present invention.

FIG. 21 illustrates a simplified inventive system comprising of three different servers (2102, 2104 and 2106), each server contains a memory (2112, 2114 and 2116). There is an SQL server running as an aggregated process over the system. The application code (2122, 2124 and 2126) is cached over all servers. There are three users currently connected to this SQL server with a session associated with each user (2132, 2134 and 2136). Each user session is placed on a different server for improved performance. There are two threads (2142 and 2144) currently running on the system and a thread (2146) that is currently suspended waiting for a user request. Each active thread is currently executing a SQL query (2152 and 2154) which is part of a transaction (2162 and 2164 respectively). All queries are accessing the common database in memories 2172, 2174, 2175, 2176, 2177 and 2178.

The following sections illustrate the preferred access methods in the inventive system by using the above application as an example.

Code

Code segments are always cached (2122, 2124 and 2126).

Thread Stack

There are two different types of accesses for the thread stack pages (2182, 2184 and 2186):

(1) the top of the stack (the immediate four to eight stack pages) is moved together with the thread to which it belongs.

(2) the rest of the stack is moved as needed

Those mechanisms allow fast thread hopping and improved performance when the thread stack is referenced by another thread.

Private Data

The private data segments in our example are the transactions (2162, 2164) and the user session data structures (2132, 2134 and 2136). Each of the private data segments is stored on a single server and the execution thread usually hops to the server where the data resides to access the memory.

On binary operations or on I/O operations, pages of a private data segment may be cached or moved to a different server for the duration of such operation and later on are quickly returned back. This type of segment is also called homed segment and the pages that it consist of are called "homed pages" since they are always returning to their "home" server. For improved performance, session and transaction data segments are created on the same servers (e.g., by the application requesting them to be co-located).

Common Data

The common data segments in our example are the SQL database segments (2172, 2174, 2176), which are distributed among all the servers and portions (2175, 2177 and 2178) of the database are cached on two of the servers (2104, 2106 and 2106 respectively).

The common data is usually cached on the first read access coming from a given server. The memory cache provides low-latency/low-exceptions access to the application code and data for the threads running on the specified servers.

When the data changes, cached pages are invalidated from all servers except one where the page is made read-write and the application continues from where it was interrupted.

Whenever pages from a common data segment are concurrently accessed by multiple writers, hopping the accessing threads to the page will improve system performance significantly.

Message Data

An example of message data in our system is the SQL queries 2152 and 2154.

The preferred action for pages that comprise message data segments is to move the page, following the flow of control in the application.

Summary

The inventive system implements memory access on per page basis and implements memory management on logical groups of pages called segments.

The system uses memory use patterns to identify memory classes and assign such classification to each segment. The memory class is then used to choose the preferred access method or discipline for each page of the segment.

Homed Segments

In many important cases, it may be beneficial to associate a segment with an individual server, either permanently or for relatively long time. Such association may help maintain data locality and improve execution. At the same time, individual pages that comprise such segment may need to have the freedom to move or be cached in short-lived operations. Homed segments provide a mechanism and framework for achieving these two objectives.

Homed segments (and other resources) are typically assigned to a particular server and rarely move away from this server. Whenever a page from such segment has to be moved away from its home serer, the system will return it back soon after the reason for move is satisfied (on time or subsequent exception).

Data Access

Homed pages are usually accessed by hopping the execution thread to the home server of the segment to which they belong or by caching the pages.

Whenever hopping the thread or caching are not good options, such as during a binary write operation, the homed page is temporarily moved to the server raising the access exception. Later on, when another access exception is raised for the same page, the homed page is returned to its home server.

Allocation

Upon first access (read or write), homed pages are preferably allocated on the server designated as a home server for the memory segment to which they belong. This can happen in two different ways based on the server raising the memory access exception.

In case the exception is raised on the home server, the memory page is mapped and this concludes the processing of the memory exception.

When the exception is raised on a server different that the segment's home, the thread is hopped to the home server where another exception is preferably raised and handled as explained above.

As an optimization, the homed page can be allocated on the server raising the exception in which case an unnecessary hop will be saved. The page will then be moved to its home on a subsequent access exception, no matter how it ended being on that server.

Load Balancing

On a multi-server system, an important part of the system functionality is distribution of the processing and memory resources among the different servers.

Bad balance can cause resource shortage (e.g., running out of memory or saturating the CPUs of a set of servers while the rest of the servers remain idle or semi-idle) or inefficient resource usage.

In prior art systems, load is typically balanced through use of the following two techniques: (a) by managing the input to the system as is the case of web server farms where a load balancing appliance spreads input requests among the servers, and (b) by migrating units of execution (such as processes or threads) from one CPU/server to another as is the case with job schedulers.

While the inventive system may utilize any of the above methods to balance load, it also defines a novel approach based on balancing memory contents.

Balancing Through Memory Distribution

This method is based on the observation that since all applications are work over a set of data (big or small), in a system where threads can hop to access the data, distributing this set properly among the servers will ultimately bring the processing to the place where the data is, thus achieving load balancing through memory balancing.

In this method the thread(s) will hop to the server where the data is thus avoiding expensive data transfers. The only memory moved in this case will be the thread context, the top of the stack and the application code and the application code will be quickly cached on all servers executing the application.

Initial Server Assignment

In the inventive system, the memory balancing is performed on a per-segment basis. The benefits of this are the preservation of data locality and reduction of the number of entities to balance (there are many more pages than segments).

When a new memory segment is allocated, each memory segment is assigned to a server based on the selected allocation discipline.

Multiple server assignment algorithms can be implemented:

(a) round robin, where the server is selected in a round-robin fashion (b) memory distribution, where the segment is assigned to the server that has most free memory. This mechanism allows even memory allocation among the different servers.

(c) manual, where the system integrator/application developer assigns manually some or all segments to particular servers based on his experience and desire for system structure.

(d) Any other mechanisms.

Different algorithms can be used for different segments in the same system.

Memory Scavenging

Since the inventive system preferably caches memory aggressively, a server's memory can be quickly filled up with copies of the application data that are rarely used.

To avoid memory starvation, each server in the inventive system preferably has a background thread that checks the server memory and invalidates the least recently used cached pages freeing them for other use to avoid such starvation.

Segment Migration

The system preferably monitors periodically the server balance and takes migration decisions when it finds that the system is getting off balance. The decision period depends on the number of servers and the type of the applications running on the inventive system. If the period is too small, the attempt to balance the system can cause "memory trashing" and this lowering the system performance. If the period is too long, the system can get off-balance.

To keep the system in balance, the memory segments are migrated to less loaded servers. This is preferably achieved by changing the home server of the segment in the segment table (2010) and in the resource routing table (510) and then letting the system move the segment pages to its new home as they are accessed.

Note that segment migration is preferably not performed for cached pages, code pages, stack pages and message data segments: the pages of the thread stack and message data segments are easily moved around as their processing goes, while the unused code and cached pages are eliminated by the memory scavenger.

Summary

The inventive system proposes an innovative balancing technique through which the servers are balanced through distributing the memory relying on the fact that the processing will go where the data is. The memory balance is preferably performed on a per-segment basis. To prevent running out of memory due to caching on a given server the inventive system preferably implements memory scavenging of the least recently used cached memory pages. When the system balance begins to worsen, the balance is restored by migrating segments of some of the most loaded servers. The migration is performed in the least disruptive way by migrating each of the affected pages when an access decision is needed (i.e., when an exception over the affected page is raised).

Alternate Embodiments

In one embodiment, the inventive system manages memory based on logical segments, for example, as disclosed above. Since the creation, destruction and modification of segments happens relatively infrequently, this embodiment broadcasts changes to the segment table entries to all agents and grid switches in the system.

In this embodiment, large portion of the network traffic is avoided by executing an instance of the grid switch software on every application server, so that this particular instance of the grid switch manages the resources provided by that particular server.

When an agent requires access to a resource, it can look up locally the segment to which this resource belongs and the identifier of the server/grid switch that is responsible for managing that segment. As a result, the agent contacts that server/grid switch directly and the grid switch resolves the agent's request locally, without further network traffic, thus eliminating approximately half of the most frequent message transfers through the network.

Having thus disclosed various embodiments of the invention, it will now be apparent that many additional variations are possible and that those described therein are only illustrative of the inventive concepts. Accordingly, the scope hereof is not to be limited by the above disclosure but only by the claims appended hereto and their equivalents.

The invention claimed is:

1. A grid switch apparatus for aggregating memory in a distributed computing system, the distributed computing system having a plurality of servers, the grid switch apparatus communicating with the servers, the grid switch apparatus comprising:
    an interface configured to receive a first message from a first server in response to a first thread attempting to access a first memory;
    a processing unit configured to determine a second server that contains the first memory;
    an interface configured to send a second message to the second server; and
    wherein the grid switch apparatus is a multiprocessor computer comprising:
        a plurality of processors;
        at least one memory device;
        at least one input/output device;
        wherein the memory device stores a routing table comprising:
            a process identification for an aggregated process; and
            a server table comprising:
                a first server identification for the first server;
                a second server identification for the second server; and
                a total amount of memory respectively allocated on each of the first server and the second server for the aggregated process.

2. The grid switch apparatus of claim 1, wherein the routing table further comprises:
    a plurality of resource routing tables,
    wherein each resource routing table of the plurality of resource routing tables comprises a plurality of resource routing entries,
    wherein each resource routing entry of the plurality of resource routing entries represents to a respective unit of a respective resource allocated to the aggregated process, and
    wherein each resource routing entry of the plurality of resource routing entries comprises:
        an identifier for the respective unit of the respective resource that the routing entry represents;
        a server identification of a server on which the respective resource is currently allocated; and
        a local resource identification for the respective resource on the server on which the respective resource is currently allocated.

3. The grid switch apparatus of claim 2,
wherein the plurality of resource routing tables comprises:
a memory routing table that represents a memory resource;
a synchronization object routing table; and
a thread routing table,
wherein the memory routing table comprises, for each page existing in a member process context, a plurality of page entries, the plurality of page entries comprising:
a first page entry representing a first memory page at a first logical address; and
a second page entry representing a second memory page at a second logical address,
wherein the synchronization object routing table comprises a plurality of synchronization object entries, the plurality of synchronization object entries comprising:
a first synchronization object entry representing a first semaphore with a first handle; and
a second synchronization object entry representing a second semaphore with a second handle,
wherein the thread routing table comprises a plurality of thread entries, the plurality of thread entries comprising:
a first thread entry representing the first thread with a first handle, and
a second thread entry representing a second thread with a second handle.

4. The grid switch apparatus of claim 3, wherein the memory routing table omits, for each of the plurality of page entries, dynamic state information identifying a respective physical memory page assigned to a respective logical page.

5. The grid switch apparatus of claim 3, wherein the synchronization object routing table omits, for each of the plurality of synchronization object entries, dynamic state information identifying a respective count valve of a respective semaphore.

6. The grid switch apparatus of claim 2,
wherein the first message is an access request for the first thread to access a particular resource,
wherein the processing unit is configured to:
determine that the particular resource is represented by a particular identifier in a particular resource routing table of the plurality of resource routing tables;
locate a particular resource routing entry in the particular resource routing table, the particular resource routing entry comprising:
the particular identifier;
the second server identification; and
the local resource identification for the particular resource on the second server; and
determine that the particular resource is on the second server based on the particular resource routing entry, and
wherein the second message comprises the local resource identification for the particular resource on the second server.

7. The grid switch apparatus of claim 2, wherein each resource routing entry of the plurality of resource routing entries omits information identifying a specific dynamic state of the respective resource.

8. The grid switch apparatus of claim 1 further comprising a memory,
wherein the first message is an access request for the first thread to access a resource,
wherein the memory device stores a resource routing table comprising a resource routing entry for the resource,
wherein the resource routing entry comprises:
a resource identifier representing the resource;
a server identifier representing the second server; and
a local resource identifier that locally identifies the resource on the second server;
wherein the processing unit is configured to:
determine that the resource is represented by the resource identifier based on the first message;
locate the resource routing entry in the resource routing table; and
determine that the resource is on the second server based on the server identifier in the resource routing entry, and
wherein the second message comprises the local resource.

9. The grid switch apparatus of claim 1 further comprising:
a high-performance peripheral interconnect; and
a plurality of host adapters for a grid interconnect,
wherein the grid interconnect is a network that provides communications and data transfer between the first server, the second server, and the grid switch apparatus.

10. A method for aggregating memory in a distributed computing system using a grid switch apparatus, the distributed computing system having a plurality of servers, the grid switch apparatus communicating with the servers, and the method comprising:
receiving, via a receiving interface of the grid switch apparatus, a first message from a first server in response to a thread attempting to access a first memory;
determining, via a processing unit of the grid switch apparatus, a second server that contains the first memory; and
sending, via a sending interface of the grid switch apparatus, a second message to the second server;
wherein the first message is an access request for the thread to access a resource,
wherein the grid switch apparatus comprises a memory storing a resource routing table comprising a resource routing entry for the resource,
wherein the resource routing entry comprises:
a resource identifier representing the resource;
a server identifier representing the second server; and
a local resource identifier that locally identifies the resource on the second server;
determining, via the processing unit, that the resource is represented by the resource identifier based on the first message;
locating, via the processing unit, the resource routing entry in the resource routing table; and
determining, via the processing unit, that the resource is on the second server based on the server identifier in the resource routing entry, and
wherein the second message comprises the local resource.

11. The method of claim 10,
wherein the grid switch apparatus comprises a memory storing a resource routing table, the resource routing table comprising:
a process identification for an aggregated process; and
a server table comprising:
a first server identification for the first server;
a second server identification for the second server; and
a total amount of memory respectively allocated on each of the first server and the second server for the aggregated process;
a plurality of resource routing tables, wherein each resource routing table of the plurality of resource routing tables comprises a plurality of resource routing entries, wherein each resource routing entry of the plurality of resource routing entries represents to a respective unit of a respective resource allocated to the aggregated process, and wherein each resource routing entry of the plurality of resource routing entries comprises:
- an identifier for the respective unit of the respective resource that the routing entry represents;
- a server identification of a server on which the respective resource is currently allocated; and
- a local resource identification for the respective resource on the server on which the respective resource is currently allocated.

12. The method of claim 11, wherein the plurality of resource routing tables comprises:
- a memory routing table that represents a memory resource;
- a synchronization object routing table; and
- a thread routing table, wherein the memory routing table comprises, for each page existing in a member process context, a plurality of page entries, the plurality of page entries comprising:
- a first page entry representing a first memory page at a first logical address; and
- a second page entry representing a second memory page at a second logical address, wherein the synchronization object routing table comprises a plurality of synchronization object entries, the plurality of synchronization object entries comprising:
- a first synchronization object entry representing a first semaphore with a first handle; and
- a second synchronization object entry representing a second semaphore with a second handle, wherein the thread routing table comprises a plurality of thread entries, the plurality of thread entries comprising:
- a first thread entry representing the first thread with a first handle, and
- a second thread entry representing a second thread with a second handle.

13. The method of claim 11, wherein the first message is an access request for the first thread to access a particular resource, wherein the method further comprises:
- determining, via the processing unit, that the particular resource is represented by a particular identifier in a particular resource routing table of the plurality of resource routing tables;
- locating, via the processing unit, a particular resource routing entry in the particular resource routing table, the particular resource routing entry comprising:
  - the particular identifier;
  - the second server identification; and
  - the local resource identification for the particular resource on the second server; and
- determining, via the processing unit, that the particular resource is on the second server based on the particular resource routing entry, and wherein the second message comprises the local resource identification for the particular resource on the second server.

14. Non-transitory computer-readable media storing computer-readable instructions for aggregating memory in a distributed computing system via a grid switch apparatus, the system having a plurality of servers, the grid switch apparatus communicating with the servers, and the computer-readable instructions, when executed by the grid switch apparatus, instructing the grid switch apparatus to perform processes comprising:
- receiving, via a receiving interface of the grid switch apparatus, a first message from a first server in response to a thread attempting to access a first memory;
- determining, via a processing unit of the grid switch apparatus, a second server that contains the first memory; sending, via a sending interface of the grid switch apparatus, a second message to the second server;

wherein the first message is an access request for the thread to access a resource, wherein the grid switch apparatus comprises a memory storing a resource routing table comprising a resource routing entry for the resource, wherein the resource routing entry comprises:
- a resource identifier representing the resource;
- a server identifier representing the second server; and
- a local resource identifier that locally identifies the resource on the second server;

- determining, via the processing unit, that the resource is represented by the resource identifier based on the first message;
- locating, via the processing unit, the resource routing entry in the resource routing table; and
- determining, via the processing unit, that the resource is on the second server based on the server identifier in the resource routing entry, and wherein the second message comprises the local resource.

* * * * *